US012631731B2

(12) United States Patent
Ferreira et al.

(10) Patent No.: US 12,631,731 B2
(45) Date of Patent: May 19, 2026

(54) OPTICAL PACKAGE FOR A LIDAR SENSOR SYSTEM AND LIDAR SENSOR SYSTEM

(71) Applicant: OSRAM GmbH, Munich (DE)

(72) Inventors: Ricardo Ferreira, Olching (DE); Stefan Hadrath, Falkensee (DE); Peter Hoehmann, Berlin (DE); Herbert Kaestle, Traunstein (DE); Florian Kolb, Jena (DE); Norbert Magg, Berlin (DE); Jiye Park, Munich (DE); Tobias Schmidt, Garching (DE); Martin Schnarrenberger, Berlin (DE); Norbert Haas, Langenau (DE); Helmut Horn, Achberg (DE); Bernhard Siessegger, Unterschleissheim (DE); Guido Angenendt, Munich (DE); Charles Braquet, Munich (DE); Gerhard Maierbacher, Munich (DE); Oliver Neitzke, Dachau (DE); Sergey Khrushchev, Regensburg (DE)

(73) Assignee: OSRAM GMBH, Munich (DE)

( * ) Notice: Subject to any disclaimer, the term of this patent is extended or adjusted under 35 U.S.C. 154(b) by 954 days.

(21) Appl. No.: 17/742,448

(22) Filed: May 12, 2022

(65) Prior Publication Data

US 2022/0276352 A1 Sep. 1, 2022

Related U.S. Application Data

(63) Continuation of application No. 16/809,587, filed on Mar. 5, 2020, now Pat. No. 11,726,184.

(30) Foreign Application Priority Data

Mar. 8, 2019 (DE) .................... 10 2019 203 175.7
Apr. 16, 2019 (DE) .................... 10 2019 205 514.1

(Continued)

(51) Int. Cl.
| | | |
|---|---|---|
| *G01S 7/481* | (2006.01) | |
| *G01S 7/484* | (2006.01) | |
| *G01S 17/931* | (2020.01) | |

(52) U.S. Cl.
CPC .......... *G01S 7/4817* (2013.01); *G01S 7/4811* (2013.01); *G01S 7/4815* (2013.01); *G01S 7/4816* (2013.01); *G01S 7/484* (2013.01); *G01S 17/931* (2020.01)

(58) Field of Classification Search
CPC .... G01S 7/4817; G01S 7/4811; G01S 7/4815; G01S 7/4816; G01S 7/484; G01S 17/931
See application file for complete search history.

(56) References Cited

U.S. PATENT DOCUMENTS

| | | | |
|---|---|---|---|
| 6,221,687 B1 | 4/2001 | Abramovich | |
| 7,495,202 B2 * | 2/2009 | Schrey | .................... H10F 39/18 |
| | | | 250/214 R |

(Continued)

FOREIGN PATENT DOCUMENTS

| | | | |
|---|---|---|---|
| CN | 101768508 A | * | 7/2010 |
| CN | 102246476 A | | 11/2011 |

(Continued)

OTHER PUBLICATIONS

Chinese search report issued for the corresponding Chinese patent application No. 2022104450327, dated Jan. 9, 2025, 3 pages (for informational purposes only).

(Continued)

*Primary Examiner* — Yuqing Xiao
*Assistant Examiner* — Isabelle Lin Boegholm
(74) *Attorney, Agent, or Firm* — VIERING, JENTSCHURA & PARTNER mbB

(57) ABSTRACT

The present disclosure relates to various embodiments of an optical package for a LIDAR sensor system having a sub- (Continued)

strate including an array of a plurality of capacitors formed in the substrate, a plurality of switches formed in the substrate, where each switch is connected between at least one laser diode and at least one capacitor of the plurality of capacitors; and at least one laser diode being mounted in close proximity to the plurality of capacitors on the substrate in order to provide small parasitic inductances and capacitances. A processor is configured to control the plurality of switches to control a first current flow to charge the plurality of capacitors, wherein the processor is configured to control the plurality of switches to control a second current flow to drive the at least one laser diode with current discharged from at least one capacitor of the plurality of capacitors.

32 Claims, 21 Drawing Sheets

(30)    Foreign Application Priority Data

| | | |
|---|---|---|
| May 14, 2019 | (DE) | 10 2019 206 939.8 |
| Jun. 12, 2019 | (DE) | 10 2019 208 489.3 |
| Jul. 17, 2019 | (DE) | 10 2019 210 528.9 |
| Sep. 2, 2019 | (DE) | 10 2019 213 210.3 |
| Sep. 23, 2019 | (DE) | 10 2019 214 455.1 |
| Oct. 24, 2019 | (DE) | 10 2019 216 362.9 |
| Nov. 6, 2019 | (DE) | 10 2019 217 097.8 |
| Nov. 22, 2019 | (DE) | 10 2019 218 025.6 |
| Dec. 17, 2019 | (DE) | 10 2019 219 775.2 |
| Jan. 22, 2020 | (DE) | 10 2020 200 833.7 |
| Feb. 10, 2020 | (DE) | 10 2020 201 577.5 |
| Feb. 17, 2020 | (DE) | 10 2020 201 900.2 |
| Feb. 25, 2020 | (DE) | 10 2020 202 374.3 |

(56)    References Cited

U.S. PATENT DOCUMENTS

| | | | |
|---|---|---|---|
| 8,203,155 | B2 | 6/2012 | Wang et al. |
| 9,536,917 | B2 | 1/2017 | Wehner et al. |
| 9,749,553 | B2 | 8/2017 | Borthakur et al. |
| 10,691,979 | B2 | 6/2020 | Dal Mutto et al. |
| 10,699,421 | B1 | 6/2020 | Cherevatsky et al. |
| 11,726,184 | B2 | 8/2023 | Ferreira et al. |
| 11,892,746 | B1 * | 2/2024 | Mazed .................... G02F 1/212 |
| 2004/0247005 | A1 * | 12/2004 | Schrodinger ......... H01S 5/0261 |
| | | | 372/38.1 |
| 2005/0104089 | A1 | 5/2005 | Engelmann et al. |
| 2005/0245022 | A1 * | 11/2005 | Gutsche ............... H10B 12/318 |
| | | | 257/E21.018 |
| 2008/0064178 | A1 * | 3/2008 | Ho ......................... H10D 1/665 |
| | | | 438/389 |
| 2008/0100989 | A1 * | 5/2008 | Chen ................... H10D 84/212 |
| | | | 257/E27.048 |
| 2009/0161710 | A1 * | 6/2009 | Hoashi .................. G01S 7/4815 |
| | | | 372/38.02 |
| 2010/0153523 | A1 | 6/2010 | Li et al. |
| 2013/0234029 | A1 | 9/2013 | Bikumandla |
| 2014/0145287 | A1 | 5/2014 | Kato |
| 2015/0362587 | A1 | 12/2015 | Rogan et al. |
| 2015/0378012 | A1 | 12/2015 | Sayyah et al. |
| 2016/0380032 | A1 | 12/2016 | Park et al. |
| 2017/0040362 | A1 | 2/2017 | Na et al. |
| 2017/0048429 | A1 | 2/2017 | Takita |
| 2017/0054924 | A1 | 2/2017 | Chuang et al. |
| 2017/0115395 | A1 | 4/2017 | Grauer et al. |
| 2017/0115436 | A1 | 4/2017 | Qian et al. |
| 2017/0234976 | A1 | 8/2017 | Grauer et al. |
| 2017/0307736 | A1 | 10/2017 | Donovan |
| 2017/0307759 | A1 | 10/2017 | Pei et al. |

| | | | |
|---|---|---|---|
| 2017/0372602 | A1 | 12/2017 | Gilliland et al. |
| 2018/0006431 | A1 | 1/2018 | Winer et al. |
| 2018/0095304 | A1 | 4/2018 | Irish et al. |
| 2018/0308881 | A1 | 10/2018 | Hynecek |
| 2018/0323576 | A1 * | 11/2018 | Crawford .............. H02M 1/088 |
| 2018/0329065 | A1 | 11/2018 | Pacala et al. |
| 2018/0334109 | A1 | 11/2018 | Trebouet et al. |
| 2019/0067901 | A1 | 2/2019 | Khassine et al. |
| 2020/0057151 | A1 | 2/2020 | Finkelstein et al. |
| 2020/0099197 | A1 * | 3/2020 | Kudryashov ......... H01S 5/4031 |
| 2020/0194474 | A1 | 6/2020 | Meynants |
| 2020/0194963 | A1 * | 6/2020 | Galvano ............... H01S 5/0428 |
| 2020/0209355 | A1 * | 7/2020 | Pacala ................... G01S 7/4817 |
| 2020/0249428 | A1 | 8/2020 | Sugiyama |
| 2020/0284883 | A1 | 9/2020 | Ferreira et al. |
| 2021/0006756 | A1 | 1/2021 | Sato et al. |
| 2021/0157008 | A1 | 5/2021 | Schwarz et al. |

FOREIGN PATENT DOCUMENTS

| | | |
|---|---|---|
| CN | 103765590 A | 4/2014 |
| CN | 104682194 A | 6/2015 |
| CN | 106298823 A | 1/2017 |
| CN | 108431626 A | 8/2018 |
| CN | 208111471 U | 11/2018 |
| CN | 108944679 A | 12/2018 |
| CN | 109541569 A | 3/2019 |
| CN | 110620169 A | 12/2019 |
| CN | 115986033 A | 4/2023 |
| DE | 102017208052 A1 | 11/2018 |
| DE | 102017213298 A1 | 2/2019 |
| DE | 102017213465 A1 | 2/2019 |
| DE | 102017216198 A1 | 3/2019 |
| DE | 102017127963 A1 | 5/2019 |
| DE | 102019001005 A1 | 8/2019 |
| JP | 2018019044 A | 2/2018 |
| WO | 2017024121 A1 | 2/2017 |
| WO | 2017112416 A1 | 6/2017 |

OTHER PUBLICATIONS

International Search Report issued for the corresponding International Application No. PCT/EP2020/055774, dated Aug. 19, 2020, 7 pages (for informational purposes only).

Vornicu et al. "A CMOS Imager for Time-of-Flight and Photon Counting Based on Single Photon Avalanche Diodes and In-Pixel Time-to-Digital Converters", Romanian Journal of Information Science and Technology, dated 2014, pp. 353-371 , vol. 17, No. 4.

"Foveon X3 sensor", Wikipedia, https://en.wikipedia.org/wiki/Foveon_X3_sensor, downloaded May 6, 2022, 7 pages.

"IAA 2017: The Digitalization of Light Can Be Experienced Live", Hella Press Release, www.hella.com/press, dated Sep. 12, 2017, 2 pages.

G. Jeong et al. "Review of CMOS Integrated Circuit Technologies for High-Speed Photo-Detection", Sensors 17, MDPI, www.mdpi.com/journal/sensors, dated Aug. 25, 2017, 40 pages.

Y. Takemoto et al. "Multi-storied photodiode CMOS image sensor for multiband imaging with 3D technology", IEDM, dated 2015, 4 pages.

Mgb et al., "Safety first for automated driving" White Paper, 2019.

Chinese search report issued for the corresponding Chinese patent application No. 2020800346484, dated Jan. 17, 2024, 2 pages (for informational purposes only).

Examiner search report issued for the parallel U.S. Appl. No. 16/809,587, dated Jun. 30, 2022, 1 page (for informational purposes only).

US Non-Final Office Action issued for the corresponding U.S. Appl. No. 17/742,426, dated Sep. 23, 2025, 31 pages (for informational purposes only).

Yelena Kaminski et al., Novel vertical silicon photodiodes based on salicided polysilicon trenched contacts, Journal of Applied Physics 118.21, 2015.

* cited by examiner

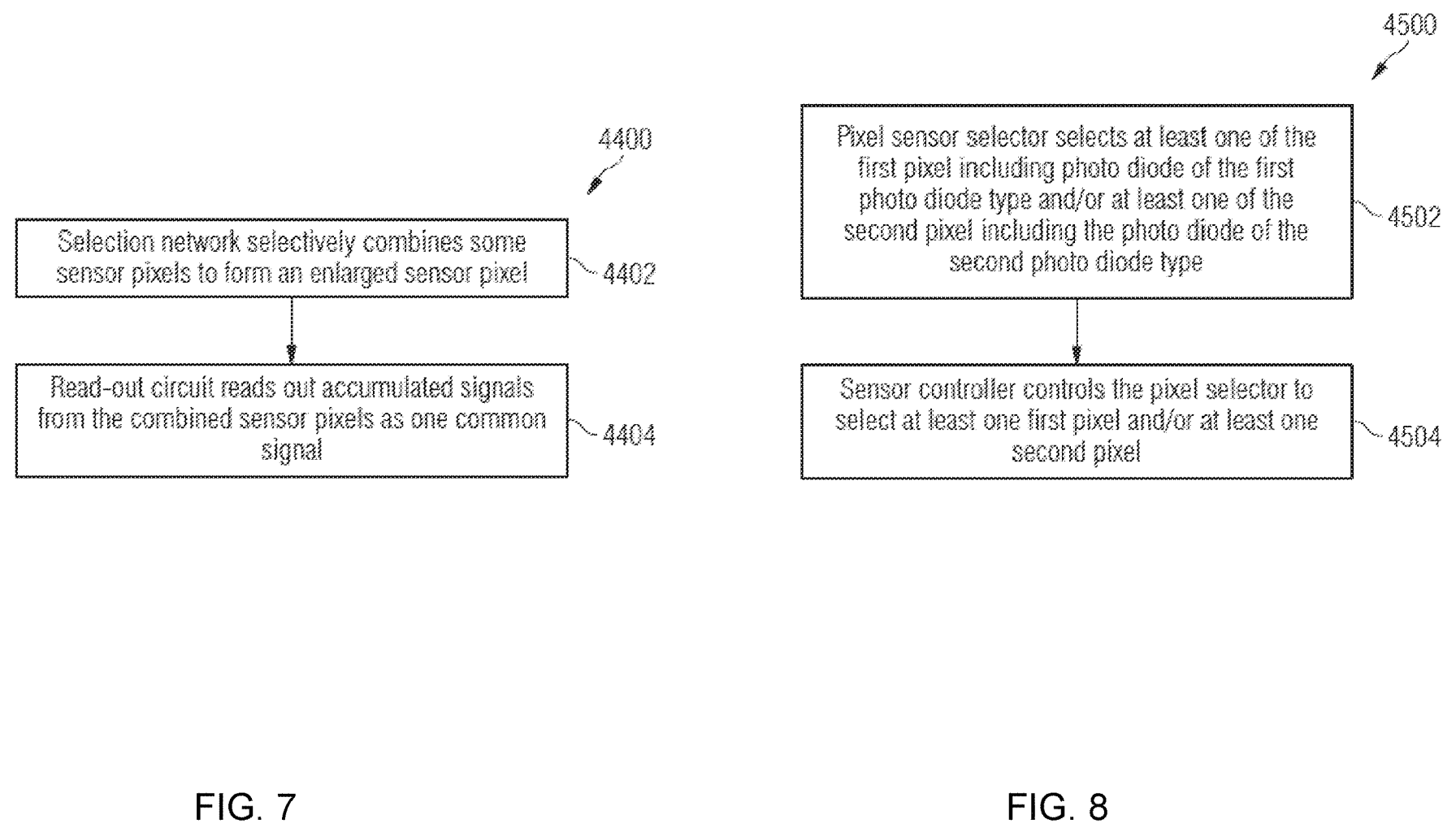

4500

4502

Pixel sensor selector selects at least one of the first pixel including photo diode of the first photo diode type and/or at least one of the second pixel including the photo diode of the second photo diode type

4504

Sensor controller controls the pixel selector to select at least one first pixel and/or at least one second pixel

Selection network selectively combines some sensor pixels to form an enlarged sensor pixel

4404

Read-out circuit reads out accumulated signals from the combined sensor pixels as one common signal

FIG. 7

OPTICAL PACKAGE FOR A LIDAR SENSOR SYSTEM AND LIDAR SENSOR SYSTEM

CROSS-REFERENCE TO RELATED APPLICATIONS

This is continuation application of U.S. non-provisional application Ser. No. 16/809,587, which was filed on Mar. 5, 2020, and which claims priority from German Application No.: 10 2019 205 514.1, filed on Apr. 16, 2019, German Application No.: 10 2019 214 455.1, filed on Sep. 23, 2019, German Application No.: 10 2019 216 362.9, filed on Oct. 24, 2019, German Application No.: 10 2020 201 577.5, filed on Feb. 10, 2020, German Application No.: 10 2019 217 097.8, filed on Nov. 6, 2019, German Application No.: 10 2020 202 374.3, filed on Feb. 25, 2020, German Application No.: 10 2020 201 900.2, filed on Feb. 17, 2020, German Application No.: 10 2019 203 175.7, filed on Mar. 8, 2019, German Application No.: 10 2019 218 025.6, filed on Nov. 22, 2019, German Application No.: 10 2019 219 775.2, filed on Dec. 17, 2019, German Application No.: 10 2020 200 833.7, filed on Jan. 24, 2020, German Application No.: 10 2019 208 489.3, filed on Jun. 12, 2019, German Application No.: 10 2019 210 528.9, filed on Jul. 17, 2019, German Application No.: 10 2019 206 939.8, filed on May 14, 2019, and German Application No.: 10 2019 213 210.3, filed on Sep. 2, 2019, the contents of each of the above-identified applications are incorporated herein by reference in their entirety.

TECHNICAL FIELD

The technical field of the present disclosure relates generally to light detection and ranging (LIDAR) systems and methods that use light detection and ranging technology. This disclosure is focusing on Components for LIDAR Sensor Systems, LIDAR Sensor Systems, LIDAR Sensor Devices and on Methods for LIDAR Sensor Systems or LIDAR Sensor Devices.

BACKGROUND INFORMATION

There are numerous studies and market forecasts, which predict that future mobility and transportation will shift from vehicles supervised by a human operator to vehicles with an increasing level of autonomy towards fully autonomous, self-driving vehicles. This shift, however, will not be an abrupt change but rather a gradual transition with different levels of autonomy, defined for example by SAE International (Society of Automotive Engineers) in SAE J3016 in-between. Furthermore, this transition will not take place in a simple linear manner, advancing from one level to the next level, while rendering all previous levels dispensable. Instead, it is expected that these levels of different extent of autonomy will co-exist over longer periods of time and that many vehicles and their respective sensor systems will be able to support more than one of these levels.

Depending on various factors, a human operator may actively switch for example between different SAE levels, depending on the vehicle's capabilities, or the vehicles operation system may request or initiate such a switch, typically with a timely information and acceptance period to possible human operators of the vehicles. These factors may include internal factors such as individual preference, level of driving experience or the biological state of a human driver and external factors such as a change of environmental conditions like weather, traffic density or unexpected traffic complexities.

It is important to note that the above-described scenario for a future is not a theoretical, far-away eventuality. In fact, already today, a large variety of so-called Advanced Driver Assistance Systems (ADAS) has been implemented in modern vehicles, which clearly exhibit characteristics of autonomous vehicle control. Current ADAS systems may be configured for example to alert a human operator in dangerous situations (e.g. lane departure warning) but in specific driving situations, some ADAS systems are able to takeover control and perform vehicle steering operations without active selection or intervention by a human operator. Examples may include convenience-driven situations such as adaptive cruise control but also hazardous situations like in the case of lane keep assistants and emergency break assistants.

The above-described scenarios all require vehicles and transportation systems with a tremendously increased capacity to perceive, interpret and react on their surroundings. Therefore, it is not surprising that remote environmental sensing systems will be at the heart of future mobility.

Since modern traffic can be extremely complex due to a large number of heterogeneous traffic participants, changing environments or insufficiently mapped or even unmapped environments, and due to rapid, interrelated dynamics, such sensing systems will have to be able to cover a broad range of different tasks, which have to be performed with a high level of accuracy and reliability. It turns out that there is not a single "one fits all" sensing system that can meet all the required features relevant for semi-autonomous or fully autonomous vehicles. Instead, future mobility requires different sensing technologies and concepts with different advantages and disadvantages. Differences between sensing systems may be related to perception range, vertical and horizontal field of view (FOV), spatial and temporal resolution, speed of data acquisition, etc. Therefore, sensor fusion and data interpretation, possibly assisted by Deep Neuronal Learning (DNL) methods and other Neural Processor Units (NFU) methods for more complex tasks, like judgment of a traffic situation and generation of derived vehicle control functions, may be necessary to cope with such complexities. Furthermore, driving and steering of autonomous vehicles may require a set of ethical rules and commonly accepted traffic regulations.

Among these sensing systems, LIDAR sensing systems are expected to play a vital role, as well as camera-based systems, possibly supported by radar and ultrasonic systems. With respect to a specific perception task, these systems may operate more or less independently of each other. However, in order to increase the level of perception (e.g. in terms of accuracy and range), signals and data acquired by different sensing systems may be brought together in so-called sensor fusion systems. Merging of sensor data is not only necessary to refine and consolidate the measured results but also to increase the confidence in sensor results by resolving possible inconsistencies and contradictories and by providing a certain level of redundancy. Unintended spurious signals and intentional adversarial attacks may play a role in this context as well.

For an accurate and reliable perception of a vehicle's surrounding, not only vehicle-internal sensing systems and measurement data may be considered but also data and information from vehicle-external sources. Such vehicle-external sources may include sensing systems connected to other traffic participants, such as preceding and oncoming vehicles, pedestrians and cyclists, but also sensing systems mounted on road infrastructure elements like traffic lights, traffic signals, bridges, elements of road construction sites and central traffic surveillance structures. Furthermore, data and information may come from far-away sources such as traffic teleoperators and satellites of global positioning systems (e.g. GPS).

Therefore, apart from sensing and perception capabilities, future mobility will also heavily rely on capabilities to communicate with a wide range of communication partners. Communication may be unilateral or bilateral and may include various wireless transmission technologies, such as WLAN, Bluetooth and communication based on radio frequencies and visual or non-visual light signals. It is to be noted that some sensing systems, for example LIDAR sensing systems, may be utilized for both sensing and communication tasks, which makes them particularly interesting for future mobility concepts. Data safety and security and unambiguous identification of communication partners are examples where light-based technologies have intrinsic advantages over other wireless communication technologies. Communication may need to be encrypted and tamper-proof.

From the above description, it becomes clear also that future mobility has to be able to handle vast amounts of data, as several tens of gigabytes may be generated per driving hour. This means that autonomous driving systems have to acquire, collect and store data at very high speed, usually complying with real-time conditions. Furthermore, future vehicles have to be able to interpret these data, i.e. to derive some kind of contextual meaning within a short period of time in order to plan and execute required driving maneuvers. This demands complex software solutions, making use of advanced algorithms. It is expected that autonomous driving systems will including more and more elements of artificial intelligence, machine and self-learning, as well as Deep Neural Networks (DNN) for certain tasks, e.g. visual image recognition, and other Neural Processor Units (NFU) methods for more complex tasks, like judgment of a traffic situation and generation of derived vehicle control functions, and the like. Data calculation, handling, storing and retrieving may require a large amount of processing power and hence electrical power.

In an attempt to summarize and conclude the above paragraphs, future mobility will involve sensing systems, communication units, data storage devices, data computing and signal processing electronics as well as advanced algorithms and software solutions that may include and offer various ethical settings. The combination of all these elements is constituting a cyber-physical world, usually denoted as the Internet of things (IoT). In that respect, future vehicles represent some kind of IoT device as well and may be called "Mobile IoT devices".

Such "Mobile IoT devices" may be suited to transport people and cargo and to gain or provide information. It may be noted that future vehicles are sometimes also called "smartphones on wheels", a term which surely reflects some of the capabilities of future vehicles. However, the term implies a certain focus towards consumer-related new features and gimmicks. Although these aspects may certainly play a role, it does not necessarily reflect the huge range of future business models, in particular data-driven business models, that can be envisioned only at the present moment of time but which are likely to center not only on personal, convenience-driven features but include also commercial, industrial or legal aspects.

New data-driven business models will focus on smart, location-based services, utilizing for example self-learning and prediction aspects, as well as gesture and language processing with Artificial Intelligence as one of the key drivers. All this is fueled by data, which will be generated in vast amounts in automotive industry by a large fleet of future vehicles acting as mobile digital platforms and by connectivity networks linking together mobile and stationary IoT devices.

New mobility services including station-based and free-floating car sharing, as well as ride-sharing propositions have already started to disrupt traditional business fields. This trend will continue, finally providing robo-taxi services and sophisticated Transportation-as-a-Service (TaaS) and Mobility-as-a-Service (MaaS) solutions.

Electrification, another game-changing trend with respect to future mobility, has to be considered as well. Hence, future sensing systems will have to pay close attention to system efficiency, weight and energy-consumption aspects. In addition to an overall minimization of energy consumption, also context-specific optimization strategies, depending for example on situation-specific or location-specific factors, may play an important role.

Energy consumption may impose a limiting factor for autonomously driving electrical vehicles. There are quite a number of energy consuming devices like sensors, for example RADAR, LIDAR, camera, ultrasound, Global Navigation Satellite System (GNSS/GPS), sensor fusion equipment, processing power, mobile entertainment equipment, heater, fans, Heating, Ventilation and Air Conditioning (HVAC), Car-to-Car (C2C) and Car-to-Environment (C2X) communication, data encryption and decryption, and many more, all leading up to a high power consumption. Especially data processing units are very power hungry. Therefore, it is necessary to optimize all equipment and use such devices in intelligent ways so that a higher battery mileage can be sustained.

Besides new services and data-driven business opportunities, future mobility is expected also to provide a significant reduction in traffic-related accidents. Based on data from the Federal Statistical Office of Germany (Destatis, 2018), over 98% of traffic accidents are caused, at least in part by humans. Statistics from other countries display similarly clear correlations.

Nevertheless, it has to be kept in mind that automated vehicles will also introduce new types of risks, which have not existed before. This applies to so far unseen traffic scenarios, involving only a single automated driving system as well as for complex scenarios resulting from dynamic interactions between a plurality of automated driving system. As a consequence, realistic scenarios aim at an overall positive risk balance for automated driving as compared to human driving performance with a reduced number of accidents, while tolerating to a certain extent some slightly negative impacts in cases of rare and unforeseeable driving situations. This may be regulated by ethical standards that are possibly implemented in soft- and hardware.

Any risk assessment for automated driving has to deal with both, safety and security related aspects: safety in this context is focusing on passive adversaries for example due to malfunctioning systems or system components, while security is focusing on active adversaries for example due to intentional attacks by third parties.

In the following a non-exhaustive enumeration is given for safety-related and security-related factors, with reference to "Safety first for Automated Driving", a white paper published in 2019 by authors from various Automotive OEM, Tier-1 and Tier-2 suppliers.

Safety assessment: to meet the targeted safety goals, methods of verification and validation have to be implemented and executed for all relevant systems and components. Safety assessment may include safety by design principles, quality audits of the development and production processes, the use of redundant sensing and analysis components and many other concepts and methods.

Safe operation: any sensor system or otherwise safety-related system might be prone to degradation, i.e. system performance may decrease over time or a system may even fail completely (e.g. being unavailable). To ensure safe operation, the system has to be able to compensate for such performance losses for example via redundant sensor systems. In any case, the system has to be configured to transfer the vehicle into a safe condition with acceptable risk. One possibility may include a safe transition of the vehicle control to a human vehicle operator.

Operational design domain: every safety-relevant system has an operational domain (e.g. with respect to environmental conditions such as temperature or weather conditions including rain, snow and fog) inside which a proper operation of the system has been specified and validated. As soon as the system gets outside of this domain, the system has to be able to compensate for such a situation or has to execute a safe transition of the vehicle control to a human vehicle operator.

Safe layer: the automated driving system needs to recognize system limits in order to ensure that it operates only within these specified and verified limits. This includes also recognizing limitations with respect to a safe transition of control to the vehicle operator.

User responsibility: it must be clear at all times which driving tasks remain under the user's responsibility. In addition, the system has to be able to determine factors, which represent the biological state of the user (e.g. state of alertness) and keep the user informed about their responsibility with respect to the user's remaining driving tasks.

Human Operator-initiated handover: there have to be clear rules and explicit instructions in case that a human operator requests an engaging or disengaging of the automated driving system.

Vehicle-initiated handover: requests for such handover operations have to be clear and manageable by the human operator, including a sufficiently long time period for the operator to adapt to the current traffic situation. In case it turns out that the human operator is not available or not capable of a safe takeover, the automated driving system must be able to perform a minimal-risk maneuver.

Behavior in traffic: automated driving systems have to act and react in an easy-to-understand way so that their behavior is predictable for other road users. This may include that automated driving systems have to observe and follow traffic rules and that automated driving systems inform other road users about their intended behavior, for example via dedicated indicator signals (optical, acoustic).

Security: the automated driving system has to be protected against security threats (e.g. cyber-attacks), including for example unauthorized access to the system by third party attackers. Furthermore, the system has to be able to secure data integrity and to detect data corruption, as well as data forging. Identification of trustworthy data sources and communication partners is another important aspect. Therefore, security aspects are, in general, strongly linked to cryptographic concepts and methods.

Data recording: relevant data related to the status of the automated driving system have to be recorded, at least in well-defined cases. In addition, traceability of data has to be ensured, making strategies for data management a necessity, including concepts of bookkeeping and tagging. Tagging may comprise, for example, to correlate data with location information, e.g. GPS-information.

In the following disclosure, various aspects are disclosed which may be related to the technologies, concepts and scenarios presented in this chapter "BACKGROUND INFORMATION". This disclosure is focusing on LIDAR Sensor Systems, Controlled LIDAR Sensor Systems and LIDAR Sensor Devices as well as Methods for LIDAR Sensor Management. As illustrated in the above remarks, automated driving systems are extremely complex systems including a huge variety of interrelated sensing systems, communication units, data storage devices, data computing and signal processing electronics as well as advanced algorithms and software solutions.

SUMMARY OF THE DISCLOSURE

Optical Package and LIDAR Sensor System

The optical package according to the invention includes a substrate. The substrate includes an array of a plurality of capacitors formed in the substrate. The substrate includes a plurality of switches formed in the substrate. Each switch is connected between at least one laser diode and at least one capacitor of the plurality of capacitors. The optical package includes the at least one laser diode mounted in close proximity to the plurality of capacitors on the substrate. The optical package includes a processor configured to control the plurality of switches to control a first current flow to charge the plurality of capacitors. The processor is configured to control the plurality of switches to control a second current flow to drive the at least one laser diode with current discharged from at least one capacitor of the plurality of capacitors.

In a preferred embodiment, the plurality of capacitors and the plurality of switches are monolithically integrated in the substrate.

In another preferred embodiment, each switch of the plurality of switches is assigned to exactly one respective capacitor of the plurality of capacitors.

In another preferred embodiment, the processor is configured to individually control the plurality of switches to control the first current flow to charge the plurality of capacitors. The processor is configured to individually control the plurality of switches to control the second current flow to drive the at least one laser diode with current discharged from at least one capacitor of the plurality of capacitors.

In yet another preferred embodiment, each switch of the plurality of switches includes a transistor. At least one transistor of the plurality of transistors can be a field effect transistor. At least one field effect transistor of the plurality of transistors can be a metal oxide semiconductor field effect transistor. At least one metal oxide semiconductor field effect transistor of the plurality of transistors can be a complementary metal oxide semiconductor field effect transistor.

In another preferred embodiment, the array of capacitors includes a number of capacitors in the range from about 400000 capacitors to about 600000 capacitors associated with the at least one laser diode.

In yet another preferred embodiment, at least one capacitor of the array of capacitors has a capacitance in the range from about 50 fF to about 200 fF.

In another preferred embodiment, the current flow to drive the at least one laser diode includes a current in the range from about 10 mA to about 100 A.

In another preferred embodiment, an electrical path between a capacitor and the at least one laser diode has an inductivity lower than 100 pH.

In yet another preferred embodiment, at least one capacitor of the array of capacitors is a deep trench capacitor.

In another preferred embodiment, at least one capacitor of the array of capacitors is a stacked capacitor.

In a much preferred embodiment, the capacitors of the array of capacitors are arranged in rows and columns.

In yet another preferred embodiment, the optical package can optionally include an electrically conductive common line connecting at least some capacitors of the plurality of capacitors.

In another preferred embodiment, the common line of the previous embodiment is configured to provide the power to charge the plurality of capacitors.

In another preferred embodiment, the optical package includes a printed circuit board. The substrate may be mounted on the printed circuit board. The printed circuit board may include an electrical contact electrically coupled to the common line of the substrate. The electrical contact of the printed circuit board can be wire bonded to the common line of the substrate.

In example 21ad, the subject-matter of any one of examples 16ad to 20ad can optionally include a printed circuit board. The substrate may be mounted on the printed circuit board. A first terminal of the at least one laser diode may be electrically coupled to the common line. A second terminal of the at least one laser diode may be electrically coupled to an electrical contact of the printed circuit board.

In yet another preferred embodiment, the electrical contact of the printed circuit board is wire bonded to the second terminal of the at least one laser diode.

In another much preferred embodiment, the substrate includes or essentially consists of silicon.

In yet another preferred embodiment, the at least one laser diode laterally covers at least a portion of the plurality of capacitors.

In another preferred embodiment, the at least one laser diode includes an edge emitting laser diode.

In a different preferred embodiment, the at least one laser diode includes a vertical cavity surface-emitting laser diode.

In yet another preferred embodiment, the processor is monolithically integrated in the substrate.

In another preferred embodiment, the processor is mounted on the printed circuit board.

In another preferred embodiment, the processor is configured to control the plurality of switches to discharge at least some capacitors of the plurality of capacitors to drive the at least one laser diode to emit a laser pulse of a predefined pulse shape.

In yet another preferred embodiment, the laser pulse has a pulse duration of about 10 ns.

In another preferred embodiment, the processor is configured to control the plurality of switches to discharge at least some capacitors of the plurality of capacitors to drive the at least one laser diode to emit a laser pulse dependent on a light emission scheme.

In a much preferred embodiment, at least one capacitor of the array of capacitors are arranged directly underneath the at least one laser diode in order to provide small parasitic inductances and capacitances.

The invention also relates to a LIDAR Sensor System including an optical package of any one of above embodiments.

BRIEF DESCRIPTION OF THE DRAWINGS

The detailed description is described with reference to the accompanying figures. The use of the same reference number in different instances in the description and the figure may indicate a similar or identical item. The drawings are not necessarily to scale, emphasis instead generally being placed upon illustrating the principles of the present disclosure.

In the following description, various embodiments of the present disclosure are described with reference to the following drawings, in which:

FIG. 7 shows a flow diagram illustrating a method for a LIDAR Sensor System in accordance with various embodiments in more detail.

FIG. 8 shows a flow diagram illustrating another method for a LIDAR Sensor System in accordance with various embodiments in more detail.

DETAILED DESCRIPTION

Introduction

Figure 1:
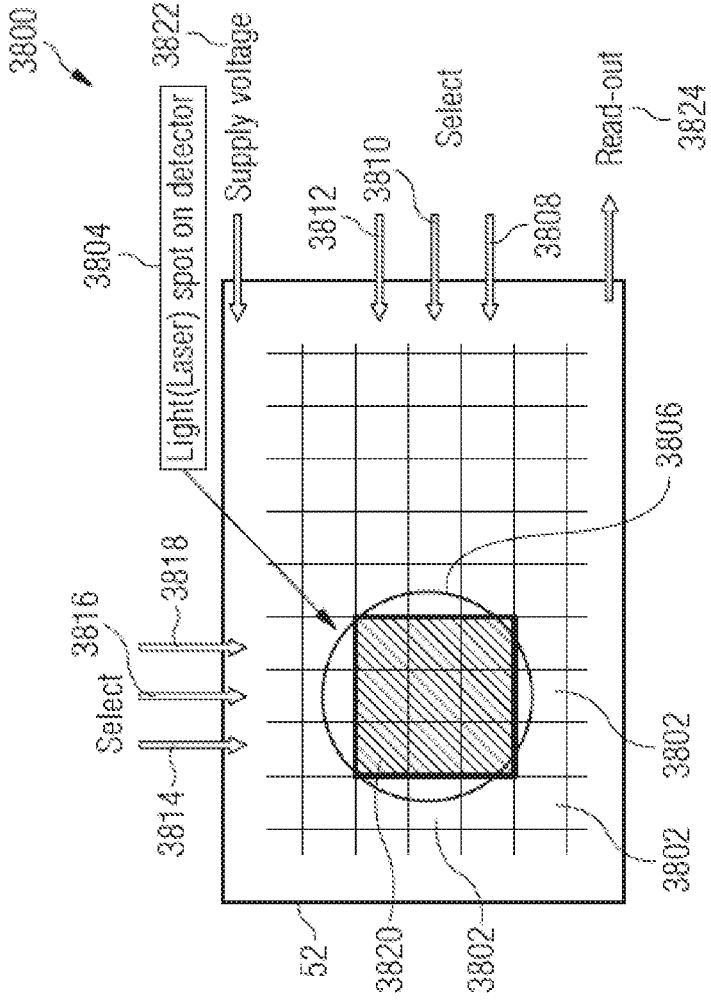
FIG. 1 shows a portion of a sensor in accordance with various embodiments.

Autonomously driving vehicles need sensing methods that detect objects and map their distances in a fast and reliable manner. Light detection and ranging (LIDAR), sometimes called Laser Detection and Ranging (LADAR), Time of Flight measurement device (TOF), Laser Scanners or Laser Radar—is a sensing method that detects objects and maps their distances. The technology works by illuminating a target with an optical pulse and measuring the characteristics of the reflected return signal. The width of the optical-pulse can range from a few nanoseconds to several microseconds.

In order to steer and guide autonomous cars in a complex driving environment, it is adamant to equip vehicles with fast and reliable sensing technologies that provide high-resolution, three-dimensional information (Data Cloud) about the surrounding environment thus enabling proper vehicle control by using on-board or cloud-based computer systems.

For distance and speed measurement, a light-detection-and-ranging LIDAR Sensor Systems is known from the prior art. With LIDAR Sensor Systems, it is possible to quickly scan the environment and detect speed and direction of movement of individual objects (vehicles, pedestrians, static objects). LIDAR Sensor Systems are used, for example, in partially autonomous vehicles or fully autonomously driving prototypes, as well as in aircraft and drones. A high-resolution LIDAR Sensor System emits a (mostly infrared) laser beam, and further uses lenses, mirrors or micro-mirror systems, as well as suited sensor devices.

The disclosure relates to a LIDAR Sensor System for environment detection, wherein the LIDAR Sensor System is designed to carry out repeated measurements for detecting the environment, wherein the LIDAR Sensor System has an emitting unit (First LIDAR Sensing System) which is designed to perform a measurement with at least one laser pulse and wherein the LIDAR system has a detection unit (Second LIDAR Sensing Unit), which is designed to detect an object-reflected laser pulse during a measurement time window. Furthermore, the LIDAR system has a control device (LIDAR Data Processing System/Control and Communication System/LIDAR Sensor Management System), which is designed, in the event that at least one reflected beam component is detected, to associate the detected beam component on the basis of a predetermined assignment with a solid angle range from which the beam component originates. The disclosure also includes a method for operating a LIDAR Sensor System.

The distance measurement in question is based on a transit time measurement of emitted electromagnetic pulses.

The electromagnetic spectrum should range from the ultraviolet via the visible to the infrared, including violet and blue radiation in the range from 405 to 480 nm. If these hit an object, the pulse is proportionately reflected back to the distance-measuring unit and can be recorded as an echo pulse with a suitable sensor. If the emission of the pulse takes place at a time t0 and the echo pulse is detected at a later time t1, the distance d to the reflecting surface of the object over the transit time $\Delta tA = t1 - t0$ can be determined according Eq. 1.

$$d = \Delta tA \; c/2 \qquad\qquad \text{Eq. 1}$$

Since these are electromagnetic pulses, c is the value of the speed of light. In the context of this disclosure, the word electromagnetic comprises the entire electromagnetic spectrum, thus including the ultraviolet, visible and infrared spectrum range.

The LIDAR method is usefully working with light pulses which, for example, using semiconductor laser diodes having a wavelength between about 850 nm to about 1600 nm, which have a FWHM pulse width of 1 ns to 100 ns (FWHM=Full Width at Half Maximum). Also conceivable in general are wavelengths up to, in particular approximately, 8100 nm.

Furthermore, each light pulse is typically associated with a measurement time window, which begins with the emission of the measurement light pulse. If objects that are very far away are to be detectable by a measurement, such as, for example, objects at a distance of 300 meters and farther, this measurement time window, within which it is checked whether at least one reflected beam component has been received, must last at least two microseconds. In addition, such measuring time windows typically have a temporal distance from each other.

The use of LIDAR sensors is now increasingly used in the automotive sector. Correspondingly, LIDAR sensors are increasingly installed in motor vehicles.

The disclosure also relates to a method for operating a LIDAR Sensor System arrangement comprising a First LIDAR Sensor System with a first LIDAR sensor and at least one Second LIDAR Sensor System with a second LIDAR sensor, wherein the first LIDAR sensor and the second LIDAR sensor repeatedly perform respective measurements, wherein the measurements of the first LIDAR Sensor are performed in respective first measurement time windows, at the beginning of which a first measurement beam is emitted by the first LIDAR sensor and it is checked whether at least one reflected beam component of the first measurement beam is detected within the respective first measurement time window. Furthermore, the measurements of the at least one second LIDAR sensor are performed in the respective second measurement time windows, at the beginning of which a second measurement beam is emitted by the at least one second LIDAR sensor, and it is checked whether within the respective second measurement time window at least one reflected beam portion of the second measuring beam is detected. The disclosure also includes a LIDAR Sensor System arrangement with a first LIDAR sensor and at least one second LIDAR sensor.

A LIDAR (light detection and ranging) Sensor System is to be understood in particular as meaning a system which, in addition to one or more emitters for emitting light beams, for example in pulsed form, and a detector for detecting any reflected beam components, may have further devices, for example optical elements such as lenses and/or a MEMS mirror.

The oscillating mirrors or micro-mirrors of the MEMS (Micro-Electro-Mechanical System) system, in some embodiments in cooperation with a remotely located optical system, allow a field of view to be scanned in a horizontal angular range of e.g. 60° or 120° and in a vertical angular range of e.g. 30°. The receiver unit or the sensor can measure the incident radiation without spatial resolution. The receiver unit can also be spatial angle resolution measurement device. The receiver unit or sensor may comprise a photodiode, e.g. an avalanche photo diode (APD) or a single photon avalanche diode (SPAD), a PIN diode or a photomultiplier. Objects can be detected, for example, at a distance of up to 60 m, up to 300 m or up to 600 m using the LIDAR system. A range of 300 m corresponds to a signal path of 600 m, from which, for example, a measuring time window or a measuring duration of 2 μs can result.

As already described, optical reflection elements in a LIDAR Sensor System may include micro-electrical mirror systems (MEMS) and/or digital mirrors (DMD) and/or digital light processing elements (DLP) and/or a galvo-scanner for control of the emitted laser beam pulses and/or reflection of an object-back-scattered laser pulses onto a sensor surface. Advantageously, a plurality of mirrors is provided. These may particularly be arranged in some implementations in the manner of a matrix. The mirrors may be individually and separately, independently of each other rotatable or movable.

The individual mirrors can each be part of a so-called micro mirror unit or "Digital Micro-Mirror Device" (DMD). A DMD can have a multiplicity of mirrors, in particular micro-mirrors, which can be rotated at high frequency between at least two positions. Each mirror can be individually adjustable in its angle and can have at least two stable positions, or with other words, in particular stable, final states, between which it can alternate. The number of mirrors can correspond to the resolution of a projected image, wherein a respective mirror can represent a light pixel on the area to be irradiated. A "Digital Micro-Mirror Device" is a micro-electromechanical component for the dynamic modulation of light.

Thus, the DMD can for example provide suited illumination for a vehicle low and/or a high beam. Furthermore, the DMD may also serve projection light for projecting images, logos, and information on a surface, such as a street or surrounding object. The mirrors or the DMD can be designed as a micro-electromechanical system (MEMS). A movement of the respective mirror can be caused, for example, by energizing the MEMS. Such micro-mirror arrays are available, for example, from Texas Instruments. The micro-mirrors are in particular arranged like a matrix, e.g. for example, in an array of 854×480 micro-mirrors, as in the DLP3030-Q1 0.3-inch DMP mirror system optimized for automotive applications by Texas Instruments, or a 1920×1080 micro-mirror system designed for home projection applications 4096×2160 Micro-mirror system designed for 4K cinema projection applications, but also usable in a vehicle application. The position of the micro-mirrors is, in particular, individually adjustable, for example with a clock rate of up to 32 kHz, so that predetermined light patterns can be coupled out of the headlamp by corresponding adjustment of the micro-mirrors.

In some embodiments, the used MEMS arrangement may be provided as a 1D or 2D MEMS arrangement. In a 1D MEMS, the movement of an individual mirror takes place in a translatory or rotational manner about an axis. In 2D MEMS, the individual mirror is gimballed and oscillates about two axes, whereby the two axes can be individually employed so that the amplitude of each vibration can be adjusted and controlled independently of the other.

Furthermore, a beam radiation from the light source can be deflection through a structure with at least one liquid crystal element, wherein one molecular orientation of the at least one liquid crystal element is adjustable by means of an electric field. The structure through which the radiation to be aligned is guided can comprise at least two sheet-like elements coated with electrically conductive and transparent coating material. The plate elements are in some embodiments transparent and spaced apart from each other in parallel. The transparency of the plate elements and the electrically conductive coating material allows transmission of the radiation. The electrically conductive and transparent coating material can at least partially or completely made of a material with a high electrical conductivity or a small electrical resistance such as indium tin oxide (ITO) and/or of a material with a low electrical conductivity or a large electrical resistance such as poly-3,4-ethylenedioxythiophene (PEDOT).

The generated electric field can be adjustable in its strength. The electric field can be adjustable in particular by applying an electrical voltage to the coating material or the coatings of the plate elements. Depending on the size or height of the applied electrical voltages on the coating materials or coatings of the plate elements formed as described above, differently sized potential differences and thus a different electrical field are formed between the coating materials or coatings.

Depending on the strength of the electric field, that is, depending on the strength of the voltages applied to the coatings, the molecules of the liquid crystal elements may align with the field lines of the electric field.

Due to the differently oriented liquid crystal elements within the structure, different refractive indices can be achieved. As a result, the radiation passing through the structure, depending on the molecular orientation, moves at different speeds through the liquid crystal elements located between the plate elements. Overall, the liquid crystal elements located between the plate elements have the function of a prism, which can deflect or direct incident radiation. As a result, with a correspondingly applied voltage to the electrically conductive coatings of the plate elements, the radiation passing through the structure can be oriented or deflected, whereby the deflection angle can be controlled and varied by the level of the applied voltage.

Furthermore, a combination of white or colored light sources and infrared laser light sources is possible, in which the light source is followed by an adaptive mirror arrangement, via which radiation emitted by both light sources can be steered or modulated, a sensor system being used for the infrared light source intended for environmental detection. The advantage of such an arrangement is that the two light systems and the sensor system use a common adaptive mirror arrangement. It is therefore not necessary to provide for the light system and the sensor system each have their own mirror arrangement. Due to the high degree of integration space, weight and in particular costs can be reduced.

In LIDAR systems, differently designed transmitters and receiver concepts are also known in order to be able to record the distance information in different spatial directions. Based on this, a two-dimensional image of the environment is then generated, which contains the complete three-dimensional coordinates for each resolved spatial point. The different LIDAR topologies can be abstractly distinguished based on how the image resolution is displayed. Namely, the resolution can be represented either exclusively by an angle-sensitive detector, an angle-sensitive emitter, or a combination of both. A LIDAR system, which generates its resolution exclusively by means of the detector, is called a Flash LIDAR. It includes of an emitter, which illuminates as homogeneously as possible the entire field of vision. In contrast, the detector in this case includes of a plurality of individually readable and arranged in a matrix segments or pixels. Each of these pixels is correspondingly assigned a solid angle range. If light is received in a certain pixel, then the light is correspondingly derived from the solid angle region assigned to this pixel. In contrast to this, a raster or scanning LIDAR has an emitter which emits the measuring pulses selectively and in particular temporally sequentially in different spatial directions. Here a single sensor segment is sufficient as a detector. If, in this case, light is received by the detector in a specific measuring time window, then this light comes from a solid angle range into which the light was emitted by the emitter in the same measuring time window.

To improve Signal-to-Noise Ratio (SNR), a plurality of the above-described measurements or single-pulse measurements can be netted or combined with each other in a LIDAR Sensor System, for example to improve the signal-to-noise ratio by averaging the determined measured values.

The radiation emitted by the light source is in some embodiments infrared (IR) radiation emitted by a laser diode in a wavelength range of 600 nm to 850 nm. However, wavelengths up to 1064 nm, up to 1600 nm, up to 5600 nm or up to 8100 nm are also possible. The radiation of the laser diode can be emitted in a pulse-like manner with a frequency between 1 kHz and 1 MHz, in some implementations with a frequency between 10 kHz and 100 kHz. The laser pulse duration may be between 0.1 ns and 100 ns, in some implementations between 1 ns and 2 ns. As a type of the IR radiation emitting laser diode, a VCSEL (Vertical Cavity Surface Emitting Laser) can be used, which emits radiation with a radiation power in the "milliwatt" range. However, it is also possible to use a VECSEL (Vertical External Cavity Surface Emitting Laser), which can be operated with high pulse powers in the wattage range. Both the VCSEL and the VECSEL may be in the form of an array, e.g. 15×20 or 20×20 laser diodes may be arranged so that the summed radiation power can be several hundred watts. If the lasers pulse simultaneously in an array arrangement, the largest summed radiation powers can be achieved. The emitter units may differ, for example, in their wavelengths of the respective emitted radiation. If the receiver unit is then also configured to be wavelength-sensitive, the pulses can also be differentiated according to their wavelength.

Further embodiments relating to the functionality of various components of a LIDAR Sensor System, for example light sources, sensors, mirror systems, laser driver, control equipment, are described in Chapter "Components".

The appendix "EXPLANATIONS AND GLOSSARY" describes further aspects of the referenced and used technical terms It is an object of the disclosure to propose improved components for a LIDAR Sensor System and/or to propose improved solutions for a LIDAR Sensor System and/or for a LIDAR Sensor Device and/or to propose improved methods for a LIDAR Sensor System and/or for a LIDAR Sensor Device.

The object is achieved according to the features of the independent claims. Further aspects of the disclosure are given in the dependent claims and the following description.

Figure 20:
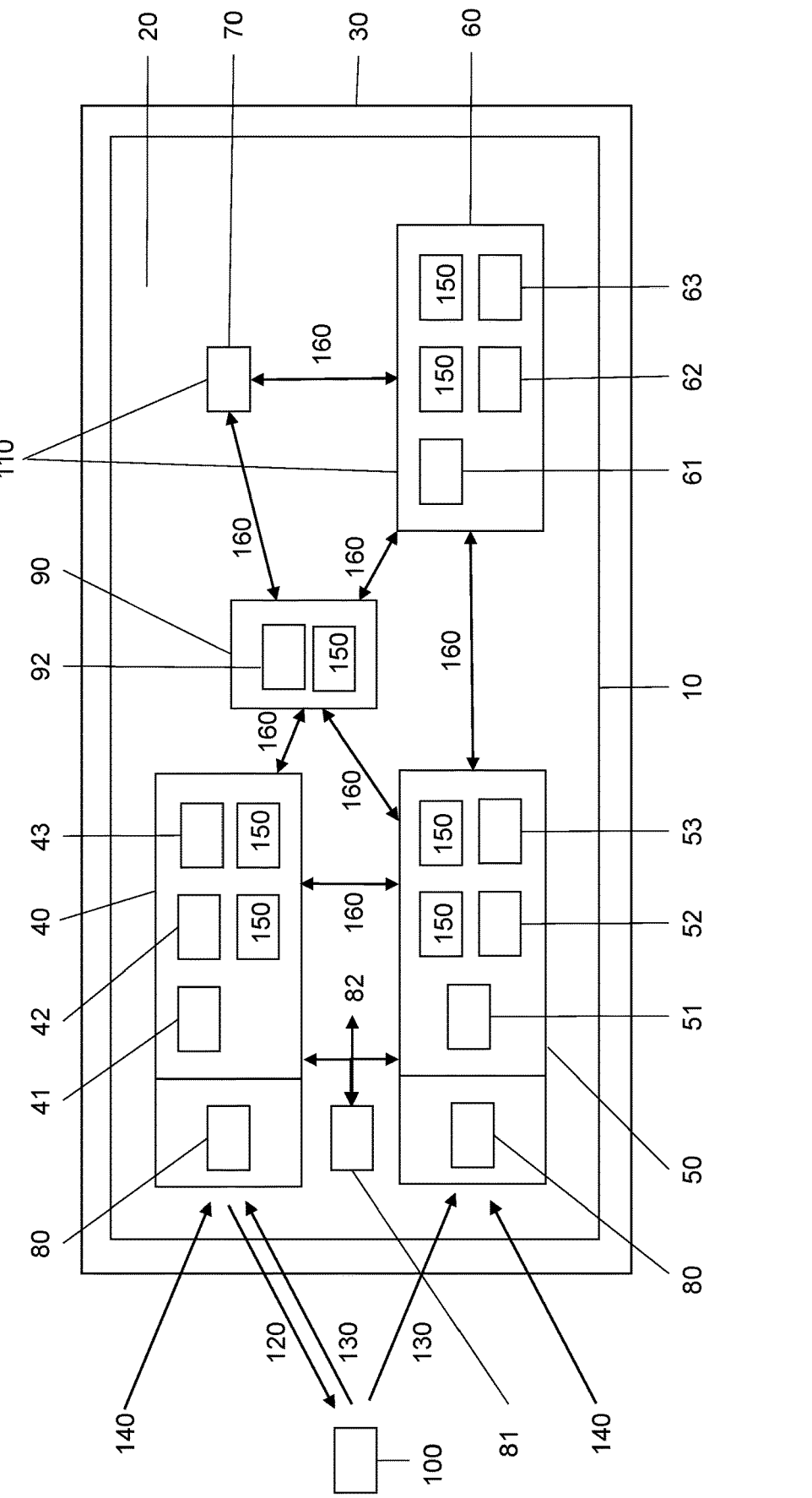
FIG. 20 shows schematically an embodiment of the proposed LIDAR Sensor System, Controlled LIDAR Sensor System and LIDAR Sensor Device

FIG. 20 shows schematically an embodiment of the proposed LIDAR Sensor System, Controlled LIDAR Sensor System and LIDAR Sensor Device.

The LIDAR Sensor System 10 comprises a First LIDAR Sensing System 40 that may comprise a Light Source 42 configured to emit electro-magnetic or other radiation 120, in particular a continuous-wave or pulsed laser radiation in the blue and/or infrared wavelength range, a Light Source Controller 43 and related Software, Beam Steering and Modulation Devices 41, in particular light steering and reflection devices, for example Micro-Mechanical Mirror Systems (MEMS), with a related control unit 150, Optical components 80, for example lenses and/or holographic elements, a LIDAR Sensor Management System 90 configured to manage input and output data that are required for the proper operation of the First LIDAR Sensing System 40.

The First LIDAR Sensing System 40 may be connected to other LIDAR Sensor System devices, for example to a Control and Communication System 70 that is configured to manage input and output data that are required for the proper operation of the First LIDAR Sensor System 40.

The LIDAR Sensor System 10 may include a Second LIDAR Sensing System 50 that is configured to receive and measure electromagnetic or other radiation, using a variety of Sensors 52 and Sensor Controller 53.

The Second LIDAR Sensing System may comprise Detection Optics 82, as well as Actuators for Beam Steering and Control 51.

The LIDAR Sensor System 10 may further comprise a LIDAR Data Processing System 60 that performs Signal Processing 61, Data Analysis and Computing 62, Sensor Fusion and other sensing Functions 63.

The LIDAR Sensor System 10 may further comprise a Control and Communication System 70 that receives and outputs a variety of signal and control data 160 and serves as a Gateway between various functions and devices of the LIDAR Sensor System 10.

The LIDAR Sensor System 10 may further comprise one or many Camera Systems 81, either stand-alone or combined with another Lidar Sensor System 10 component or embedded into another Lidar Sensor System 10 component, and data-connected to various other devices like to components of the Second LIDAR Sensing System 50 or to components of the LIDAR Data Processing System 60 or to the Control and Communication System 70.

The LIDAR Sensor System 10 may be integrated or embedded into a LIDAR Sensor Device 30, for example a housing, a vehicle, a vehicle headlight.

The Controlled LIDAR Sensor System 20 is configured to control the LIDAR Sensor System 10 and its various components and devices, and performs or at least assists in the navigation of the LIDAR Sensor Device 30. The Controlled LIDAR Sensor System 20 may be further configured to communicate for example with another vehicle or a communication networks and thus assists in navigating the LIDAR Sensor Device 30.

As explained above, the LIDAR Sensor System 10 is configured to emit electro-magnetic or other radiation in order to probe the environment 100 for other objects, like cars, pedestrians, road signs, and road obstacles. The LIDAR Sensor System 10 is further configured to receive and measure electromagnetic or other types of object-reflected or object-emitted radiation 130, but also other wanted or unwanted electromagnetic radiation 140, in order to generate signals 110 that can be used for the environmental mapping process, usually generating a point cloud that is representative of the detected objects.

Various components of the Controlled LIDAR Sensor System 20 use Other Components or Software 150 to accomplish signal recognition and processing as well as signal analysis. This process may include the use of signal information that come from other sensor devices.

Chapter "Components"

The LIDAR Sensor System according to the present disclosure may be combined with a LIDAR Sensor Device connected to a light control unit for illumination of an environmental space.

As already described in this disclosure, various types of photo diodes may be used for the detection of light or light pulses in a respective sensor pixel, e.g. one or more of the following types of photo diodes:

pin photo diode;

passive and active pixel sensors (APS), like CCD or CMOS;

avalanche photo diode operated in a linear mode (APD);

avalanche photo diode operated in the Geiger mode to detect single photons (single-photon avalanche photo diode, SPAD).

It should be noted that in the context of this disclosure, photo diodes are understood to be of different photo diode types even though the structure of the photo diodes is the same (e.g. the photo diodes are all pin photo diodes), but the photo diodes are of different size or shape or orientation and/or may have different sensitivities (e.g. due to the application of different reverse-bias voltages to the photo diodes). Illustratively, a photo diode type in the context of this disclosure is not only defined by the type of construction of the photo diode, but also by their sizes, shapes, orientation and/or ways of operation, and the like.

A two-dimensional array of sensor pixels (and thus a two-dimensional array of photo diodes) may be provided for an imaging of two-dimensional images. In this case, an optical signal converted into an electronic signal may be read-out individually per sensor pixel, comparable with a CCD or CMOS image sensor. However, it may be provided to interconnect a plurality of sensor pixels in order to achieve a higher sensitivity by achieving a higher signal strength. This principle may be applied, but is not limited, to the principle of the "silicon photomultiplier" (SiPM). In this case, a plurality (in the order of 10 to 1000 or even more) of individual SPADs are connected in parallel. Although each single SPAD reacts to the first incoming photon (taking into consideration the detection probability), the sum of a lot of SPAD signals results in a quasi analog signal, which may be used to derive the incoming optical signal.

In contrast to the so-called Flash LIDAR Sensor System, in which the entire sensor array (which may also be referred to as detector array) is illuminated at once, there are several LIDAR concepts which use a combination of a one-dimensional beam deflection or a two-dimensional beam deflection with a two-dimensional detector array. In such a case, a circular or linear (straight or curved) laser beam may be transmitted and may be imaged via a separate, fixedly mounted receiver optics onto the sensor array (detector array). In this case, only predefined pixels of the sensor array are illuminated, dependent on the transmitter/receiver optics and the position of the beam deflection device. The illuminated pixels are read out and, the non-illuminated pixels are not read out. Thus, unwanted signals (e.g. background light) e.g. coming from the non-illuminated and therefore not read out pixels are suppressed. Depending on the dimensions of the transmitter/receiver optics it may be feasible to illuminate more pixels or less pixels, e.g. by de-focusing of the receiver optics. The de-focusing process may be adjusted adaptively, for example, depending on the illuminated scene and signal response of backscattered light. The most suitable size of the illumination spot on the surface of the sensor 52 does not necessarily need to coincide with the geometric layout of the pixels on the sensor array. By way of example, if the spot is positioned between two (or four) pixels, then two (or four) pixels will only be partially illuminated. This may also result in a bad signal-to-noise ratio due to the non-illuminated pixel regions.

In various embodiments, control lines (e.g. column select lines carrying the column select signals and row select lines carrying the row select signals) may be provided to selectively interconnect a plurality of photo diodes to define a "virtual pixel", which may be optimally adapted to the respective application scenario and the size of the laser spot on the sensor array. This may be implemented by row selection lines and column selection lines, similar to the access and control of memory cells of a DRAM memory. Furthermore, various types of photo diodes (in other words, various photo diode types) may be implemented (e.g. monolithically integrated) on one common sensor 52 and may be driven, accessed and read out separately, for example.

Moreover, in combination or independent from the interconnection of a plurality of pixels, the sensor may include several pixels including different types of photo diodes. In other words, various photo diode types may be monolithically integrated on the sensor 52 and may be accessed, controlled, or driven separately or the sensor pixel signals from pixels having the same or different photo diode types may be combined and analysed as one common signal.

By way of example, different photo diode types may be provided and individually controlled and read out, for example:

one or more pixels may have a single-photon avalanche photo diode for LIDAR applications;

one or more pixels may have a pin photo diode for camera applications (e.g. for the detection of the taillight or a headlight of a vehicle, or for thermal imaging using infrared sensitive sensors); and/or one or more pixels may have an avalanche photo diode for LIDAR applications.

Depending on the respective application, a photo diode of a pixel may be provided with an additional optical bandpass filter and/or polarization filter on pixel level connected upstream.

In general, a plurality of pixels of the sensor 52 may be interconnected.

There are many options as to how the pixels having the same or different photo diode types may be interconnected, such as:

pixels may have different photo diode types, such as photo diode of the same physical structure, but have different sizes of their respective sensor surface regions;

pixels may have different photo diode types, such as photo diode of the same physical structure, but have different sensitivities (e.g. due to different operation modes such as the application of different reverse-bias voltages); or pixels may have different photo diode types, such as photo diodes of different physical structures such as e.g. one or more pixels having a pin photo diode and/or one or more pixels having an avalanche photo diode and/or one or more pixels having a SPAD.

The interconnecting of pixels and thus the interconnecting of photo diodes (e.g. of pin photo diodes) may be provided based on the illumination conditions (in other words lighting conditions) of both, camera and/or LIDAR. With improving lighting conditions a smaller number of sensor pixels of the plurality of sensor pixels may be selected and combined. In other words, in case of good lighting conditions fewer pixels may be interconnected. This results in a lower light sensitivity, but it may achieve a higher resolution. In case of bad lighting conditions, e.g. when driving at night, more pixels may be interconnected. This results in a higher light sensitivity, but may suffer from a lower resolution.

In various embodiments, the sensor controller may be configured to control the selection network (see below for further explanation) based on the level of illuminance of the LIDAR Sensor System such that the better the lighting conditions (visible and/or infrared spectral range) are, the fewer selected sensor pixels of the plurality of sensor pixels will be combined.

The interconnecting of the individual pixels and thus of the individual photo diodes to a "virtual sensor pixel" allows an accurate adaptation of the size of the sensor pixel to the demands of the entire system such as e.g. the entire LIDAR Sensing System. This may occur e.g. in a scenario in which it is to be expected that the non-illuminated regions of the photo diodes provide a significant noise contribution to the wanted signal. By way of example, a variable definition (selection) of the size of a "pixel" ("virtual pixel") may be provided e.g. with avalanche photo diodes and/or silicon photomultipliers (SiPM), where the sensor 52 includes a large number of individual pixels including SPADs. In order to increase the dynamic region of a sensor having a distinct saturation effect (e.g. SiPM), the following interconnection may be implemented: the laser beam has a beam profile of decreasing intensity with increasing distance from the center of the laser beam. In principle, laser beam profiles can have different shapes, for example a Gaussian or a flat top shape. It is also to be noted that for a LIDAR measurement function, infrared as well as visible laser diodes and respectively suited sensor elements may be used.

If pixels were interconnected in the sensor array in the form of rings, for example circular or elliptical rings, around the expected center of the impinging (e.g. laser) beam, the center may, as a result, be saturated. However, the sensor pixels located in one or more rings further outside the sensor array may operate in the linear (non-saturated) mode due to the decreasing intensity and the signal intensity may be estimated. In various embodiments, the pixels of a ring may be interconnected to provide a plurality of pixel rings or pixel ring segments. The pixel rings may further be interconnect in a timely successive manner, e.g. in case only one sum signal output is available for the interconnected sensor pixels). In alternative embodiments, a plurality of sum signal outputs may be provided or implemented in the sensor array which may be coupled to different groups of sensor pixels. In general, the pixels may be grouped in an arbitrary manner dependent on the respective requirements. The combination of different types of sensor pixels within one sensor 52 e.g. allows combining the functionality of a LIDAR sensor with the functionality of a camera in one common optics arrangement without the risk that a deviation will occur with respect to adjustment and calibration between the LIDAR and camera. This may reduce costs for a combined LIDAR/camera sensor and may further improve the data fusion of LIDAR data and camera data. As already mentioned above, camera sensors may be sensitive in the visible and/or infrared spectral range (thermographic camera).

Furthermore, the sensor controller 53 may control the sensor pixels taking into consideration the integration time (read out time) required by the respective photo diode of a pixel. The integration time may be dependent on the size of the photo diode. Thus, the clocking to control the read out process e.g. provided by the sensor controller 53, may be different for the different types of pixels and may change depending on the configuration of the pixel selection network.

FIG. 1 shows a portion 3800 of the sensor 52 in accordance with various embodiments. It is to be noted that the sensor 52 does not need to be a SiPM detector array. The sensor 52 includes a plurality of pixels 3802. Each pixel 3802 includes a photo diode. A light (laser) spot 3804 impinging on the surface of the portion 3800 of the sensor 52 is symbolized in FIG. 1 by a circle 3806. The light (laser) spot 3804 covers a plurality of sensor pixels 3802. A selection network may be provided which may be configured to selectively combine some pixels 3802 of the plurality of pixels 3802 to form an enlarged sensor pixel. The electrical signals provided by the photo diodes of the combined sensor pixels are accumulated. A read-out circuit may be provided which may be configured to read-out the accumulated electrical signals from the combined sensor pixels as one common signal.

The selection network may be configured to apply a plurality of row select signals 3808, 3810, 3812 (the number of row select signals may be equal to the number of rows of the sensor 52) to select the sensor pixels 3802 of the respectively selected row. To do this, the selection network may include a row multiplexer (not shown in FIG. 1). Furthermore, the selection network may be configured to apply a plurality of column select signals 3814, 3816, 3818 (the number of column select signals may be equal to the number of columns of the sensor 52) to select the pixels of the respectively selected column. To do this, the selection network may include a column multiplexer (not shown in FIG. 1).

FIG. 1 illustrates nine selected sensor pixels 3802 selected by the plurality of row select signals 3808, 3810, 3812 and the plurality of column select signals 3814, 3816, 3818. The light (laser) spot 3804 fully covers the nine selected sensor pixels 3820. Furthermore, the sensor controller 53 may provide a supply voltage 3822 to the sensor 52. The sensor signals 3824 provided by the selected sensor pixels 3820 are read out from the sensor 52 and supplied to one or more amplifiers via the selection network. It is to be noted that a light (laser) spot 3804 do not need to fully cover a selected sensor pixel 3820.

The individual selectability of each sensor pixel 3802 of the sensor 52 in a manner comparable with a selection mechanism of memory cells in a Dynamic Random Access Memory (DRAM) allows a simple and thus cost efficient sensor circuit architecture to quickly and reliably select one or more sensor pixels 3802 to achieve an evaluation of a plurality of sensor pixels at the same time. This may improve the reliability of the sensor signal evaluation of the second LIDAR sensor system 50.

Figure 2:
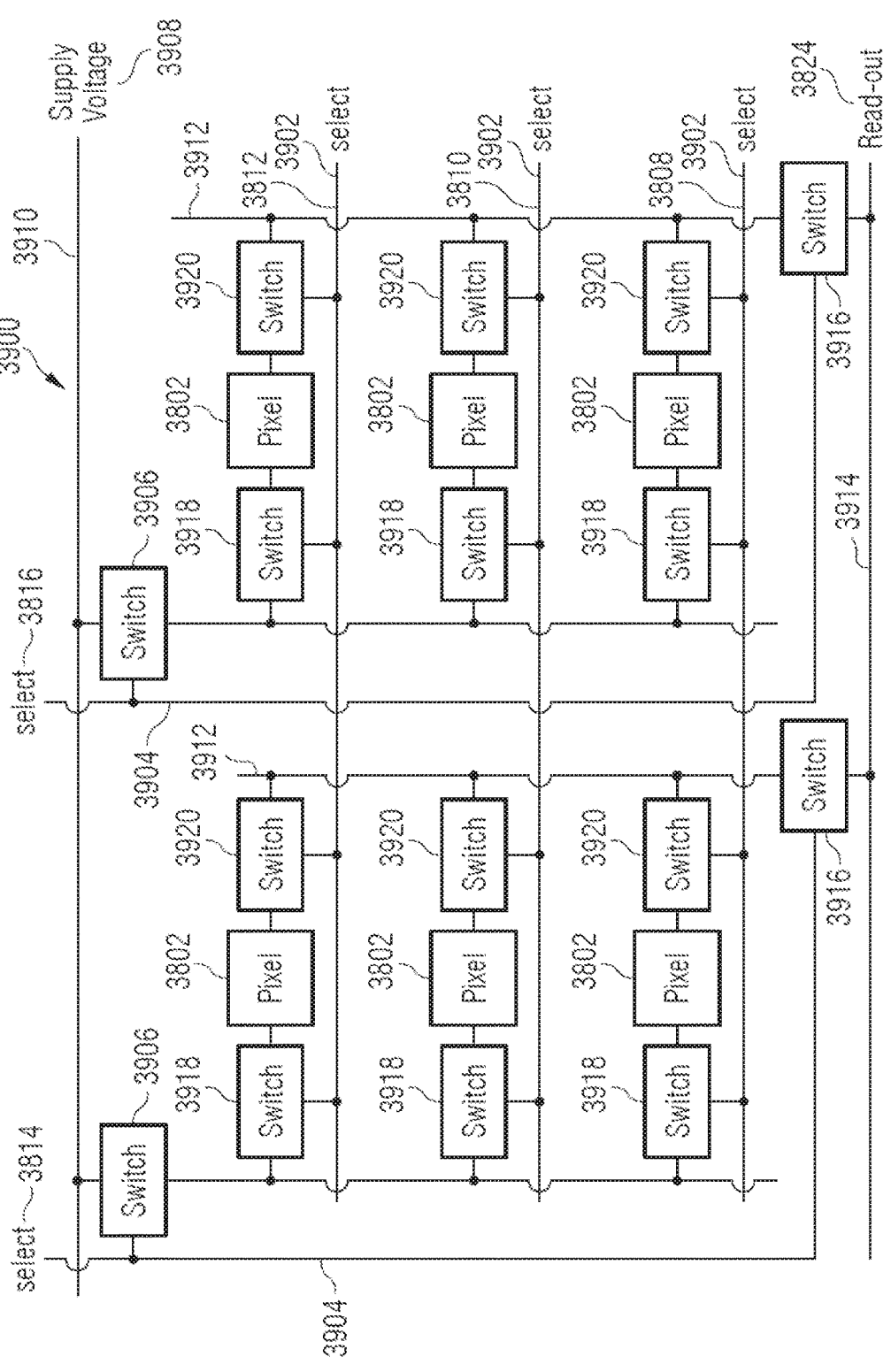
FIG. 2 shows a portion of a sensor in accordance with various embodiments in more detail.

FIG. 2 shows a portion 3900 of the sensor 52 in accordance with various embodiments in more detail.

The sensor 52 may include a plurality of row selection lines 3902, each row selection line 3902 being coupled to an input of the selection network, e.g. to an input of a row multiplexer of the selection network. The sensor 52 may further include a plurality of column selection lines 3904, each column selection line 3904 being coupled to another input of the selection network, e.g. to an input of a column multiplexer of the selection network. A respective column switch 3906 is coupled respectively to one of the column selection lines 3904 and is connected to couple the electrical supply voltage 3908 present on a supply voltage line 3910 to the sensor pixels 3802 coupled to the respective column selection line 3904 or to decouple the electrical supply voltage 3908 therefrom. Each sensor pixel 3802 may be coupled to a column read out line 3912, which is in turn coupled to a collection read out line 3914 via a respective column read out switch 3916. The column read out switches 3916 may be part of the column multiplexer. The sum of the current of the selected sensor pixels 3802, in other words the sensor signals 3824, may be provided on the collection read out line 3914. Each sensor pixel 3802 may further be coupled downstream of an associated column selection line 3904 via a respective column pixel switch 3918 (in other words, a respective column pixel switch 3918 is connected between a respective associated column selection line 3904 and an associated sensor pixel 3802). Moreover, each sensor pixel 3802 may further be coupled upstream of an associated column read out line 3912 via a respective column pixel read out switch 3920 (in other words, a respective column pixel read out switch 3920 is connected between a respective associated column read out line 3912 and an associated sensor pixel 3802). Each switch in the sensor 52 may be implemented by a transistor such as e.g. a field effect transistor (FET), e.g. a MOSFET. A control input (e.g. the gate terminal of a MOSFET) of each column pixel switch 3918 and of each column pixel read out switch 3920 may be electrically conductively coupled to an associated one of the plurality of row selection lines 3902. Thus, the row multiplexer may "activate" the column pixel switches 3918 and the pixel read out switches 3920 via an associated row selection line 3902. In case a respective column pixel switch 3918 and the associated pixel read out switch 3920 are activated, the associated column switch 3906 finally activates the respective sensor pixel 3802 by applying the supply voltage 3908 e.g. to the source of the MOSFET and (since e.g. the associated column pixel switch 3918 is closed) the supply voltage 3908 is also applied to the respective sensor pixel 3802. A sensor signal detected by the "activated" selected sensor pixel 3802 can be forwarded to the associated column read out line 3912 (since e.g. the associated column pixel read out switch 3920 is also closed), and, if also the associated column read out switch 3920 is closed, the respective sensor signal is transmitted to the collection read out line 3914 and finally to an associated amplifier (such as an associated TIA).

Figure 3:
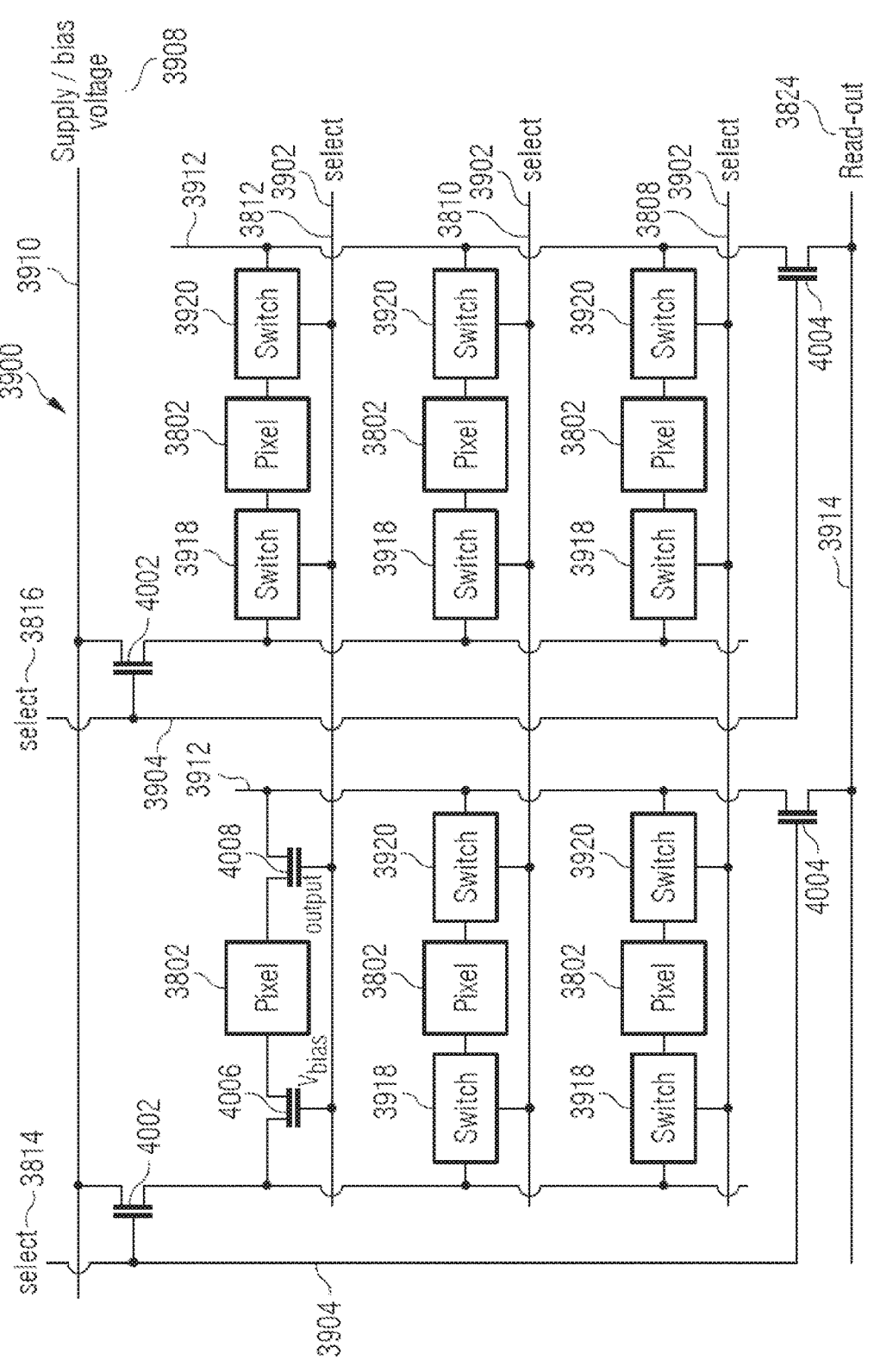
FIG. 3 shows a portion of a sensor in accordance with various embodiments in more detail.

By way of example and as shown in FIG. 3, the column switch 3906 may be implemented by a column switch MOSFET 4002;

the column read out switch 3916 may be implemented by a column read out switch MOSFET 4004 the column pixel switch 3918 may be implemented by a column pixel switch MOSFET 4006; and the column pixel read out switch 3920 may be implemented by a column pixel read out switch MOSFET 4008.

Figure 4:
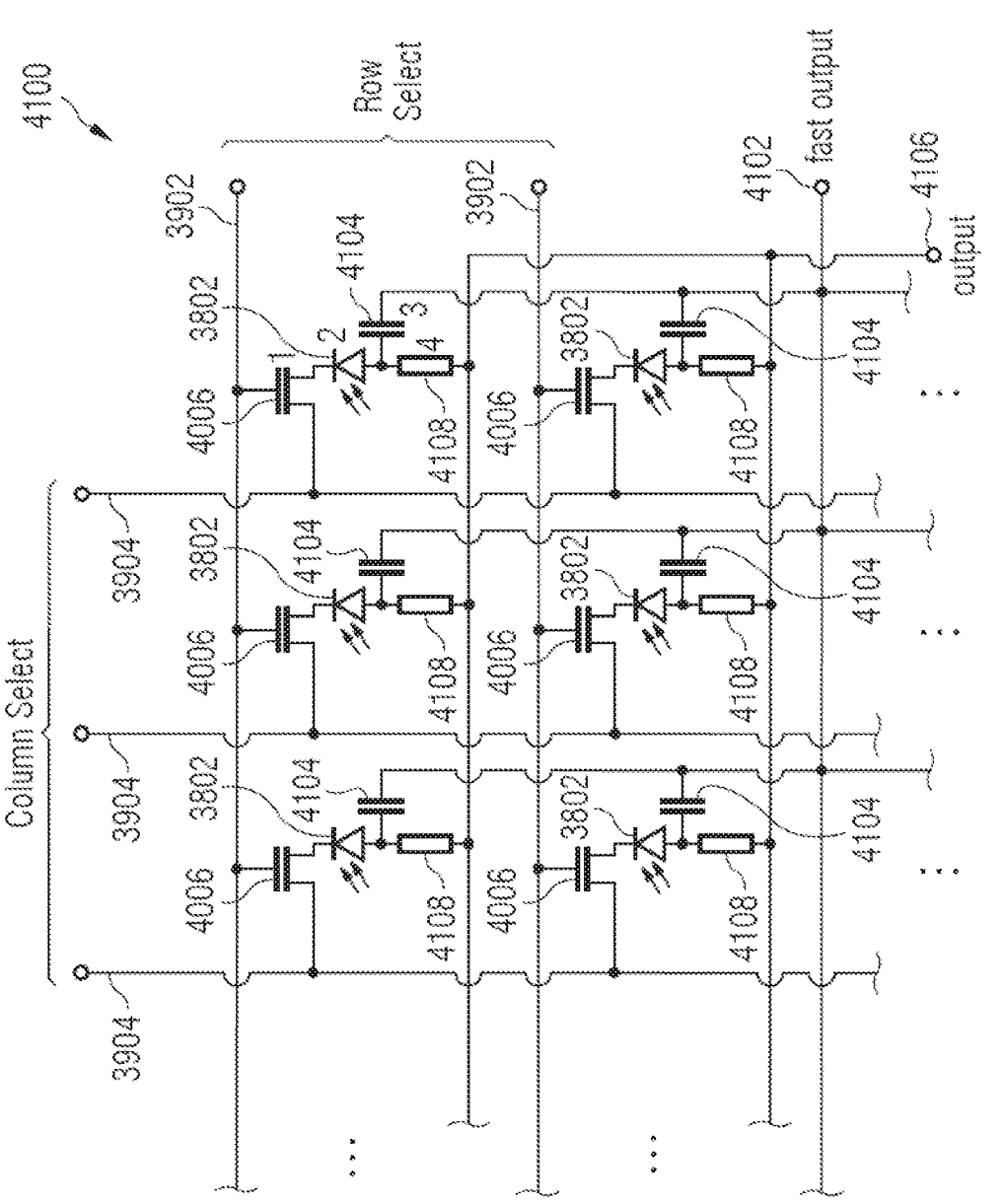
FIG. 4 shows a portion of a sensor in accordance with various embodiments in more detail.

FIG. 4 shows a portion 4100 of the sensor 52 in accordance with various embodiments in more detail.

In various embodiments, the column pixel read out switch 3920 may be dispensed with in a respective sensor pixel 3802. The embodiments shown in FIG. 41 may e.g. be applied to a SiPM as a sensor 52. Thus, the pixels 3802 may in this case be implemented as SPADs 3802. The sensor 52 further includes a first summation output 4102 for fast sensor signals. The first summation output 4102 may be coupled to the anode of each SPAD via a respective coupling capacitor 4104. The sensor 52 in this example further includes a second summation output 4106 for slow sensor signals. The second summation output 4106 may be coupled to the anode of each SPAD via a respective coupling resistor (which in the case of an SPAD as the photo diode of the pixel may also be referred to as quenching resistor) 4108.

Figure 5:
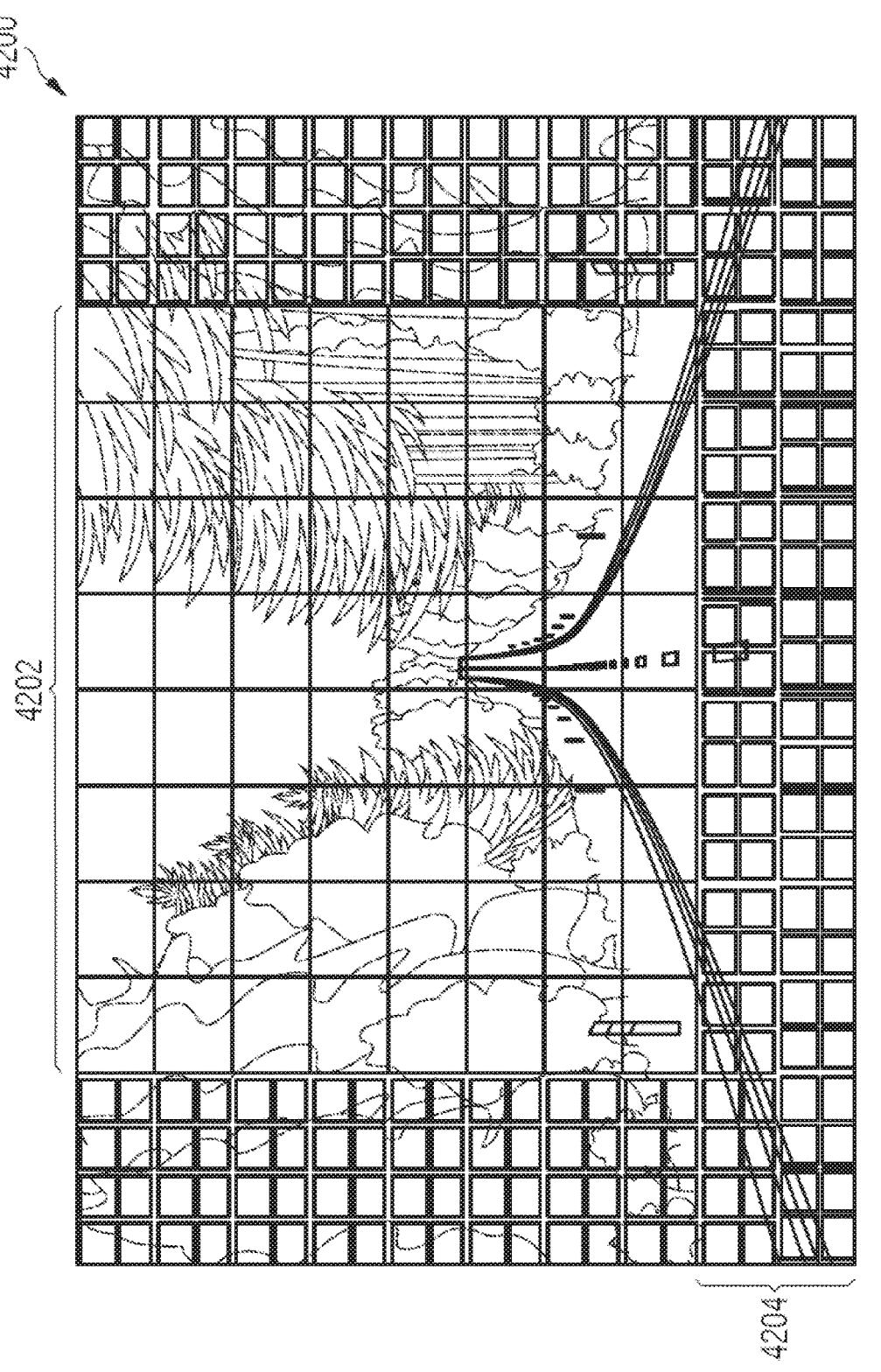
FIG. 5 shows a recorded scene and the sensor pixels used to detect the scene in accordance with various embodiments in more detail.

FIG. 5 shows a recorded scene 4200 and the sensor pixels used to detect the scene in accordance with various embodiments in more detail.

As described above, the sensor 52 may have sensor pixels 3802 with photo diodes having different sensitivities. In various embodiments, an edge region 4204 may at least partially surround a center region 4202. In various embodiments, the center region 4202 may be provided for a larger operating range of the LIDAR Sensor System and the edge region 4204 may be provided for a shorter operating range. The center region 4202 may represent the main moving (driving, flying or swimming) direction of a vehicle and thus usually needs a far view to recognize an object at a far distance. The edge region 4204 may represent the edge region of the scene and usually, in a scenario where a vehicle (e.g. a car) is moving, objects 100, which may be detected, are usually nearer than in the main moving direction in which the vehicle is moving. The larger operating range means that the target object 100 return signal has a rather low signal intensity. Thus, sensor pixels 3802 with photo diodes having a higher sensitivity may be provided in the center region 4202. The shorter operating range means that the target object 100 return signal has a rather high (strong) signal intensity. Thus, sensor pixels 3802 with photo diodes having a lower sensitivity may be provided in the edge region 4204. In principle, however, the patterning of the sensor pixels (type, size, and sensitivity) may be configured for specific driving scenarios and vehicle types (bus, car, truck, construction vehicles, drones, and the like). This means that, for example, the sensor pixels 3802 of the edge regions 4204 may have a high sensitivity. It should also be stated that, if a vehicle uses a variety of LIDAR/Camera sensor systems, these may be configured differently, even when illuminating and detecting the same Field-of-View.

Figure 6:
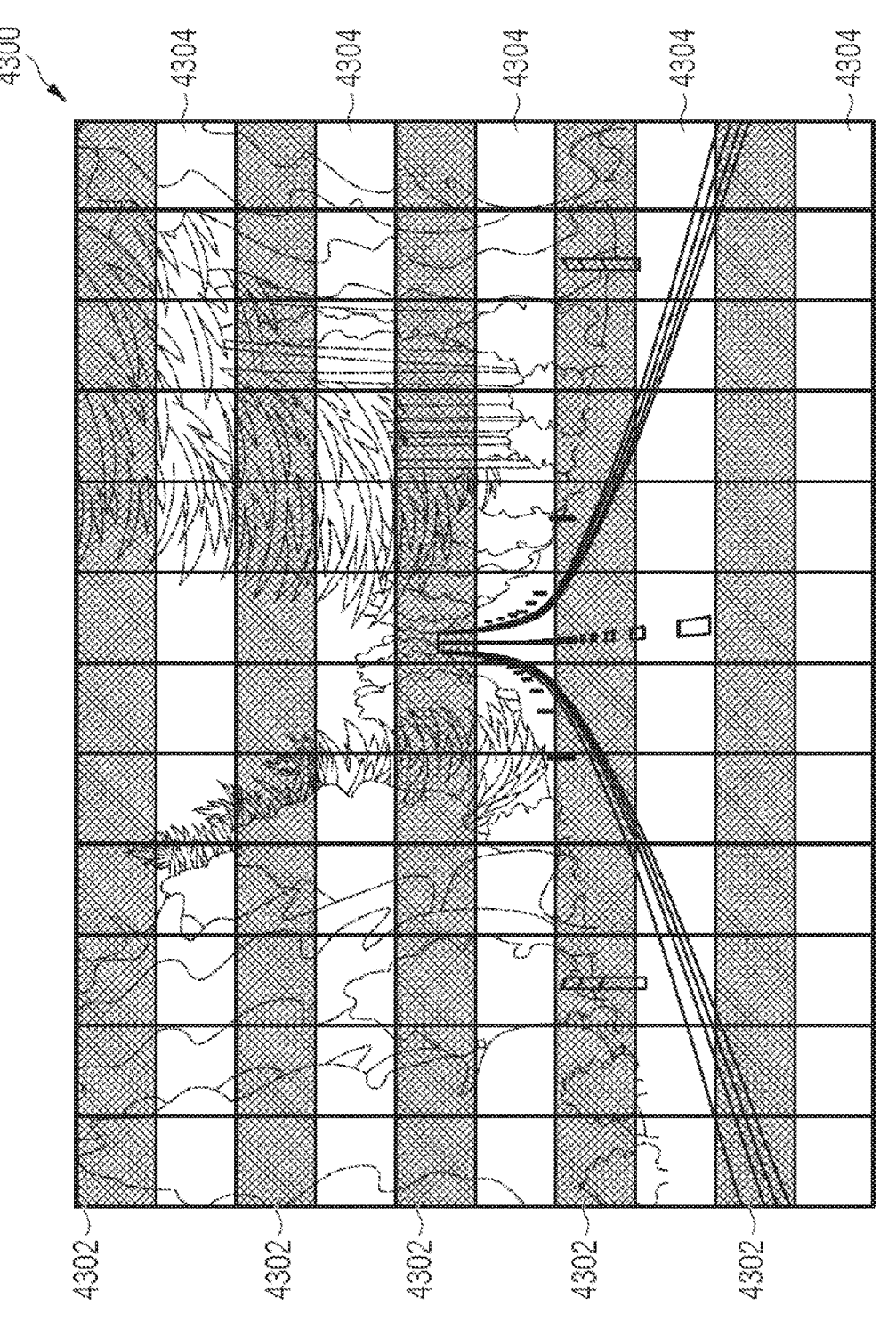
FIG. 6 shows a recorded scene and the sensor pixels used to detect the scene in accordance with various embodiments in more detail.

FIG. 6 shows a recorded scene 4300 and the sensor pixels 3802 used to detect the scene 4300 in accordance with various embodiments in more detail.

In various embodiments, a row-wise arrangement of the sensor pixels of the same photo diode type may be provided. By way of example, a first row 4302 may include pixels having APDs for a Flash LIDAR Sensor System and a second row 4304 may include pixels having pin photo diodes for a camera. The two respectively adjacent pixel rows may be provided repeatedly so that the rows of different pixels are provided, for example, in an alternating manner. However, the sequence and number of pixels rows of the same photo diode type could vary and likewise the grouping into specific selection networks. It is also to be noted that a row of pixels or columns may employ different photo diode types. Also, a row or column must not be completely filled up with photo diodes. The own motion of a vehicle may compensate for the reduced resolution of the sensor array ("push-broom scanning" principle).

The different rows may include various photo diode types, such as for example:

first row: pixels having APDs (LIDAR)

second row: pixels having pin photo diodes (camera).

first row: pixels having first polarization plane second row: pixels having different second polarization plane.

This may allow the differentiation between directly incoming light beams and reflected light beams (e.g. vehicle, different surfaces of an object).

first row: pixels having first pin photo diodes (configured to detect light having wavelengths in the visible spectrum)

second row: pixels having second pin photo diodes (configured to detect light having wavelengths in the near infrared (NIR) spectrum).

This may allow the detection of taillights as well as an infrared (IR) illumination.

The sensor controller 53 may be configured to select the respective pixels 3802 in accordance with the desired photo diode type in a current application.

FIG. 7 shows a flow diagram illustrating a method 4400 for a LIDAR Sensor System in accordance with various embodiments in more detail.

The LIDAR Sensor System may include a plurality of sensor pixels. Each sensor pixel includes at least one photo diode. The LIDAR Sensor System may further include a selection network, and a read-out circuit. The method 4400 may include, in 4402, the selection network selectively combining some sensor pixels of the plurality of sensor pixels to form an enlarged sensor pixel. The electrical signals provided by the photo diodes of the combined sensor pixels are accumulated. The method 4400 may further include, in 4404, the read-out circuit reading-out the accumulated electrical signals from the combined sensor pixels as one common signal.

FIG. 8 shows a flow diagram illustrating another method 4500 for a LIDAR Sensor System in accordance with various embodiments in more detail.

The LIDAR Sensor System may include a plurality of a plurality of pixels. A first pixel of the plurality of pixels includes a photo diode of a first photo diode type, and a second pixel of the plurality of pixels includes a photo diode of a second photo diode type. The second photo diode type is different from the first photo diode type. The LIDAR Sensor System may further include a pixel sensor selector and a sensor controller. The method 4500 may include, in 4502, the pixel sensor selector selecting at least one of the first pixel including a photo diode of the first photo diode type and/or at least one of the second pixel including a photo diode of the second photo diode type, and, in 4504, the sensor controller controlling the pixel selector to select at least one first pixel and/or at least one second pixel.

Moreover, it is to be noted that the light (laser) emission (e.g. provided by a plurality of light (laser) sources, which may be operated in a group-wise manner) may be adapted in its light intensity pattern to the pixel distribution or arrangement of the sensor 52, e.g. it may be adapted such that larger pixels may be charged with light having a higher intensity than smaller pixels. This may be provided in an analog manner with respect to photo diodes having a higher and lower sensitivity, respectively.

In various embodiments, in the LIDAR sensor system as described with reference to FIG. 1 to FIG. 8, a first sensor pixel may include a photo diode of a first photo diode type and a second pixel of the plurality of pixels may include a photo diode of a second photo diode type. The second photo diode type is different from the first photo diode type. In various embodiments, the both photo diodes may be stacked one above the other in a way as generally described in the embodiments as described with reference to FIG. 9 to FIG. 16.

In the following, various aspects of this disclosure will be illustrated:

Example 1d is a LIDAR Sensor System. The LIDAR Sensor System includes a plurality of sensor pixels, each sensor pixel including at least one photo diode. The LIDAR Sensor System further includes a selection network configured to selectively combine some sensor pixels of the plurality of sensor pixels to form an enlarged sensor pixel. The electrical signals provided by the photo diodes of the combined sensor pixels are accumulated. The LIDAR Sensor System further includes a read-out circuit configured to read-out the accumulated electrical signals from the combined sensor pixels as one common signal.

In Example 2d, the subject matter of Example 1d can optionally include that the at least one photo diode includes at least one pin diode.

In Example 3d, the subject matter of Example 1d can optionally include that the at least one photo diode includes at least one avalanche photo diode.

In Example 4d, the subject matter of Example 3d can optionally include that the at least one avalanche photo diode includes at least one single-photon avalanche photo diode.

In Example 5d, the subject matter of any one of Examples 1d to 4d can optionally include that the plurality of sensor pixels are arranged in a sensor matrix in rows and columns.

In Example 6d, the subject matter of any one of Examples 1d to 5d can optionally include that the selection network includes a plurality of row selection lines, each row selection line being electrically conductively coupled to at least some sensor pixels of the same row, a plurality of column selection lines, each column selection line being electrically conductively coupled to at least some sensor pixels of the same column, and a plurality of read-out lines, each read-out line being electrically conductively coupled to at least some sensor pixels of the same column or the same row to accumulate the electrical signals provided by the combined sensor pixels.

In Example 7d, the subject matter of any one of Examples 1d to 6d can optionally include that each sensor pixel of at least some of the sensor pixels includes a first switch connected between the selection network and a first terminal of the sensor pixel, and/or a second switch connected between a second terminal of the sensor pixel and the selection network.

In Example 8d, the subject matter of Examples 6d and 7d can optionally include that the first switch is connected between a column selection line of the plurality of column selection lines and the first terminal of the sensor pixel, wherein a control terminal of the first switch is coupled to a row selection line of the plurality of row selection lines. The second switch is connected between the second terminal of the sensor pixel and a read-out line of the plurality of read-out lines. A control terminal of the second switch is coupled to a row selection line of the plurality of row selection lines.

In Example 9d, the subject matter of any one of Examples 7d or 8d can optionally include that at least one first switch and/or at least one second switch includes a field effect transistor.

In Example 10d, the subject matter of any one of Examples 1d to 9d can optionally include that the LIDAR Sensor System further includes a sensor controller configured to control the selection network to selectively combine some sensor pixels of the plurality of sensor pixels to form the enlarged sensor pixel.

In Example 11d, the subject matter of Example 10d can optionally include that the sensor controller is configured to control the selection network based on the level of illuminance of the LIDAR Sensor System such that with improving lighting conditions a smaller number of sensor pixels of the plurality of sensor pixels will be selected and combined.

In Example 12d, the subject matter of any one of Examples 1d to 11d can optionally include that the LIDAR Sensor System further includes a plurality of read-out amplifiers, each read-out amplifier coupled to an associated read-out line of the plurality of read-out lines.

In Example 13d, the subject matter of Example 12d can optionally include that the common signal is an electrical current. The plurality of read-out amplifiers includes a plurality of transimpedance amplifiers, each transimpedance amplifier configured to convert the associated electrical current into an electrical voltage.

Example 14d is a LIDAR Sensor System. The LIDAR Sensor System may include a plurality of pixels. A first pixel of the plurality of pixels includes a photo diode of a first photo diode type, and a second pixel of the plurality of pixels includes a photo diode of a second photo diode type. The second photo diode type is different from the first photo diode type. The LIDAR Sensor System may further include a pixel selector configured to select at least one of the first pixel including a photo diode of the first photo diode type and/or at least one of the second pixel including the photo diode of the second photo diode type, and a sensor controller configured to control the pixel selector to select at least one first pixel and/or at least one second pixel.

In Example 15d, the subject matter of Example 14d can optionally include that the sensor controller and the pixels are configured to individually read-out the photo diode of the first photo diode type and the photo diode of the second photo diode type.

In Example 16d, the subject matter of any one of Examples 14d or 15d can optionally include that the sensor controller and the pixels are configured to read-out the photo diode of the first photo diode type and the photo diode of the second photo diode type as one combined signal.

In Example 17d, the subject matter of any one of Examples 14d to 16d can optionally include that the photo diode of a first photo diode type and/or the photo diode of a second photo diode type are/is selected from a group consisting of: a pin photo diode; an avalanche photo diode; or a single-photon photo diode.

In Example 18d, the subject matter of any one of Examples 14d to 17d can optionally include that the LIDAR Sensor System further includes a selection network configured to selectively combine some pixels of the plurality of pixels to form an enlarged pixel, wherein the electrical signals provided by the photo diodes of the combined pixels are accumulated, and a read-out circuit configured to read-out the accumulated electrical signals from the combined pixels as one common signal.

In Example 19d, the subject matter of any one of Examples 14d to 18d can optionally include that the plurality of pixels are arranged in a sensor matrix in rows and columns.

In Example 20d, the subject matter of any one of Examples 14d to 19d can optionally include that the selection network includes a plurality of row selection lines, each row selection line being electrically conductively coupled to at least some pixels of the same row, a plurality of column selection lines, each column selection line being electrically conductively coupled to at least some pixels of the same column, and a plurality of read-out lines, each read-out line being electrically conductively coupled to at least some pixels of the same column or the same row to accumulate the electrical signals provided by the combined pixels.

In Example 21d, the subject matter of any one of Examples 14d to 20d can optionally include that each pixel of at least some of the pixels includes a first switch connected between the selection network and a first terminal of the pixel, and/or a second switch connected between a second terminal of the pixel and the selection network.

In Example 22d, the subject matter of Examples 20d and 21d can optionally include that the first switch is connected between a column selection line of the plurality of column selection lines and the first terminal of the pixel. A control terminal of the first switch is coupled to a row selection line of the plurality of row selection lines. The second switch is connected between the second terminal of the pixel and a read-out line of the plurality of read-out lines. A control terminal of the second switch is coupled to a row selection line of the plurality of row selection lines.

In Example 23d, the subject matter of any one of Examples 21d or 22d can optionally include that at least one first switch and/or at least one second switch comprises a field effect transistor.

In Example 24d, the subject matter of any one of Examples 14d to 23d can optionally include that the sensor controller is further configured to control the selection network to selectively combine some pixels of the plurality of pixels to form the enlarged pixel.

In Example 25d, the subject matter of Example 22d can optionally include that the sensor controller is configured to control the selection network based on the level of illuminance of the LIDAR Sensor System such that with improving lighting conditions a smaller number of sensor pixels of the plurality of sensor pixels will be selected and combined.

In Example 26d, the subject matter of any one of Examples 14d to 25d can optionally include that the LIDAR Sensor System further includes a plurality of read-out amplifiers, each read-out amplifier coupled to an associated read-out line of the plurality of read-out lines.

In Example 27d, the subject matter of Example 26d can optionally include that the common signal is an electrical current. The plurality of read-out amplifiers includes a plurality of transimpedance amplifiers, each transimpedance amplifier configured to convert the associated electrical current into an electrical voltage.

Example 28d is a method for a LIDAR Sensor System. The LIDAR Sensor System may include a plurality of sensor pixels. Each sensor pixel includes at least one photo diode. The LIDAR Sensor System may further include a selection network, and a read-out circuit. The method may include the selection network selectively combining some sensor pixels of the plurality of sensor pixels to form an enlarged sensor pixel, wherein the electrical signals provided by the photo diodes of the combined sensor pixels are accumulated, and the read-out circuit reading-out the accumulated electrical signals from the combined sensor pixels as one common signal.

In Example 29d, the subject matter of Example 28d can optionally include that the at least one photo diode includes at least one pin diode.

In Example 30d, the subject matter of Example 28d can optionally include that the at least one photo diode includes at least one avalanche photo diode.

In Example 31d, the subject matter of Example 30d can optionally include that the at least one avalanche photo diode includes at least one single-photon avalanche photo diode.

In Example 32d, the subject matter of any one of Examples 28d to 31d can optionally include that the plurality of sensors are arranged in a sensor matrix in rows and columns.

In Example 33d, the subject matter of any one of Examples 28d to 32d can optionally include that the selection network includes a plurality of row selection lines, each row selection line being electrically conductively coupled to at least some sensor pixels of the same row, a plurality of column selection lines, each column selection line being electrically conductively coupled to at least some sensor pixels of the same column, and a plurality of read-out lines, each read-out line being electrically conductively coupled to at least some sensor pixels of the same column or the same row to accumulate the electrical signals provided by the combined sensor pixels.

In Example 34d, the subject matter of any one of Examples 28d to 33d can optionally include that each sensor pixel of at least some of the sensor pixels includes a first switch connected between the selection network and a first terminal of the sensor pixel, and/or a second switch connected between a second terminal of the sensor pixel and the selection network.

In Example 35d, the subject matter of Example 33d and Example 34d can optionally include that the first switch is connected between a column selection line of the plurality of column selection lines and the first terminal of the sensor pixel. A control terminal of the first switch is controlled via a row selection line of the plurality of row selection lines. The second switch is connected between the second terminal of the sensor pixel and a read-out line of the plurality of read-out lines. A control terminal of the second switch is controlled via a row selection line of the plurality of row selection lines.

In Example 36d, the subject matter of any one of Examples 34d or 35d can optionally include that at least one first switch and/or at least one second switch comprises a field effect transistor.

In Example 37d, the subject matter of any one of Examples 28d to 36d can optionally include that the method further includes a sensor controller controlling the selection network to selectively combine some sensor pixels of the plurality of sensor pixels to form the enlarged sensor pixel.

In Example 38d, the subject matter of Example 37d can optionally include that the sensor controller controls the selection network based on the level of illuminance of the LIDAR Sensor System such that with improving lighting conditions a smaller number of sensor pixels of the plurality of sensor pixels will be selected and combined.

In Example 39d, the subject matter of any one of Examples 28d to 38d can optionally include that the LIDAR Sensor System further includes a plurality of read-out amplifiers, each read-out amplifier coupled to an associated read-out line of the plurality of read-out lines.

In Example 40d, the subject matter of Example 39d can optionally include that the common signal is an electrical current. The plurality of read-out amplifiers includes a plurality of transimpedance amplifiers. Each transimpedance amplifier converts the associated electrical current into an electrical voltage.

Example 41d is a method for a LIDAR Sensor System. The LIDAR Sensor System may include a plurality of a plurality of pixels. A first pixel of the plurality of pixels includes a photo diode of a first photo diode type, and a second pixel of the plurality of pixels includes a photo diode of a second photo diode type. The second photo diode type is different from the first photo diode type. The LIDAR Sensor System may further include a pixel sensor selector and a sensor controller. The method may include the pixel sensor selector selecting at least one of the first pixel including photo diode of the first photo diode type and/or at least one of the second pixel including the photo diode of the second photo diode type, and the sensor controller controlling the pixel selector to select at least one first pixel and/or at least one second pixel.

In Example 42d, the subject matter of Example 41d can optionally include that the photo diode of a first photo diode type and/or the photo diode of a second photo diode type are/is selected from a group consisting of: a pin photo diode, an avalanche photo diode, and/or a single-photon avalanche photo diode.

In Example 43d, the subject matter of any one of Examples 41d or 42d can optionally include that the method further includes a selection network selectively combining some sensors of the plurality of pixels to form an enlarged pixel, wherein the electrical signals provided by the photo diodes of the combined pixels are accumulated, and a read-out circuit reading out the accumulated electrical signals from the combined pixels as one common signal.

In Example 44d, the subject matter of any one of Examples 41d to 43d can optionally include that the plurality of pixels are arranged in a sensor matrix in rows and columns.

In Example 45d, the subject matter of any one of Examples 41d to 44d can optionally include that the selection network includes a plurality of row selection lines, each row selection line being electrically conductively coupled to at least some pixels of the same row, a plurality of column selection lines, each column selection line being electrically conductively coupled to at least some pixels of the same column, and a plurality of read-out lines, each read-out line being electrically conductively coupled to at least some pixels of the same column or the same row to accumulate the electrical signals provided by the combined pixels.

In Example 46d, the subject matter of any one of Examples 41d to 45d can optionally include that each pixel of at least some of the pixels includes a first switch connected between the selection network and a first terminal of the pixel, and/or a second switch connected between a second terminal of the pixel and the selection network.

In Example 47d, the subject matter of Example 45d and Example 46d can optionally include that the first switch is connected between a column selection line of the plurality of column selection lines and the first terminal of the pixel. A control terminal of the first switch is controlled via a row selection line of the plurality of row selection lines, and the second switch is connected between the second terminal of the pixel and a read-out line of the plurality of read-out lines. A control terminal of the second switch is controlled via a row selection line of the plurality of row selection lines.

In Example 48d, the subject matter of any one of Examples 46d or 47d can optionally include that at least one first switch and/or at least one second switch includes a field effect transistor.

In Example 49d, the subject matter of any one of Examples 41d to 48d can optionally include that the sensor controller is controlling the selection network to selectively combine some pixels of the plurality of pixels to form the enlarged pixel.

In Example 50d, the subject matter of Example 49d can optionally include that the sensor controller controls the selection network based on the level of illuminance of the LIDAR Sensor System such that with improving lighting conditions a smaller number of sensor pixels of the plurality of sensor pixels will be selected and combined.

In Example 51d, the subject matter of any one of Examples 41d to 50d can optionally include that the LIDAR Sensor System further includes a plurality of read-out amplifiers, each read-out amplifier coupled to an associated read-out line of the plurality of read-out lines.

In Example 52d, the subject matter of Example 51d can optionally include that the common signal is an electrical current. The plurality of read-out amplifiers includes a plurality of transimpedance amplifiers, each transimpedance amplifier converts the associated electrical current into an electrical voltage.

Example 53d is a computer program product. The computer program product may include a plurality of program instructions that may be embodied in non-transitory computer readable medium, which when executed by a computer program device of a LIDAR Sensor System according to any one of examples 1d to 27d, cause the LIDAR Sensor System to execute the method according to any one of the examples 28d to 52d.

Example 54d is a data storage device with a computer program that may be embodied in non-transitory computer readable medium, adapted to execute at least one of a method for LIDAR Sensor System according to any one of the above method examples or a LIDAR Sensor System according to any one of the above LIDAR Sensor System examples.

The LIDAR Sensor System according to the present disclosure may be combined with a LIDAR Sensor Device for illumination of an environmental space connected to a light control unit.

In the LIDAR Sensor System, a combination of a LIDAR sensor and a camera sensor may be desired e.g. in order to identify an object or characteristics of an object by means of data fusion. Furthermore, depending on the situation, either a three dimensional measurement by means of a LIDAR sensor or a two dimensional mapping by means of a camera sensor may be desired. By way of example, a LIDAR sensor alone usually cannot determine whether taillights of a vehicle are switched on or switched off.

In a conventional combination of a LIDAR sensor and a camera sensor, two separate image sensors are provided and these are combined by means of a suitable optics arrangement (e.g. semitransparent mirrors, prisms, and the like). As a consequence, a rather large LIDAR sensor space is required and both partial optics arrangements of the optics arrangement and both sensors (LIDAR sensor and camera sensor) have to be aligned to each other with high accuracy. As an alternative, in the case of two separate mapping systems and thus two sensors, the relative positions of the optical axes of the two sensors to each other have to be determined with high accuracy to be able to take into consideration effects resulting from the geometric distance of the sensors from each other in a subsequent image processing to accurately match the images provided by the sensors. Furthermore, deviations of the relative orientation of the optical axes of the sensors should also be taken into consideration, since they have an effect on the calibration state. This may also incorporate the fact that the fields of view of both sensors do not necessarily coincide with each other and that regions possibly exist in a region in close proximity to the sensors in which an object cannot be detected by all sensors of the one or more other sensors simultaneously.

Various aspects of this disclosure may provide a LIDAR functionality at two different wavelengths or the combination of a LIDAR function and a camera function in a visible wavelength region or the combination of a LIDAR function and a camera function in a wavelength region of the thermal infrared as will be described in more detail below.

In a conventional LIDAR Sensor System, a combination of a LIDAR function with a camera function is usually implemented by means of two separate sensor systems and the relative position of the sensor systems to each other is taken into consideration in the image processing. In the context of a (movie or video) camera, there is an approach to use three individual image sensors instead of a CCD/CMOS image sensor array with color filters (Bayer pattern). The incoming light may be distributed over the three image sensors by means of an optics arrangement having full faced color filters (e.g. a trichroic beam splitter prism). In the context of a conventional photo camera efforts have been made to avoid the disadvantageous effects of the Bayer-Pattern-Color filter by providing a CMOS image sensor which uses the wavelength-dependent absorption of silicon in order to register different spectral colors in different depths of penetration.

Illustratively, the physical principle of the wavelength dependent depth of penetration of light into a carrier such as a semiconductor (e.g. silicon) substrate, which has (up to now) only been used in photo applications, is used in the field of the integration of a LIDAR sensor and a camera sensor in accordance with various embodiments.

To achieve this, two or more different types of photo diodes may be stacked above one another, i.e. one type of photo diode is placed over another type of photodiode. This may be implemented e.g. by a monolithic integration of the different types of photo diodes in one common process of manufacturing (or other types of integration processes such as wafer bonding or other three-dimensional processes). In various embodiments, a pin photo diode for the detection of visible light (e.g. red spectral region for the detection of car taillights) may be provided near to the surface of the carrier (e.g. substrate). In a deeper region of the carrier (e.g. in a deeper region of the substrate), there may be provided an avalanche photo diode (APD), which may be configured to detect light emitted by a laser emitter and having a wavelength in the near infrared region (NIR). The red light may in this case be detected near the surface of the pin photo diode due to its smaller depth of penetration. Substantially fewer portions of the light of the visible spectrum (VIS) may penetrate into the deeper region (e.g. deeper layers) in this case, so that the avalanche photo diode which is implemented there is primarily sensitive to NIR light.

The stacking of the photo diodes one above the other may be useful in that:

the sensor functions of pin photo diodes (camera) and APD (LIDAR) are always accurately aligned with respect to each other and only one receiving optical arrangement is required—in various embodiments, CCD or CMOS sensors may be provided—moreover, the camera may be configured as an infrared (IR) camera, as a camera for visible light or as a thermal camera or a combination thereof;

the incoming light is efficiently used.

Figure 9:
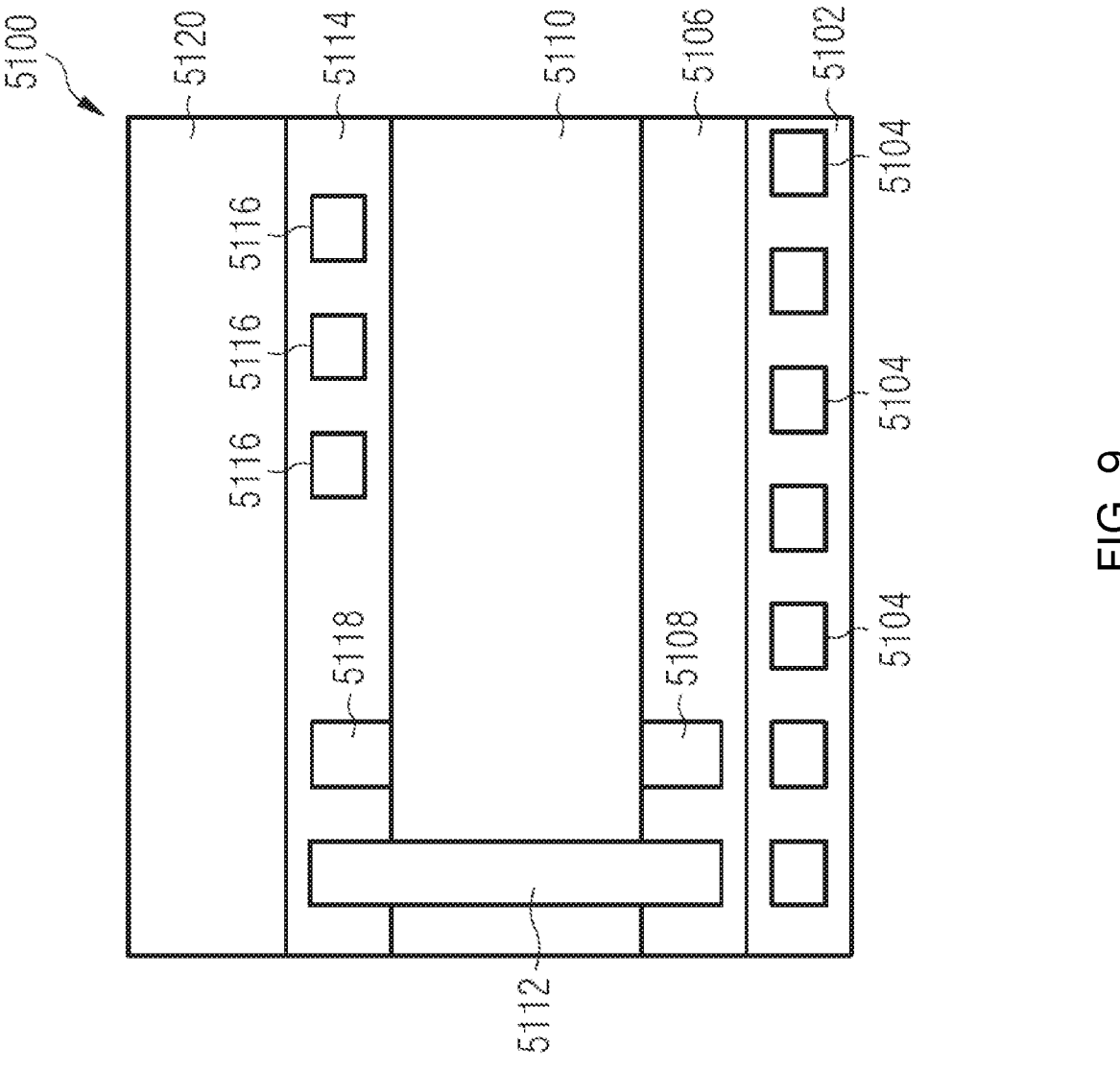
FIG. 9 shows a cross sectional view of an optical component for a LIDAR Sensor System in accordance with various embodiments.

FIG. 9 shows schematically in a cross sectional view an optical component 5100 for a LIDAR Sensor System in accordance with various embodiments.

The optical component 5100 may include a carrier, which may include a substrate, e.g. including a semiconductor material and/or a semiconductor compound material. Examples of materials that may be used for the carrier and/or the semiconductor structure include one or more of the following materials: GaAs, AlGaInP, GaP, AlP, AlGaAs, GaAsP, GaInN, GaN, Si, SiGe, Ge, HgCdTe, InSb, InAs, GaInSb, GaSb, CdSe, HgSe, AlSb, CdS, ZnS, ZnSb, ZnTe. The substrate may optionally include a device layer 5102.

One or more electronic devices 5104 such as (field effect) transistors 5104 or other electronic devices (resistors, capacitors, inductors, and the like) 5104 may be completely or partially formed in the device layer 5102. The one or more electronic devices 5104 may be configured to process signals generated by the first photo diode 5110 and the second photo diode 5120, which will be described in more detail below. The substrate may optionally include a bottom interconnect layer 5106. Alternatively, the interconnect layer 5106 may be configured as a separate layer, e.g. as a separate layer arranged above the device layer 5102 (like shown in FIG. 9). The carrier may have a thickness in the range from about 100 μm to about 3000 μm.

One or more electronic contacts 5108 configured to contact the electronic devices 5104 or an anode or a cathode of a first photo diode 5110, in other words a first portion of the first photo diode 5110 (which will be described in more detail below), may be connected to an electronic contact 5108 of the bottom interconnect layer 5106. Furthermore, one or more contact vias 5112 may be formed in the bottom interconnect layer 5106. The one or more contact vias 5112 extend through the entire layer structure implementing the first photo diode 5110 into an intermediate interconnect/device layer 5114. The one or more electronic contacts 5108 as well as the one or more contact vias 5112 may be made of electrically conductive material such as a metal (e.g. Cu or Al) or any other suitable electrically conductive material. The one or more electronic contacts 5108 and the one or more contact vias 5112 may form an electrically conductive connection network in the bottom interconnect layer 5106.

The first photo diode 5110 may be an avalanche type photo diode such as an avalanche photo diode (APD) or a single-photon photo diode (SPAD). The first photo diode 5110 may be operated in the linear mode/in the Geiger mode. Illustratively, the first photo diode 5110 implements a LIDAR sensor pixel in a first semiconductor structure over the carrier. The first photo diode 5110 is configured to absorb received light in a first wavelength region. The first photo diode 5110 and thus the first semiconductor structure may have a layer thickness in the range from about 500 nm to about 50 μm.

One or more further electronic devices 5116 such as (field effect) transistors 5116 or other further electronic devices (resistors, capacitors, inductors, and the like) 5116 may be completely or partially formed in the intermediate interconnect/device layer 5114. One or more further electronic contacts 5118 configured to contact the further electronic devices 5116 or an anode or a cathode of the first photo diode 5110, in other words a second portion of the first photo diode 5110, may be connected to a further electronic contact 5118 of the intermediate interconnect/device layer 5114. The one or more further electronic contacts 5118 and the one or more contact vias 5112 may form an electrically conductive connection network (electrically conductive structure configured to electrically contact the first photo diode 5110 and the second photo diode 5120) in the intermediate interconnect/device layer 5114. Illustratively, the intermediate interconnect/device layer 5114 (which may also be referred to as interconnect layer 5114) is arranged between the first semiconductor structure and the second semiconductor structure.

One or more further electronic contacts 5118 and/or one or more contact vias 5112 may be configured to contact the further electronic devices 5116 or an anode or a cathode of a second photo diode 5120, in other words a first portion of the second photo diode 5120 (which will be described in more detail below) may be connected to a further electronic contact 5118 of the intermediate interconnect/device layer 5114.

The second photo diode 5120 may be arranged over (e.g. in direct physical contact with) the intermediate interconnect/device layer 5114. The second photo diode 5120 might be a pin photo diode (e.g. configured to receive light of the visible spectrum). Illustratively, the second photo diode 5120 implements a camera sensor pixel in a second semiconductor structure over the intermediate interconnect/device layer 5114 and thus also over the first semiconductor structure. In other words, the second photo diode 5120 is vertically stacked over the first photo diode. The second photo diode 5120 is configured to absorb received light in a second wavelength region. The received light of the second wavelength region has a shorter wavelength than the predominantly received light of the first wavelength region.

Figures 10A, 10B:
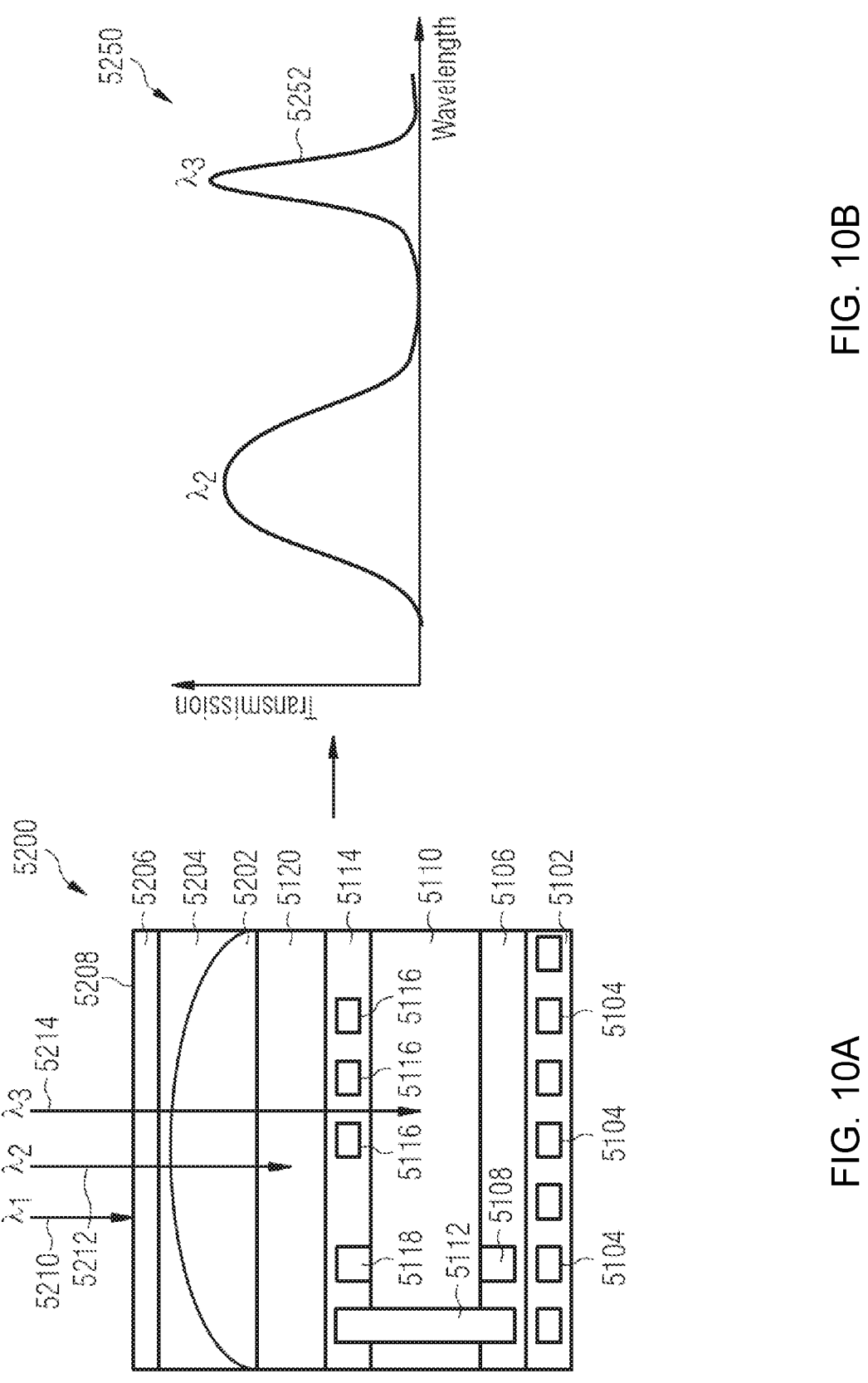
FIGS. 10A and 10B show a cross sectional view of an optical component for a LIDAR Sensor System (FIG. 10A) and a corresponding wavelength/transmission diagram (FIG. 10B) in accordance with various embodiments.
Figures 11A, 11B:
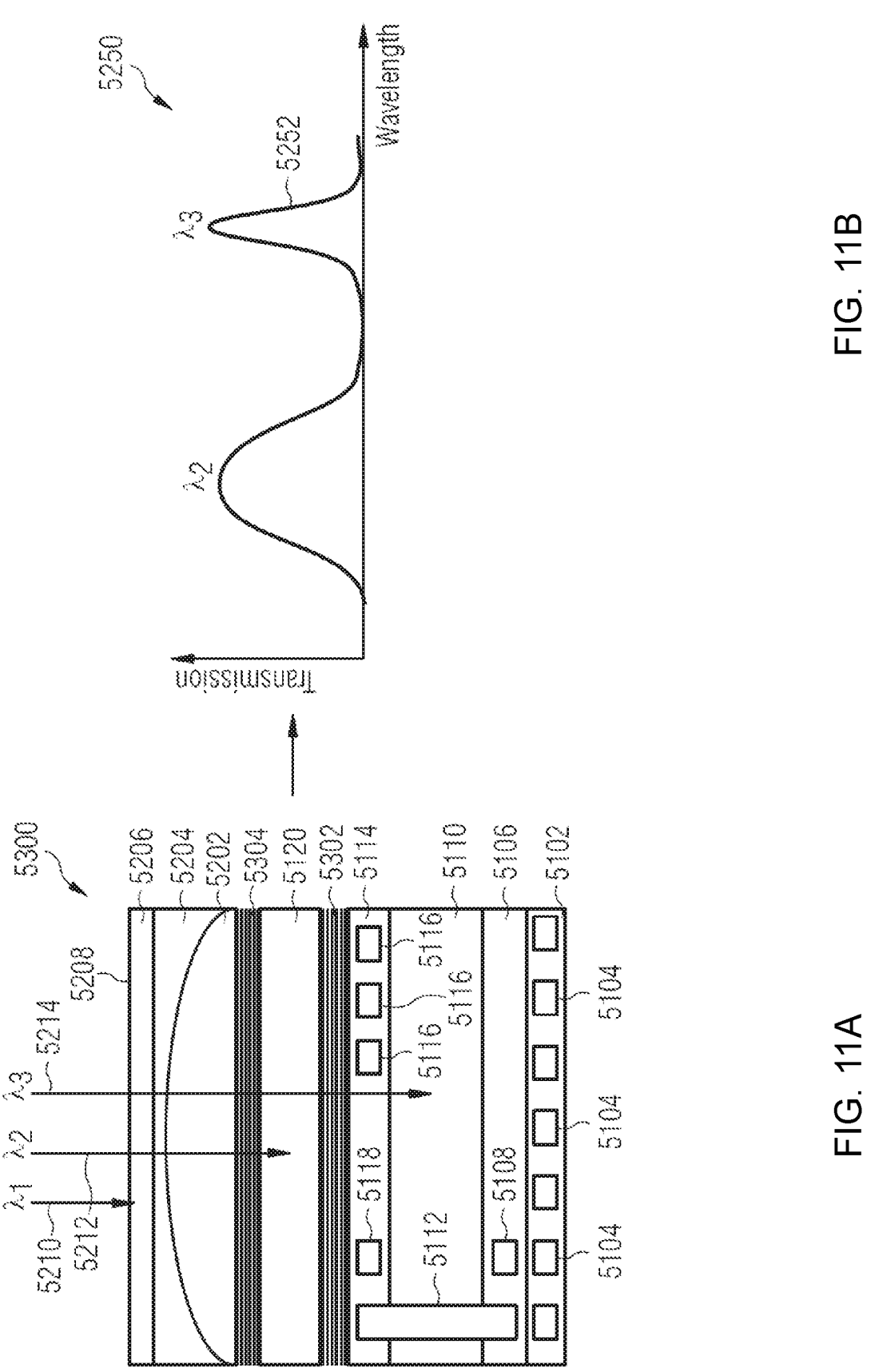
FIGS. 11A and 11B show a cross sectional view of an optical component for a LIDAR Sensor System (FIG. 11A) and a corresponding wavelength/transmission diagram (FIG. 11B) in accordance with various embodiments.

FIGS. 11A and 11B show schematically in a cross sectional view an optical component 5200 for a LIDAR Sensor System (FIG. 10A) and a corresponding wavelength/transmission diagram 5250 (FIG. 10B) in accordance with various embodiments.

The optical component 5200 of FIG. 10A is substantially similar to the optical component 5100 of FIG. 9 as described above. Therefore, only the main differences of the optical component 5200 of FIG. 10A with respect to the optical component 5100 of FIG. 9 will be described in more detail below.

The optical component 5200 of FIG. 10A may further optionally include one or more microlenses 5202, which may be arranged over the second photo diode 5120 (e.g. directly above, in other words in physical contact with the second photo diode 5120). The one or more microlenses 5202 may be embedded in or at least partially surrounded by a suitable filler material 5204 such as silicone. The one or more microlenses 5202 together with the filler material 5204 may, for a layer structure, have a layer thickness in the range from about 1 μm to about 500 μm.

Furthermore, a filter layer 5206, which may be configured to implement a bandpass filter, may be arranged over the optional one or more microlenses 5202 or the second photo diode 5120 (e.g. directly above, in other words in physical contact with the optional filler material 5204 or with the second photo diode 5120). The filter layer 5206 may have a layer thickness in the range from about 1 μm to about 500 μm.

As shown in FIG. 10A, light impinges on the upper (exposed) surface 5208 of the filter layer 5206. The light may include various wavelengths, such as e.g. a first wavelength range $\lambda_1$ (e.g. in the ultra-violet spectral region), a second wavelength range $\lambda_2$ (e.g. in the visible spectral region), and a third wavelength range $\lambda_3$ (e.g. in the near-infrared spectral region). Light having the first wavelength $\lambda_1$ is symbolized in FIG. 10A by a first arrow 5210. Light having the second wavelength $\lambda_2$ is symbolized in FIG. 10A by a second arrow 5212. Light having the third wavelength $\lambda_3$ is symbolized in FIG. 10A by a third arrow 5214.

The wavelength/transmission diagram 5250 as shown in FIG. 10B illustrates the wavelength-dependent transmission characteristic of the filter layer 5206. As illustrated, the filter layer 5206 has a bandpass filter characteristic. In more detail, the filter layer 5206 has a low, ideally negligible transmission for light having the first wavelength range $\lambda_1$. In other words, the filter layer 5206 may completely block the light portions having the first wavelength range $\lambda_1$ impinging on the upper (exposed) surface 5208 of the filter layer 5206. Furthermore, the transmission characteristic 5252 shows that the filter layer 5206 is substantially fully transparent (transmission factor close to "1") for light having the second wavelength range $\lambda_2$ and for light having the third wavelength range $\lambda_3$.

In various embodiments, the second photo diode 5120 may include or be a pin photo diode (configured to detect light of the visible spectrum) and the first photo diode 5110 may include or be an avalanche photo diode (in the linear mode/in the Geiger mode) (configured to detect light of the near infrared (NIR) spectrum or in the infrared (IR) spectrum).

FIGS. 11A and 11B show schematically in a cross sectional view an optical component 5300 for a LIDAR Sensor System (FIG. 11A) and a corresponding wavelength/transmission diagram 5250 (FIG. 11B) in accordance with various embodiments.

The optical component 5300 of FIG. 11A is substantially similar to the optical component 5200 of FIG. 10A as described above. Therefore, only the main differences of the optical component 5300 of FIG. 11A from the optical component 5200 of FIG. 10A will be described in more detail below.

The optical component 5300 of FIG. 11A may further optionally include a mirror structure (e.g. a Bragg mirror structure). The second photo diode 5120 may be arranged (in other words sandwiched) between the two mirrors (e.g. two Bragg mirrors) 5302, 5304 of the mirror structure. In other words, the optical component 5300 of FIG. 11A may further optionally include a bottom mirror (e.g. a bottom Bragg mirror) 5302. The bottom mirror (e.g. the bottom Bragg mirror) 5302 may be arranged over (e.g. in direct physical contact with) the intermediate interconnect/device layer 5114. In this case, the second photo diode 5120 may be arranged over (e.g. in direct physical contact with) the bottom mirror 5302. Furthermore, a top mirror (e.g. a top Bragg mirror) 5304 may be arranged over (e.g. in direct physical contact with) the second photo diode 5120. In this case, the optional one or more microlenses 5202 or the filter layer 5206 may be arranged over (e.g. in direct physical contact with) the top mirror 5304.

In various embodiments, the second photo diode 5120 may include or be a pin photo diode (configured to detect light of the visible spectrum) and the first photo diode 5110 may include or be an avalanche photo diode (in the linear mode/in the Geiger mode) (configured to detect light of the near infrared (NIR) spectrum or in the infrared (IR) spectrum).

Figure 12:
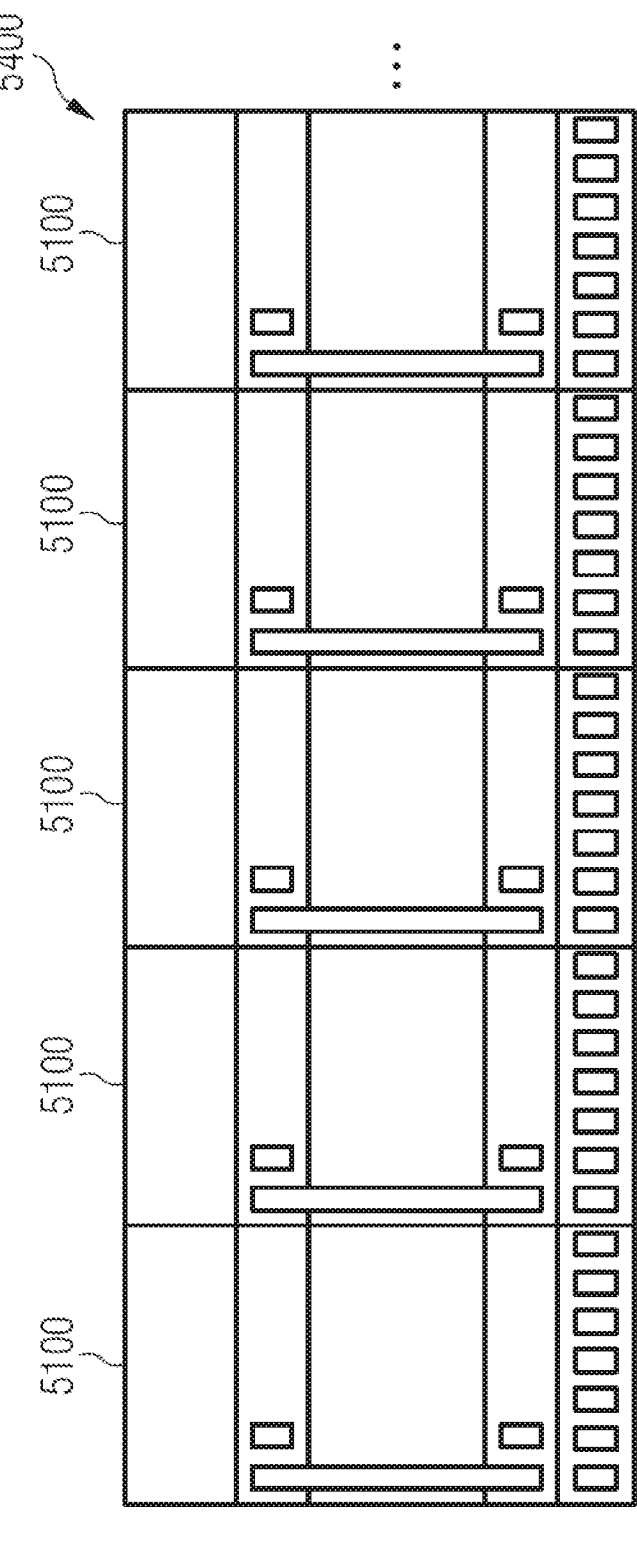
FIG. 12 shows a cross sectional view of a sensor for a LIDAR Sensor System in accordance with various embodiments.

FIG. 12 shows schematically a cross sectional view 5400 of a sensor 52 for a LIDAR Sensor System in accordance with various embodiments. As shown in FIG. 12, the sensor 52 may include a plurality of optical components (e.g. a plurality of optical components 5100 as shown in FIG. 9) in accordance with any one of the embodiments as described above or as will be described further below. The optical components may be arranged in an array, e.g. in a matrix arrangement, e.g. in rows and columns. In various embodiments, more than 10, or more than 100, or more than 1000, or more than 10000, and even more optical components may be provided.

Figure 13:
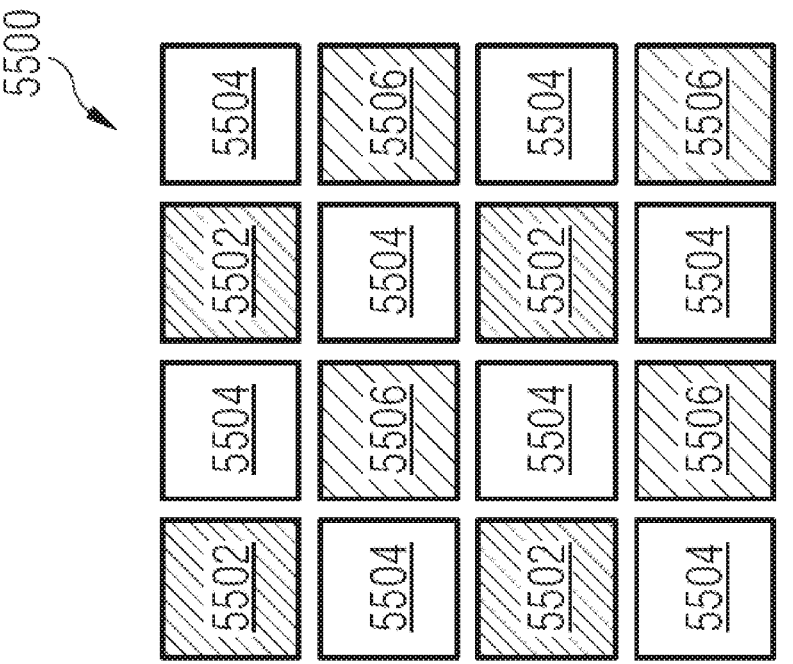
FIG. 13 shows a top view of a sensor for a LIDAR Sensor System in accordance with various embodiments.

FIG. 13 shows a top view 5500 of the sensor 52 of FIG. 12 for a LIDAR Sensor System in accordance with various embodiments. The top view 5500 illustrates a plurality of color filter portions (each color filter may be implemented as a filter layer 5206). The different color filter portions may be configured to transmit (transfer) light of different wavelengths in the visible spectrum (to be detected by the second photo diode 5120) and light of one or more wavelengths to be absorbed or detected by the first photo diode 5110 for LIDAR detection. By way of example, a red pixel filter portion 5502 may be configured to transmit light having a wavelength to represent red color (to be detected by the second photo diode 5120) and light of one or more wavelengths to be absorbed or detected by the first photo diode 5110 for LIDAR detection and to block light outside these wavelength regions. Furthermore, a green pixel filter portion 5504 may be configured to transmit light having a wavelength to represent green color (to be detected by the second photo diode 5120) and light of one or more wavelengths to be absorbed or detected by the first photo diode 5110 for LIDAR detection and to block light outside these wavelength regions. Moreover, a blue pixel filter portion 5506 may be configured to transmit light having a wavelength to represent blue color (to be detected by the second photo diode 5120) and light of one or more wavelengths to be absorbed or detected by the first photo diode 5110 for LIDAR detection and to block light outside these wavelength regions. The color filter portions 5502, 5504, 5506 may each have the lateral size corresponding to a sensor pixel, in this case a size similar to the lateral sizes of the second photo diodes 5120. In these embodiments, the second photo diodes 5110 may have the same lateral size as the second photo diodes 5120. The color filter portions 5502, 5504, 5506 may be arranged in accordance with a Bayer pattern.

Figure 14:
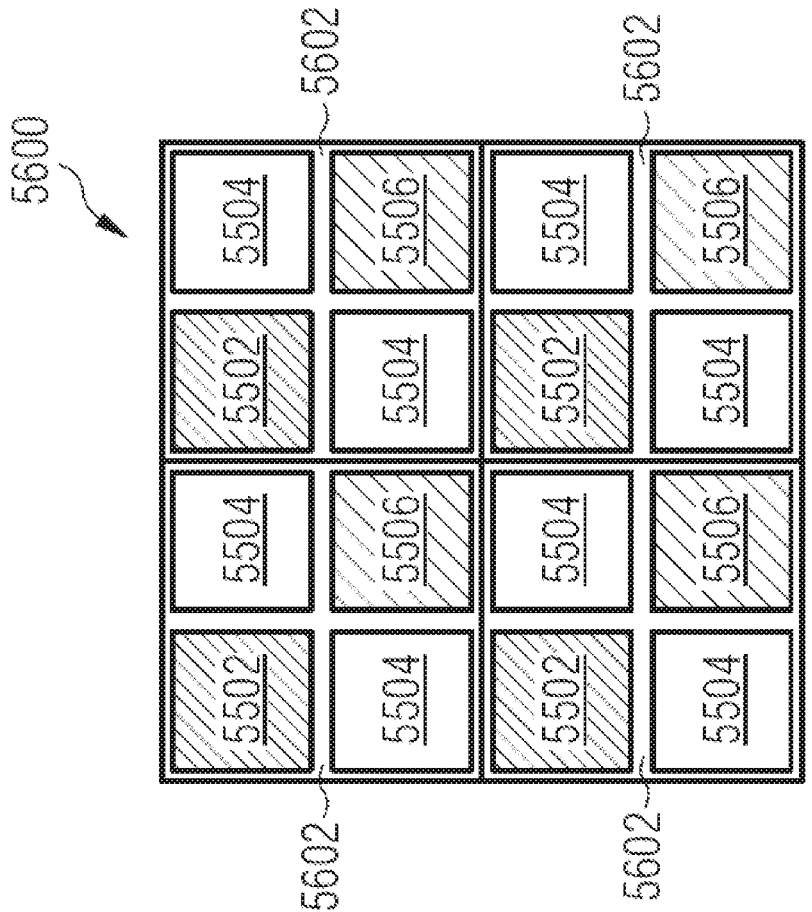
FIG. 14 shows a top view of a sensor for a LIDAR Sensor System in accordance with various embodiments.

FIG. 14 shows a top view 5600 of a sensor 52 for a LIDAR Sensor System in accordance with various embodiments.

The sensor of FIG. 14 is substantially similar to the sensor of FIG. 13 as described above. Therefore, only the main difference of the sensor of FIG. 14 from the sensor of FIG. 13 will be described in more detail below.

In various embodiments, the color filter portions 5502, 5504, 5506 may each have a lateral size corresponding to a sensor pixel, in this case a size similar to the lateral size of the second photo diodes 5120. In these embodiments, the first photo diodes 5110 may have a larger lateral size than the second photo diodes 5120. By way of example, the surface area of the first photo diodes 5110 may be larger than the surface area of the second photo diodes 5120. In one implementation, the surface area of the first photo diodes 5110 may be larger than the surface area of the second photo diodes 5120 by a factor of two, or by a factor of four, or by a factor of eight, or by a factor of sixteen. The larger size of the first photo diodes 5110 is symbolized by rectangles 5602 in FIG. 14. The color filter portions 5502, 5504, 5506 may also be arranged in accordance with a Bayer pattern. In these examples, the resolution of the first photo diodes 5110 may not be of high importance, but the sensitivity of the first photo diodes 5110 may be important.

Figure 15:
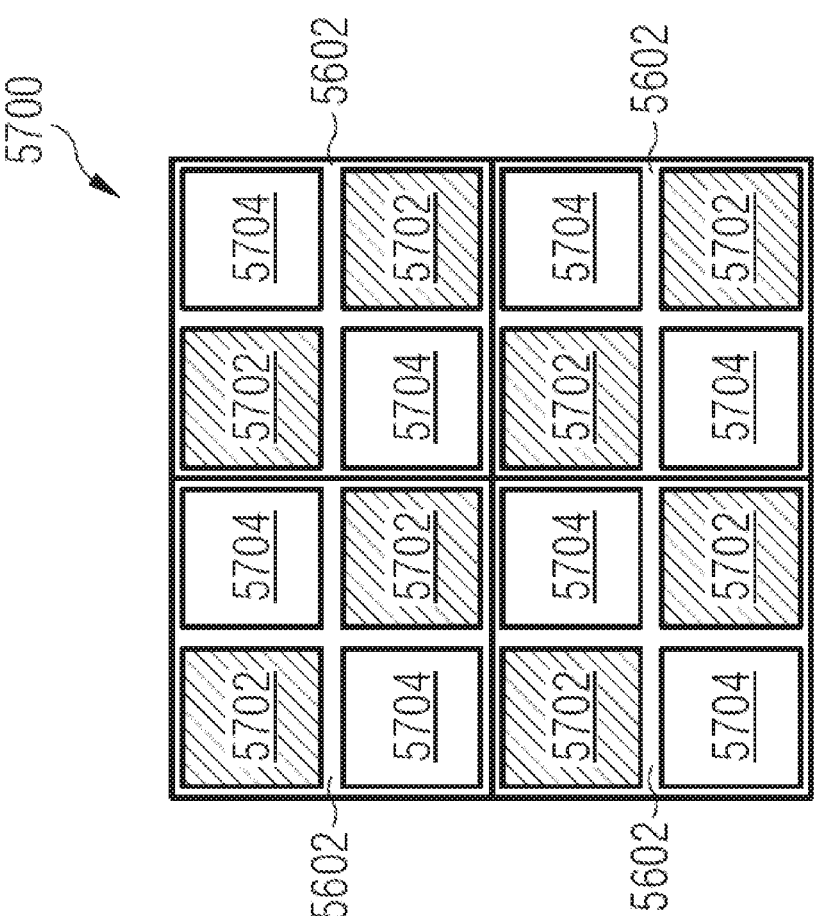
FIG. 15 shows a top view of a sensor for a LIDAR Sensor System in accordance with various embodiments.

FIG. 15 shows a top view 5700 of a sensor 52 for a LIDAR Sensor System in accordance with various embodiments.

The sensor of FIG. 15 is substantially similar to the sensor of FIG. 13 as described above. Therefore, only the main difference of the sensor of FIG. 15 from the sensor of FIG. 13 will be described in more detail below.

The top view 5700 illustrates a plurality of color filter portions (each color filter may be implemented as a filter layer 5206) different from the color filter portions of the sensor as shown in FIG. 13 or FIG. 14. In these examples, a red pixel filter portion 5702 may be configured to transmit light having a wavelength to represent red color (to be detected by the second photo diode 5120 in order to detect a taillight of a vehicle) and light of one or more wavelengths to be absorbed or detected by the first photo diode 5110 for LIDAR detection and to block light outside these wavelength regions. Furthermore, a yellow (or orange) pixel filter portion 5704 may be configured to transmit light having a wavelength to represent yellow (or orange) color (to be detected by the second photo diode 5120 in order to detect a warning light or a blinking light of a vehicle) and light of one or more wavelengths to be absorbed or detected by the first photo diode 5110 for LIDAR detection and to block light outside these wavelength regions. In these embodiments, the first photo diodes 5110 may have a larger lateral size than the second photo diodes 5120. By way of example, the surface area of the first photo diodes 5110 may be larger than the surface area of the second photo diodes 5120. In one implementation, the surface area of the first photo diodes 5110 may be larger than the surface area of the second photo diodes 5120 by a factor of two, or by a factor of four, or by a factor of eight, or by a factor of sixteen. The larger size of the first photo diodes 5110 is symbolized by rectangles 5602 in FIG. 15. The color filter portions 5702 and 5704 may be arranged in accordance with checkerboard pattern. In these examples, the resolution of the first photo diodes 5110 may not be of high importance, but the sensitivity of the first photo diodes 5110 may be important.

It is to be noted that the structure and the transmission characteristics of the color filter portions may vary as a function of the desired color space. In the above described embodiments, an RGB color space was considered. Other possible color spaces that may be provided are CYMG (cyan, yellow, magenta and green), RGBE (red, green, blue, and emerald), CMYW (cyan, magenta, yellow, and white), and the like. The color filter portions would be adapted accordingly. Optional further color filter types may mimic the scotopic sensitivity curve of the human eye.

Figure 16:
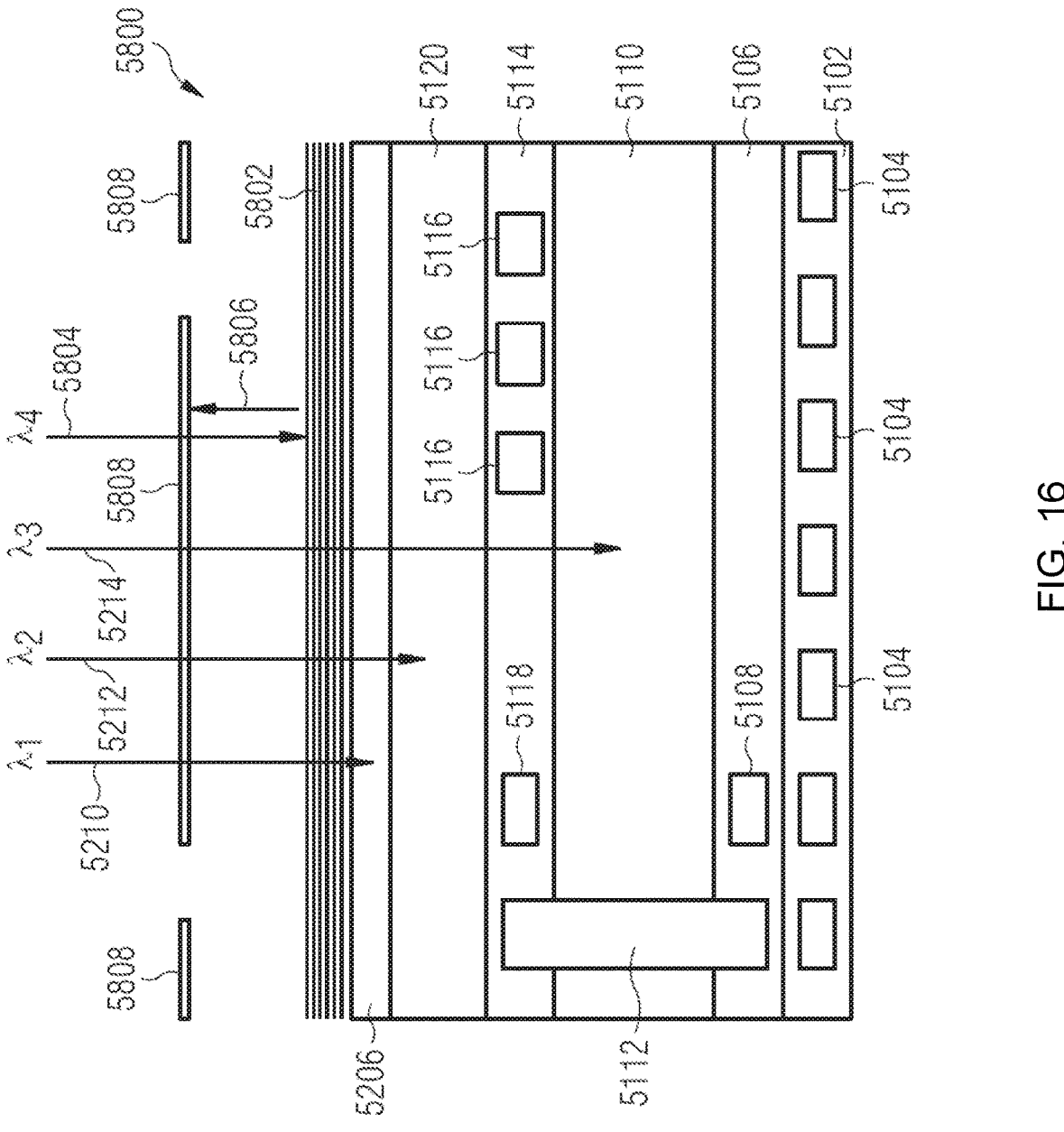
FIG. 16 shows a cross sectional view of an optical component for a LIDAR Sensor System in accordance with various embodiments.

FIG. 16 shows an optical component 5800 for a LIDAR Sensor System in accordance with various embodiments.

The optical component 5800 of FIG. 16 is substantially similar to the optical component 5200 of FIG. 10A as described above. Therefore, the main differences of the optical component 5800 of FIG. 16 from the optical component 5200 of FIG. 10A will be described in more detail below.

To begin with, the optical component 5800 may have or may not have the optional one or more microlenses 5202 and the filler material 5204. Furthermore, a reflector layer 5802 may be arranged over (e.g. in direct physical contact with) the filter layer 5206. The reflector layer 5802 may be configured to reflect light in a wavelength region of a fourth wavelength $\lambda_4$. The fourth wavelength range $\lambda_4$ may have larger wavelengths than the first wavelength range $\lambda_1$, the second wavelength range $\lambda_2$, and the third wavelength range $\lambda_3$. A light portion of the fourth wavelength $\lambda_4$ is symbolized in FIG. 16 by a fourth arrow 5804. This light impinges on the reflector layer 5802 and is reflected by the same. The light portion that is reflected by the reflector layer 5802 is symbolized in FIG. 16 by a fifth arrow 5806. The reflector layer 5802 may be configured to reflect light in the wavelength region of thermal infrared light or infrared light. The reflector layer 5802 may include a Bragg stack of layers configured to reflect light of a desired wavelength or wavelength region. The optical component 5800 may further include a micromechanically defined IR absorber structure 5808 arranged over the reflector layer 5802. The IR absorber structure 5808 may be provided for a temperature-dependent resistivity measurement (based on the so called Microbolometer principle). To electrically contact the IR absorber structure 5808 for the resistivity measurement, one or more conductor lines may be provided, e.g. in the intermediate interconnect/device layer 5114. The reflector layer 5802 may be configured to reflect thermal infrared radiation having a wavelength greater than approximately 2 μm.

Various embodiments such as e.g. the embodiments illustrated above may include a stack of different photo diodes, such as:

- a stack of a pin photo diode (configured to detect light of the visible spectrum) over a pin photo diode (configured to detect light of the near infrared (NIR) spectrum);
- a stack of a pin photo diode (configured to detect light of the visible spectrum) over an avalanche photo diode (in the linear mode/in the Geiger mode) (configured to detect light of the near infrared (NIR) spectrum);
- a stack of a resonant cavity photo diode (configured to detect light of the visible spectrum) over an avalanche photo diode (in the linear mode/in the Geiger mode) (configured to detect light of the near infrared (NIR) spectrum);
- a stack of a pin photo diode (configured to detect light of the visible spectrum) over a further photo diode configured to provide indirect ToF measurements by means of phase differences (e.g. PMD approach);
- a stack of a resonant cavity photo diode (configured to detect light of the visible spectrum) over a further photo diode configured to provide indirect ToF measurements by means of phase differences (e.g. PMD approach);

As described above, the above mentioned embodiments may be complemented by a filter, e.g. a bandpass filter, which is configured to transmit portions of the light which should be detected by the photo diode near to the surface of the carrier (e.g. of the visible spectrum) such as e.g. red light for vehicle taillights as well as portions of the light having the wavelength of the used LIDAR source (e.g. laser source).

The above mentioned embodiments may further be complemented by a (one or more) microlens per pixel to increase the fill factor (a reduced fill factor may occur due to circuit regions of an image sensor pixel required by the manufacturing process). The fill factor is to be understood as the area ratio between the optically active area and the total area of the pixel. The optically active area may be reduced e.g. by electronic components. A micro lens may extend over the entire area of the pixel and may guide the light to the optically active area. This would increase the fill factor.

In various embodiments, a front-side illuminated image sensor or a back-side illuminated image sensor may be provided. In a front-side illuminated image sensor, the device layer is positioned in a layer facing the light impinging the sensor 52. In a back-side illuminated image sensor, the device layer is positioned in a layer facing away from the light impinging the sensor 52.

In various embodiments, two APD photo diodes may be provided which are configured to detect light in different NIR wavelengths and which may be stacked over each other, e.g. to use the wavelength-dependent absorption characteristics of water (vapor) and to obtain information about the amount of water present in the atmosphere and/or an surfaces such as the roadway of a surface by the comparison of the intensities of the light detected at different wavelengths.

Depending on the desired wavelengths, the detector may be implemented in a semiconductor material such as silicon or in semiconductor compound material such as silicon germanium, III-V semiconductor compound material, or II-VI semiconductor compound material, individually or in combination with each other.

Various embodiments may allow the manufacturing of a miniaturized and/or cost-efficient sensor system which may combine a camera sensor and a LIDAR sensor with each other in one common carrier (e.g. substrate). Such a sensor system may be provided for pattern recognition, or object recognition, or face recognition. The sensor system may be implemented in a mobile device such as a mobile phone or smartphone.

Furthermore, various embodiments may allow the manufacturing of a compact and/or cost-efficient sensor system for a vehicle. Such a sensor system may be configured to detect active taillights of one or more other vehicles and at the same time to perform a three-dimensional measurement of objects by means of the LIDAR sensor portion of the sensor system.

Moreover, various embodiments allow the combination of two LIDAR wavelengths in one common detector e.g. to obtain information about the surface characteristic of a reflecting target object by means of a comparison of the respectively reflected light.

Various embodiments, may allow the combination of a LIDAR sensor, a camera sensor (configured to detect light of the visible spectrum (VIS)) and a camera sensor (configured to detect light of the thermal infrared spectrum), in one common sensor (e.g. monolithically integrated on one common carrier, e.g. one common substrate, e.g. one common wafer).

Various embodiments may reduce adjustment variations between different image sensors for camera and LIDAR.

In various embodiments, even more than two photo diodes may be stacked one above the other.

It is to be noted that in various embodiments, the lateral size (and/or shape) of the one, two or even more photo diodes and the color filter portions of the filter layer (e.g. filter layer 5206) may be the same.

Furthermore, in various embodiments, the lateral size (and/or shape) of the one, two, or even more photo diodes may be the same, and the lateral size (and/or shape) of the color filter portions of the filter layer (e.g. filter layer 5206) may be different from each other and/or from the lateral size (and/or shape) of the one, two or even more photo diodes.

Moreover, in various embodiments, the lateral size (and/or shape) of the one, two, or even more photo diodes may be different from each other and/or from the lateral size (and/or shape) of the color filter portions, and the lateral size (and/or shape) of the color filter portions of the filter layer (e.g. filter layer 5206) may be the same.

Moreover, in various embodiments, the lateral size (and/or shape) of the one, two, or even more photo diodes may be different from each other and the lateral size (and/or shape) of the color filter portions of the filter layer (e.g. filter layer 5206) may be different from each other and/or from the lateral size (and/or shape) of the one, two or even more photo diodes.

In addition, as already described above, other types of color filter combinations, like CYMG (cyan, yellow, green and magenta), RGBE (red, green, blue, and emerald), CMYW (cyan, magenta, yellow, and white) may be used as well. The color filters may have a bandwidth (FWHM) in the range from about 50 nm to about 200 nm. However, also monochrome filters (black/white) may be provided.

It is to be noted that standard color value components and luminance factors for retroreflective traffic signs are specified in accordance with DIN EN 12899-1 and DIN 6171-1. The color coordinates of vehicle headlamps (dipped and high beam, daytime running lights) are defined by the ECE white field (CIE-Diagram) of the automotive industry. The same applies to signal colors, whose color coordinates are defined, for example, by ECE color boundaries. See also CIE No. 2.2 (TC-1.6) 1975, or also BGB1. II—Issued on 12 Aug. 2005—No. 248). Other national or regional specification standards may apply as well. All these components may be implemented in various embodiments.

Accordingly, the transmission curves of the used sensor pixel color filters should comply with the respective color-related traffic regulations. Sensor elements having sensor pixels with color-filter need not only be arranged in a Bayer-Pattern, but other pattern configurations may be used as well, for example an X-trans-Matrix pixel-filter configuration.

A sensor as described with respect to FIGS. 10 to 16 may e.g. be implemented in a photon mixing device (e.g. for an indirect measurement or in a consumer electronic device in which a front camera of a smartphone may, e.g. at the same time, generate a three-dimensional image).

A sensor as described with respect to FIGS. 10 to 16 may e.g. also be implemented in a sensor to detect the characteristic of a surface, for example whether a street is dry or wet, since the surface usually has different light reflection characteristics depending on its state (e.g. dry state or wet state), and the like.

As previously described with reference to FIG. 1 to FIG. 8, a stacked photo diode in accordance with various embodiments as described with reference to FIG. 9 to FIG. 16 may implement a first sensor pixel including a photo diode of a first photo diode type and a second pixel of the plurality of pixels including a photo diode of a second photo diode type.

By way of example, such a stacked optical component including a plurality of photo diodes of different photo diode types (e.g. two, three, four or more photo diodes stacked above one another). The stacked optical component may be substantially similar to the optical component 5100 of FIG. 9 as described above. Therefore, only the main differences of the stacked optical component with respect to the optical component 5100 of FIG. 9 will be described in more detail below.

The stacked optical component may optionally include one or more microlenses, which may be arranged over the second photo diode (e.g. directly above, in other words in physical contact with the second photo diode). The one or more microlenses may be embedded in or at least partially surrounded by a suitable filler material such as silicone. The one or more microlenses together with the filler material may, for a layer structure, have a layer thickness in the range from about 1 μm to about 500 μm.

Furthermore, a filter layer, which may be configured to implement a bandpass filter, may be arranged over the optional one or more microlenses or the second photo diode (e.g. directly above, in other words in physical contact with the optional filler material or with the second photo diode). The filter layer may have a layer thickness in the range from about 1 μm to about 500 μm. The filter layer may have a filter characteristic in accordance with the respective application.

In various embodiments, the second photo diode may include or be a pin photo diode (configured to detect light of the visible spectrum) and the first photo diode may include or be an avalanche photo diode (in the linear mode/in the Geiger mode) (configured to detect light of the near infrared (NIR) spectrum or in the infrared (IR) spectrum).

In various embodiments, a multiplexer may be provided to individually select the sensor signals provided e.g. by the pin photo diode or by the avalanche photo diode. Thus, the multiplexer may select e.g. either the pin photo diode (and thus provides only the sensor signals provided by the pin photo diode) or the avalanche photo diode (and thus provides only the sensor signals provided by the avalanche photo diode).

In the following, various aspects of this disclosure will be illustrated:

Example 1f is an optical component for a LIDAR Sensor System. The optical component includes a first photo diode implementing a LIDAR sensor pixel in a first semiconductor structure and configured to absorb received light in a first wavelength region, a second photo diode implementing a camera sensor pixel in a second semiconductor structure over the first semiconductor structure and configured to absorb received light in a second wavelength region, and an interconnect layer (e.g. between the first semiconductor structure and the second semiconductor structure) including an electrically conductive structure configured to electrically contact the second photo diode. The received light of the second wavelength region has a shorter wavelength than the received light of the first wavelength region.

In Example 2f, the subject matter of Example 1f can optionally include that the second photo diode is vertically stacked over the first photo diode.

In Example 3f, the subject matter of any one of Examples 1f or 2f can optionally include that the first photo diode is a first vertical photo diode, and/or that the second photo diode is a second vertical photo diode.

In Example 4f, the subject matter of any one of Examples 1f to 3f can optionally include that the optical component further includes a further interconnect layer (e.g. between the carrier and the first semiconductor structure) including an electrically conductive structure configured to electrically contact the second vertical photo diode and/or the first vertical photo diode.

In Example 5f, the subject matter of any one of Examples 1f to 4f can optionally include that the optical component further includes a microlens over the second semiconductor structure that laterally substantially covers the first vertical photo diode and/or the second vertical photo diode.

In Example 6f, the subject matter of any one of Examples 1f to 5f can optionally include that the optical component further includes a filter layer over the second semiconductor structure that laterally substantially covers the first vertical photo diode and/or the second vertical photo diode and is configured to transmit received light having a wavelength within the first wavelength region and within the second wavelength region, and block light that is outside of the first wavelength region and the second wavelength region.

In Example 7f, the subject matter of any one of Examples 1f to 6f can optionally include that the received light of the first wavelength region has a wavelength in the range from about 800 nm to about 1800 nm, and/or that the received light of the second wavelength region has a wavelength in the range from about 380 nm to about 780 nm.

In Example 8f, the subject matter of any one of Examples 1f to 6f can optionally include that the received light of the first wavelength region has a wavelength in the range from about 800 nm to about 1800 nm, and/or that the received light of the second wavelength region has a wavelength in the range from about 800 nm to about 1750 nm.

In Example 9f, the subject matter of any one of Examples 1f to 8f can optionally include that the received light of the second wavelength region has a shorter wavelength than any received light of the first wavelength region by at least 50 nm, for example at least 100 nm.

In Example 10f, the subject matter of any one of Examples 1f to 7f or 9f can optionally include that the received light of the first wavelength region has a wavelength in an infrared spectrum wavelength region, and/or that the received light of the second wavelength region has a wavelength in the visible spectrum wavelength region.

In Example 11f, the subject matter of any one of Examples 1f to 10f can optionally include that the optical component further includes a mirror structure including a bottom mirror and a top mirror. The second semiconductor structure is arranged between the bottom mirror and the top mirror. The bottom mirror is arranged between the interconnect layer and the second semiconductor structure.

In Example 12f, the subject matter of Example 11f can optionally include that the mirror structure includes a Bragg mirror structure.

In Example 13f, the subject matter of any one of Examples 11f or 12f can optionally include that the mirror structure and the second vertical photo diode are configured so that the second vertical photo diode forms a resonant cavity photo diode.

In Example 14f, the subject matter of any one of Examples 1f to 13f can optionally include that the optical component further includes a reflector layer over the second semiconductor structure.

In Example 15f, the subject matter of Example 14f can optionally include that the reflector layer is configured as a thermal reflector layer configured to reflect radiation having a wavelength equal to or greater than approximately 2 μm, and/or that the reflector layer is configured as an infrared reflector layer.

In Example 16f, the subject matter of any one of Examples 1f to 15f can optionally include that the first photo diode is a pin photo diode, and that the second photo diode is a pin photo diode.

In Example 17f, the subject matter of any one of Examples 1f to 15f can optionally include that the first photo diode is an avalanche photo diode, and that the second photo diode is a pin photo diode.

In Example 18f, the subject matter of any one of Examples 1f to 15f can optionally include that the first photo diode is an avalanche photo diode, and that the second photo diode is a resonant cavity photo diode.

In Example 19f, the subject matter of any one of Examples 1f to 15f can optionally include that the first photo diode is a single-photon avalanche photo diode, and that the second photo diode is a resonant cavity photo diode.

In Example 20f, the subject matter of any one of Examples 1f to 15f can optionally include that the first photo diode is an avalanche photo diode, and that the second photo diode is an avalanche photo diode.

In Example 21f, the subject matter of any one of Examples 2f to 20f can optionally include that the optical component further includes an array of a plurality of photo diode stacks, each photo diode stack comprising a second photo diode vertically stacked over a first photo diode.

In Example 22f, the subject matter of any one of Examples 1f to 21f can optionally include that at least one photo diode stack of the plurality of photo diode stacks comprises at least one further second photo diode in the second semiconductor structure adjacent to the second photo diode, and that the first photo diode of the at least one photo diode stack of the plurality of photo diode stacks has a larger lateral extension than the second photo diode and the at least one further second photo diode of the at least one photo diode stack so that the second photo diode and the at least one further second photo diode are arranged laterally within the lateral extension of the first vertical photo diode.

In Example 23f, the subject matter of any one of Examples 1f to 22f can optionally include that the carrier is a semiconductor substrate.

Example 24f is a sensor for a LIDAR Sensor System. The sensor may include a plurality of optical components according to any one of Examples 1f to 23f. The plurality of optical components are monolithically integrated on the carrier as a common carrier.

In Example 25f, the subject matter of Example 24f can optionally include that the sensor is configured as a front-side illuminated sensor.

In Example 26f, the subject matter of Example 24f can optionally include that the sensor is configured as a back-side illuminated sensor.

In Example 27f, the subject matter of any one of Examples 24f to 26f can optionally include that the sensor further includes a color filter layer covering at least some optical components of the plurality of optical components.

In Example 28f, the subject matter of Example 27f can optionally include that the color filter layer includes a first color filter sublayer and a second color filter sublayer. The first color filter sublayer is configured to transmit received light having a wavelength within the first wavelength region and within the second wavelength region, and to block light outside the first wavelength region and outside the second wavelength region. The second color filter sublayer is configured to block received light having a wavelength outside the second wavelength region.

In Example 29f, the subject matter of Example 28f can optionally include that the first color filter sublayer and/or the second color filter sublayer includes a plurality of second sublayer pixels.

In Example 30f, the subject matter of Example 29f can optionally include that the first color filter sublayer and/or the second color filter sublayer includes a plurality of second sublayer pixels in accordance with a Bayer pattern.

In Example 31f, the subject matter of any one of Examples 27f to 30f can optionally include that the first color filter sublayer includes a plurality of first sublayer pixels having the same size as the second sublayer pixels. The first sublayer pixels and the second sublayer pixels coincide with each other.

In Example 32f, the subject matter of any one of Examples 27f to 30f can optionally include that the first color filter sublayer comprises a plurality of first sublayer pixels having a size larger than the size of the second sublayer pixels. One first sublayer pixels laterally substantially overlaps with a plurality of the second sublayer pixels.

Example 33f is a LIDAR Sensor System, including a sensor according to any one of Examples 24f to 32f, and a sensor controller configured to control the sensor.

Example 34f is a method for a LIDAR Sensor System according to example 33f, wherein the LIDAR Sensor System is integrated into a LIDAR Sensor Device, and communicates with a second Sensor System and uses the object classification and/or the Probability Factors and/or Traffic Relevance factors measured by the second Sensor System for evaluation of current and future measurements and derived LIDAR Sensor Device control parameters as a function of these factors.

Pulsed laser sources may have various applications. An important field of application for pulsed laser sources may be time-of-flight LIDAR sensors or LIDAR systems. In a time-of-flight LIDAR system, a laser pulse may be emitted, the laser pulse may be reflected by a target object, and the reflected pulse may be received again by the LIDAR system. A distance to the object may be calculated by measuring the time that has elapsed between sending out the laser pulse and receiving the reflected pulse. Various types of lasers or laser sources may be used for a LIDAR application (e.g., in a LIDAR system). By way of example, a LIDAR system may include an edge-emitting diode laser, a vertical cavity surface-emitting laser (VCSEL), a fiber laser, or a solid state laser (e.g., a Nd:YAG diode pumped crystal laser, a disc laser, and the like). An edge-emitting diode laser or a VCSEL may be provided, for example, for low-cost applications.

A special driver circuit may be provided for a laser diode to operate in pulsed mode. A relatively high electrical current pulse may be sent through the laser diode within a short period of time (usually on the order of a few picoseconds up to a few microseconds) to achieve a short and intense optical laser pulse. The driver circuit may include a storage capacitor for supplying the electrical charge for the current pulse. The driver circuit may include a switching device (e.g., one or more transistors) for generating the current pulse. A direct connection between the laser source and a current source may provide an excessive current (illustratively, a much too large current). Silicon-based capacitors (e.g., trench capacitors or stacked capacitors) may be integrated into a hybrid or system-in-package for providing higher integration of laser drivers. The switching device for activating the current pulse through the laser diode may be a separate element from the capacitor.

The storage capacitor and the switching may be located at a certain distance away from the laser diode. This may be related to the dimensions of the various electrical components included in the capacitor and in the switching device. Illustratively, with discrete components a minimum distance of the order of millimeters may be present. The soldering of the discrete components on a printed circuit board (PCB) and the circuit lanes connecting the components on the printed circuit board (PCB) may prevent said minimum distance to be reduced further. This may increase the parasitic capacitances and inductances in the system.

Various embodiments may be based on integrating in a common substrate one or more charge storage capacitors, one or more switching devices (also referred to as switches), and one or more laser light emitters (e.g., one or more laser diodes). Illustratively, a system including a plurality of capacitors, a plurality of switching devices (e.g., a switching device for each capacitor), and one or more laser diodes integrated in or on a common substrate may be provided. The arrangement of the capacitors and the switching devices in close proximity to the one or more laser diodes (e.g., in the same substrate) may provide reduced parasitic inductances and capacitances (e.g., of an electrical path for a drive current flow). This may provide improved pulse characteristics (e.g., a reduced minimum pulse width, an increased maximum current at a certain pulse width, a higher degree of influence on the actual pulse shape, or a more uniform shape of the pulse).

In various embodiments, an optical package may be provided (also referred to as laser diode system). The optical package may include a substrate (e.g., a semiconductor substrate, such as a compound semiconductor material substrate). The substrate may include an array of a plurality of capacitors formed in the substrate. The substrate may include a plurality of switches. Each switch may be connected between at least one capacitor and at least one laser diode. The optical package may include the at least one laser diode mounted on the substrate. The optical package may include a processor (e.g., a laser driver control circuit or part of a laser driver control circuit) configured to control the plurality of switches to control a first current flow to charge the plurality of capacitors. The processor may be configured to control the plurality of switches to control a second current flow to drive the at least one laser diode with a current discharged from at least one capacitor (e.g., a current pulse through the laser diode). Illustratively, the processor may be configured to control the plurality of switches to control the second current flow to discharge the plurality of capacitors. The optical package may be provided, for example, for LIDAR applications. Illustratively, the optical package may be based on an array-distributed approach for the capacitors and the switches.

The first current flow may be the same as the second current flow. Illustratively, the current used for charging the capacitors may be the same as the current discharged from the capacitors. Alternatively, the first current flow may be different from the second current flow (for example, in case part of the charge stored in the capacitors has dissipated, as described in further detail below).

The arrangement of the components of the optical package (e.g., the capacitors, the switches, and the at least one laser diode) may be similar to the arrangement of the components of a dynamic random-access memory (DRAM). By way of example, each switch may be assigned to exactly one respective capacitor. A switch-capacitor pair (e.g., in combination with the associated laser diode) may be similar to a memory cell of a DRAM array (e.g., a memory cell may include, for example a storage capacitor, a transistor, and electrical connections).

The plurality of capacitors and the plurality of switches may be understood as a driver circuit (illustratively, as part of a driver circuit, for example of a DRAM-like driver circuit) of the at least one laser diode. The laser diode may partially cover the driver circuit (e.g., at least a portion of the array of capacitors). Illustratively, the driver circuit may be arranged underneath the laser diode. The driver circuit may be electrically connected with the laser diode (e.g., by means of a method of 3D-integration of integrated circuits, such as bump bonding). The capacitors (e.g., DRAM-like capacitors) may have sufficient capacity to provide enough current to the laser diode for high-power laser emission, illustratively for emission in time-of-flight LIDAR applications. In an exemplary arrangement, about 500000 capacitors (for example, each having a capacitance of about 100 fF) may be assigned to the laser diode (e.g., to a VCSEL, for example having a diameter of about 100 μm). The arrangement of the capacitors directly underneath the laser diode may provide small parasitic inductances and capacitances. This may simplify the generation of a short and powerful laser pulse (e.g., based on a current pulse of about 40 A in the exemplary arrangement). By way of example, a connection (e.g., an electrical path) between a capacitor (and/or a switch) and the laser diode may have an inductivity lower than 100 pH.

The charge stored in the capacitors may dissipate in case the charge is not used, e.g. after a certain period of time. A regular re-charging (illustratively, a refreshment) of the capacitors may be provided (e.g., at predefined time intervals). The charge dissipation may reduce the risk of unintentional emission of a laser pulse. The optical package may be provided or may operate without a high-resistivity resistor configured to discharge the storage capacitors over time periods larger than the laser pulse rate.

The driver circuit may be fabricated using DRAM manufacturing methods, e.g. CMOS technology methods. The capacitors may be deep trench capacitors or stacked capacitors (illustratively, at least one capacitor may be a deep trench capacitor and/or at least one capacitor may be a stacked capacitor). Each switch may include a transistor, e.g., a field effect transistor (e.g., a metal oxide semiconductor field effect transistor, such as a complementary metal oxide semiconductor field effect transistor). The driver circuit may be provided (and fabricated) in a cost-efficient manner (e.g., without expensive, high-performance high-speed power transistors, such as without GaN FET).

The laser diode may include a III-V semiconductor material as active material (e.g. from the AlGaAs or GaN family of semiconductors). By way of example, the laser diode may include an edge-emitting laser diode. As another example, the laser diode may include a vertical cavity surface-emitting laser diode (e.g., the optical package may be a VCSEL package).

In various embodiments, the processor may be configured to individually control the plurality of switches to control the first current flow to charge the plurality of capacitors.

In various embodiments, the processor may be configured to control the amount of charge to be delivered to the laser diode. The processor may be configured to individually control the plurality of switches to control the second current flow to drive the at least one laser diode with a current discharged from at least one capacitor. Illustratively, the processor may be configured to individually control the switches such that a variable number of capacitors associated with the laser diode may be discharged (illustratively, at a specific time) to drive the laser diode (e.g., only one capacitor, or some capacitors, or all capacitors). This may provide control over the total current for the current pulse and over the intensity of the outgoing laser pulse. Variable laser output power may be provided, e.g. based on a precisely adjusted current waveform.

By way of example, the optical package may include one or more access lines (e.g., similar to a DRAM circuit) for selectively charging and/or selectively discharging the capacitors (e.g., for charging and/or discharging a subset or a sub-array of capacitors).

In various embodiments, the optical package may include a plurality of laser diodes, for example arranged as a one-dimensional array (e.g., a line array) or as a two-dimensional array (e.g., a matrix array). By way of example, the optical package may include a VCSEL array. Each laser diode may be associated with (e.g., driven by) a corresponding portion of the driver circuit (e.g., corresponding capacitors and switches, for example corresponding 500000 capacitors).

In various embodiments, the optical package may include one or more heat dissipation components, such as one or more through vias, e.g. through-silicon vias (TSV), one or more metal layers, and/or one or more heat sink devices. By way of example, the optical package may include one or more heat sink devices arranged underneath the substrate (for example, in direct physical contact with the substrate). As another example, the optical package may include one or more through-silicon vias arranged outside and/or inside an area of the substrate including the switches and the capacitors. The one or more through-silicon vias may provide an improved (e.g., greater) heat conduction from the laser diode to a bottom surface of the substrate (illustratively, the mounting surface below the capacitor/switch array). As a further example, the optical package may include a metal layer arranged between the capacitors and the switches. The metal layer may improve heat transfer towards the sides of the optical package. The metal layer may have an additional electrical functionality, such as electrically contacting some of the capacitors with the sides of the optical package. The heat dissipation components may be provided to dissipate the thermal load related to the high-density integration of the components of the optical package (e.g., laser diode and driver circuit).

Figure 17A:
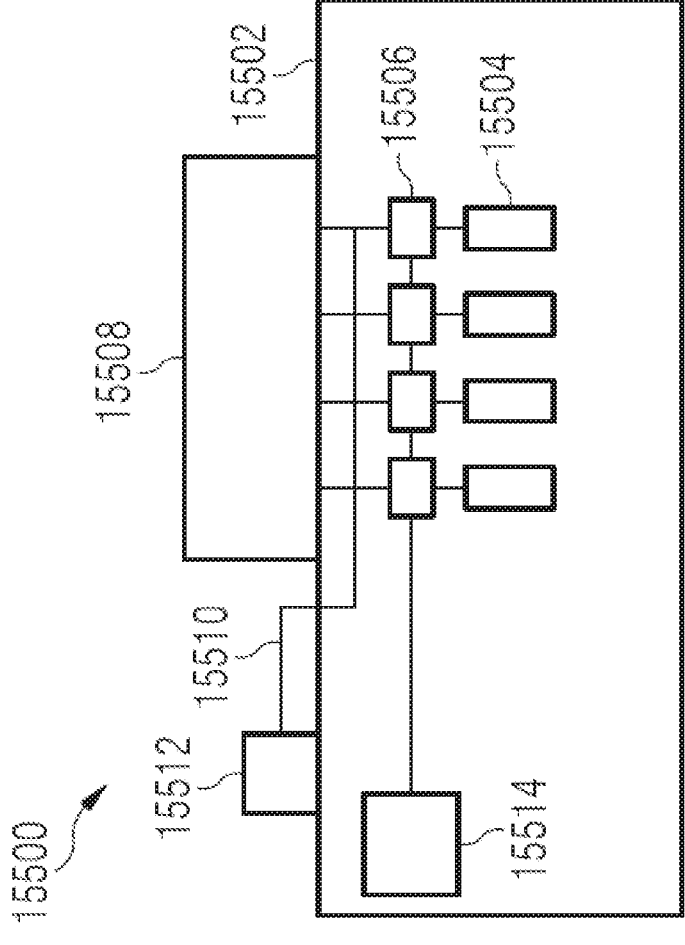
FIG. 17A shows a side view of an optical package in a schematic representation in accordance with various embodiments.

FIG. 17A shows an optical package 15500 in a schematic side view in accordance with various embodiments.

The optical package 15500 may include a substrate 15502. The substrate 15502 may be a semiconductor substrate. By way of example, the substrate 15502 may include silicon or may essentially consist of silicon. As another example, the substrate 15502 may include or essentially consist of a compound semiconductor material (e.g., GaAs, InP, GaN, or the like).

The substrate 15502 may include a plurality of capacitors 15504. The capacitors 15504 may be formed in the substrate 15502, e.g. the capacitors 15504 may be monolithically integrated in the substrate 15502. Illustratively, a capacitor 15504 may be surrounded on three sides or more by the substrate 15502 (e.g., by the substrate material). The capacitors 15504 may be fabricated, for example, by means of DRAM-manufacturing processes.

By way of example, at least one capacitor 15504 (or more than one capacitor 15504, or all capacitors 15504) may be a deep trench capacitor. Illustratively, a trench (or a plurality of trenches) may be formed into the substrate 15502 (e.g., via etching). A dielectric material may be deposited in the trench. A plate may be formed surrounding a lower portion of the trench. The plate may be or may serve as first electrode for the deep trench capacitor. The plate may be, for example, a doped region (e.g., an n-doped region) in the substrate 15502. A metal (e.g., a p-type metal) may be deposited on top of the dielectric layer. The metal may be or may serve as second electrode for the deep trench capacitor.

As another example, at least one capacitor 15504 (or more than one capacitor 15504, or all capacitors 15504) may be a stacked capacitor. Illustratively, an active area (or a plurality of separate active areas) may be formed in the substrate. A gate dielectric layer may be deposited on top of the active area (e.g., on top of each active area). A sequence of conductive layers and dielectric layers may be deposited on top of the gate dielectric layer. Electrical contacts may be formed, for example, via a masking and etching process followed by metal deposition.

The capacitors 15504 may be arranged in an ordered fashion in the substrate 15502, e.g. the plurality of capacitors 15504 may form an array. By way of example, the capacitors 15504 may be arranged in one direction to form a one-dimensional capacitor array. As another example, the capacitors 15504 may be arranged in two directions to form a two-dimensional capacitor array. Illustratively, the capacitors 15504 of the array of capacitors 15504 may be arranged in rows and columns (e.g., a number N of rows and a number M of columns, wherein N may be equal to M or may be different from M). It is understood that the plurality of capacitors 15504 may include capacitors 15504 of the same type or of different types (e.g., one or more deep trench capacitors and one or more stacked capacitors), for example different types of capacitors 15504 in different portions of the array (e.g., in different sub-arrays).

The substrate 15502 may include a plurality of switches 15506. The switches 15506 may be formed in the substrate 15502, e.g. the switches 15506 may be monolithically integrated in the substrate 15502. Each switch 15506 may be connected between at least one capacitor 15504 and at least one laser diode 15508 (e.g., each switch 15506 may be electrically coupled with at least one capacitor 15504 and at least one laser diode 15508). Illustratively, a switch 15506 may be arranged along an electrical path connecting a capacitor 15504 with the laser diode 15508.

A switch 15506 may be controlled (e.g., opened or closed) to control a current flow from the associated capacitor 15504 to the laser diode 15508. By way of example, each switch 15506 may include a transistor. At least one transistor (or more than one transistor, or all transistors) may be a field effect transistor, such as a metal oxide semiconductor field effect transistor (e.g., a complementary metal oxide semiconductor field transistor). It is understood that the plurality of switches 15506 may include switches 15506 of the same type or of different types.

Figure 17C:
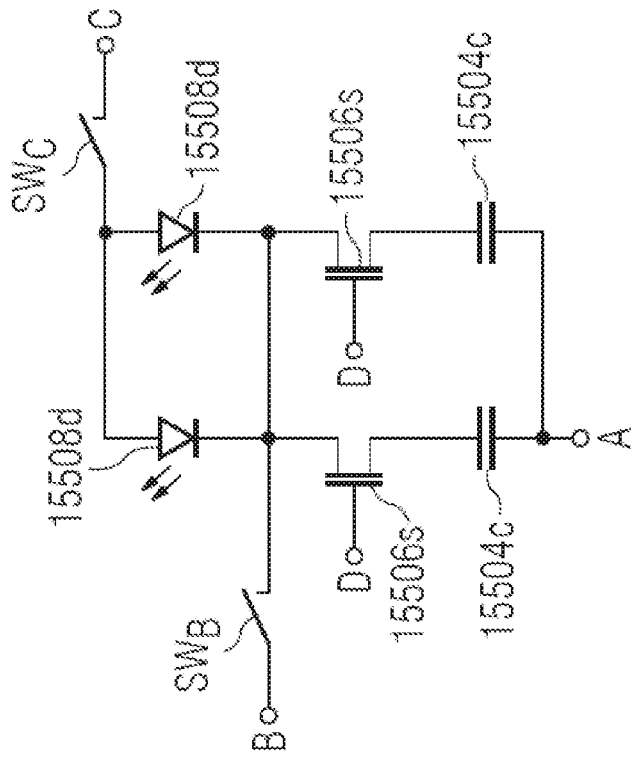
FIG. 17C shows a circuit equivalent in a schematic representation in accordance with various embodiments.
Figure 17B:
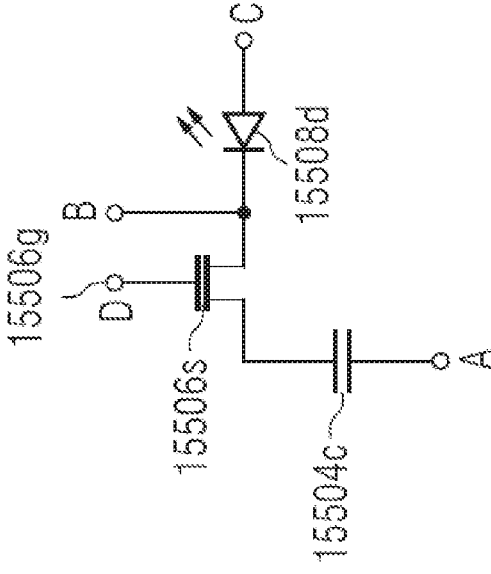
FIG. 17B shows a circuit equivalent in a schematic representation in accordance with various embodiments.

A switch 15506 may be assigned to more than one capacitor 15504 (e.g., a switch 15506 may be controlled to control a current flow between more than one capacitor 15504 and the laser diode 15508). Alternatively, each switch 15506 may be assigned to exactly one respective capacitor 15504. Illustratively, the substrate 15502 may include a plurality of switch-capacitor pairs (e.g., similar to a plurality of DRAM cells). This may be illustrated by the circuit equivalents shown, for example, in FIG. 17B and FIG. 17C. A switch 15506s may be controlled (e.g., via a control terminal 15506g, such as a gate terminal) to allow or prevent a current flow from the assigned capacitor 15504c to the laser diode 15508d (or to an associated laser diode, as shown in FIG. 17C).

The switches 15506 may have a same or similar arrangement as the capacitors 15504 (e.g., the substrate 15502 may include an array of switches 15506, such as a one-dimensional array or a two-dimensional array).

The optical package 15500 may include the at least one laser diode 15508. The laser diode 15508 may be mounted on the substrate 15502 (e.g., the laser diode 15508 may be arranged on a surface of the substrate 15502, such as a top surface, for example on an insulating layer of the substrate 15502). The laser diode 15508 may laterally cover at least a portion of the plurality of capacitors 15504. Illustratively, the laser diode 15508 may be mounted on the substrate 15502 in correspondence (e.g., directly above) of the plurality of capacitors 15504 or of at least a portion of the plurality of capacitors 15504. This may provide a low inductivity for an electrical path between a capacitor 15504 (or a switch 15506) and the laser diode 15508. The electrical path (e.g., between a capacitor 15504 and the laser diode 15508 and/or between a switch 15502 and the laser diode 15508) may have an inductivity in a range between 70 pH and 200 pH, for example lower than 100 pH.

The laser diode 15508 may be a laser diode suitable for LIDAR applications (e.g., the optical package 15500 may be included in a LIDAR system, for example in the LIDAR Sensor System 10). By way of example, the laser diode 15508 may be or may include an edge-emitting laser diode. As another example, the laser diode 15508 may be or may include a vertical cavity surface-emitting laser diode.

The laser diode 15508 may be configured to receive current discharged from the capacitors 15504. By way of example, the substrate 15502 may include a plurality of electrical contacts (e.g., each electrical contact may be connected with a respective capacitor 15504, for example via the respective switch 15506). The laser diode 15508 may be mounted on the electrical contacts or may be electrically connected with the electrical contacts. By way of example, a first terminal of the laser diode 15508 may be electrically connected to the electrical contacts, for example via an electrically conductive common line 15510, as described in further detail below (e.g., the first terminal of the laser diode 15508 may be electrically coupled to the common line 15510). A second terminal of the laser diode 15508 may be electrically connected to a second potential, e.g., to ground.

The laser diode 15508 may be associated with a number of capacitors 15504 for providing a predefined laser output power. By way of example, the laser diode 15508 may be configured to receive current discharged from a number of capacitors 15504 such that a predefined laser output power may be provided, for example above a predefined threshold. Stated in another fashion, the laser diode 15508 may be configured to receive current discharged from a number of capacitors 15504 such that a predefined current may flow in or through the laser diode 15508, for example a current above a current threshold. By way of example, the laser diode 15508 may be associated with a number of capacitors 15504 in the range from a few hundreds capacitors 15504 to a few millions capacitors 15504, for example in the range from about 100000 capacitors 15504 to about 1000000 capacitors 15504, for example in the range from about 400000 capacitors 15504 to about 600000 capacitors 15504, for example about 500000 capacitors 15504. Each capacitor 15504 may have a capacitance in the femtofarad range, for example in the range from about 50 fF to about 200 fF, for example about 100 fF. The capacitance of a capacitor 15504 may be selected or adjusted depending on the number of capacitors 15504 associated with the laser diode 15508 (illustratively, the capacitance may increase for decreasing number of associated capacitors 15504 and may decrease for increasing number of associated capacitors 15504). The capacitance of a capacitor 15504 may be selected or adjusted depending on the current flow to drive the laser diode 15508 (e.g., in combination with the number of associated capacitors 15504). At least one capacitor 15504, or some capacitors 15504, or all capacitors 15504 associated with the laser diode 15508 may be discharged (e.g., for each laser pulse emission). This may provide control over the emitted laser pulse, as described in further detail below.

The optical package 15500 may include more than one laser diode 15508 (e.g., a plurality of laser diodes), of the same type or of different types. Each laser diode may be associated with a corresponding plurality of capacitors 15504 (e.g., with a corresponding number of capacitors, for example in the range from about 400000 to about 600000, for example about 500000).

The laser diode 15508 may be configured to emit light (e.g., a laser pulse) in case the current discharged from the associated capacitors 15504 flows in the laser diode 15508. The laser diode may be configured to emit light in a predefined wavelength range, e.g. in the near infra-red or in the infra-red wavelength range (e.g., in the range from about 800 nm to about 1600 nm, for example at about 905 nm or at about 1550 nm). The duration of an emitted laser pulse may be dependent on a time constant of the capacitors 15504. By way of example, an emitted laser pulse may have a pulse duration (in other words, a pulse width) in the range from below 1 ns to several nanoseconds, for example in the range from about 5 ns to about 20 ns, for example about 10 ns.

The optical package 15500 may include an electrically conductive common line 15510 (e.g., a metal line). The common line 15510 may connect at least some capacitors 15504 of the plurality of capacitors 15504. Illustratively, the common line 15510 may connect (e.g., may be electrically connected with) the electrical contacts of at least some capacitors 15504 of the plurality of capacitors 15504. By way of example, the common line 15510 may connect all capacitors 15504 of the plurality of capacitors 15504. As another example, the optical package 15500 may include a plurality of common lines 15510, each connecting at least some capacitors 15504 of the plurality of capacitors 15504.

The optical package 15500 may include a power source 15512 (e.g., a source configured to provide a current, for example a battery). The power source 15512 may be electrically connected to the common line 15512 (or to each common line). The power source 15512 may be configured to provide power to charge the plurality of capacitors 15504 (e.g., the capacitors 15504 connected to the common line 15510).

The optical package 15500 may include a processor 15514. By way of example, the processor 15514 may be mounted on the substrate 15502. As another example, the processor 15514 may be monolithically integrated in the substrate 15502. Alternatively, the processor 15514 may be mounted on the printed circuit board 15602 (see FIG. 18). The processor may be configured to control the plurality of switches 15506 (e.g., to open or close the plurality of switches). As an example, the optical package 15500 (or the substrate 15502) may include a plurality of access lines electrically connected with control terminals of the switches 15506 (e.g., similar to word-lines in a DRAM). The processor 15514 may be configured to control the switches 15506 by providing a control signal (e.g., a voltage, such as a control voltage, or an electric potential) to the plurality of access lines (or to some access lines, or to a single access line). The processor 15514 may be configured to individually control the switches 15506, e.g. by providing individual control signals to the access line or lines connected to the switch 15506 or the switches 15506 to be controlled. By way of example, the processor 15514 may include or may be configured to control a voltage supply circuit used for supplying control voltages to the access lines (not shown).

The processor 15514 may be configured to control (e.g., to individually control) the plurality of switches 15506 to control a first current flow to charge the plurality of capacitors 15504. Illustratively, the processor 15514 may be configured to open the plurality of switches 15506 such that current may flow from the common line 15510 (illustratively, from the power source 15512) into the capacitors 15504.

The processor 15514 may be configured to control (e.g., to individually control) the plurality of switches 15506 to control a second current flow to discharge the plurality of capacitors 15504. Illustratively, the processor 15514 may be configured to open the plurality of switches 15506 such that the capacitors 15504 may be discharged (e.g., current may flow from the capacitors 15504 to the laser diode 15508). The first current flow may be the same as the second current flow or different from the second current flow (e.g., the first current flow may be greater than the second current flow).

The processor 15514 may be configured to control (e.g., to individually control) the plurality of switches 15506 to control the second current flow to drive the laser diode 15508 with current discharged from at least one capacitor 15504. The processor 15514 may be configured to adjust a current flow through the laser diode 15508 (e.g., to adjust a laser output power) by controlling (e.g., opening) the switches 15506 (e.g., by discharging a certain number of the capacitors 15504 associated with the laser diode 15508). Illustratively, the second current flow to drive the at least one laser diode 15508 may include a current proportional to the number of discharged capacitors 15504 (e.g., a current in the range from a few milliamperes up about 100 A, for example in the range from about 10 mA to about 100 A, for example from about 1 A to about 50 A, for example about 40 A).

The processor 15514 may be configured to control an emitted light pulse. The processor may be configured to control or select the properties of an emitted light pulse (e.g., a shape, a duration, and an amplitude of an emitted light pulse) by controlling the arrangement and/or the number of capacitors 15504 to be discharged (e.g., of discharged capacitors 15504). By way of example, a shape of the emitted light pulse may be controlled by discharging capacitors 15504 arranged in different locations within an array of capacitors 15504. As another example, an amplitude of the emitted light pulse may be increased (or decreased) by discharging a higher (or lower) number of capacitors 15504.

The processor 15514 may be configured to control the plurality of switches 15506 to discharge at least some capacitors 15504 to drive the laser diode 15508 to emit a light pulse (e.g., a laser pulse) of a predefined pulse shape (in other words, a light pulse having a certain waveform). By way of example, the processor 15514 may be configured to encode data in the emitted light pulse (e.g., to select a shape associated with data to be transmitted). Illustratively, the emitted light pulse may be modulated (e.g., electrically modulated) such that data may be encoded in the light pulse. The processor 15514 may be configured to control the discharge of the capacitors 15504 to modulate an amplitude of the emitted light pulse, for example to include one or more hump-like structure elements in the emitted light pulse. The processor 15514 may have access to a memory storing data (e.g., to be transmitted) associated with a corresponding pulse shape (e.g., storing a codebook mapping data with a corresponding pulse shape).

The processor 15514 may be configured to control the plurality of switches 15506 to discharge at least some capacitors 15504 to drive the laser diode 15508 to emit a light pulse dependent on a light emission scheme. By way of example, the processor 15514 may be configured to control the discharge of the capacitors 15504 to drive the laser diode 15508 to emit a sequence of light pulses, for example structured as a frame (illustratively, the temporal arrangement of the emitted light pulses may encode or describe data).

The optical package 15500 may include one or more further components, not illustrated in FIG. 17A. By way of example, the optical package 15500 (e.g., the substrate 15502) may include one or more additional switches (e.g., as illustrated for example in the circuit equivalent in FIG. 17C). A first additional switch (or a plurality of first additional switches) may be controlled (e.g., opened or closed) to selectively provide a path from the power source 15512 to the capacitors 15504. A second additional switch (or a plurality of second additional switches) may be controlled to selectively provide a path from the laser diode 15508 to an electrical contact (described in further detail below).

As illustrated in FIG. 17C, an exemplary operation of the optical package 15500 may be as follows. A first additional switch SW$_B$ may be opened to disconnect the power source from the capacitors 11504c (illustratively, the power source may be coupled with the node B, e.g. the terminal B, in FIG. 17B and FIG. 17C). The node A, e.g. the terminal A, in FIG. 17B and FIG. 17C may indicate the substrate (e.g., may be coupled with the substrate). A second additional switch SW$_C$ may be opened to disconnect the laser diode 15508d from the associated electrical contact (illustratively, the electrical contact may be coupled with the node C, e.g. the terminal C, in FIG. 17B and FIG. 17C). As an example, the second additional switch SW$_C$ may be opened to disconnect each laser diode 15508d from the associated electrical contact. As another example, each laser diode 15508d may have a respective additional switch and/or a respective electrical contact associated thereto. The capacitors 15504c to be charged may be selected by providing a corresponding control signal to the respective access line (e.g., applying a control voltage to the control terminal of the associated switch 15506s), illustratively coupled with the node D, e.g. the terminal D, in FIG. 17B and FIG. 17C. The first additional switch SW$_B$ may be closed to charge the selected capacitors. The access lines (e.g., control lines) may be deactivated after charging has been performed. The first additional switch SW$_B$ may be opened. The second additional switch SW$_C$ may be closed to provide an electrical path from the laser diode 15508d (e.g., from each laser diode 15508d) to the associated electrical contact. The capacitors 15504c to be discharged may be selected by providing a corresponding control signal to the respective access line. The selected capacitors 15504c may be discharged via the associated laser diode 15508d.

Figure 18:
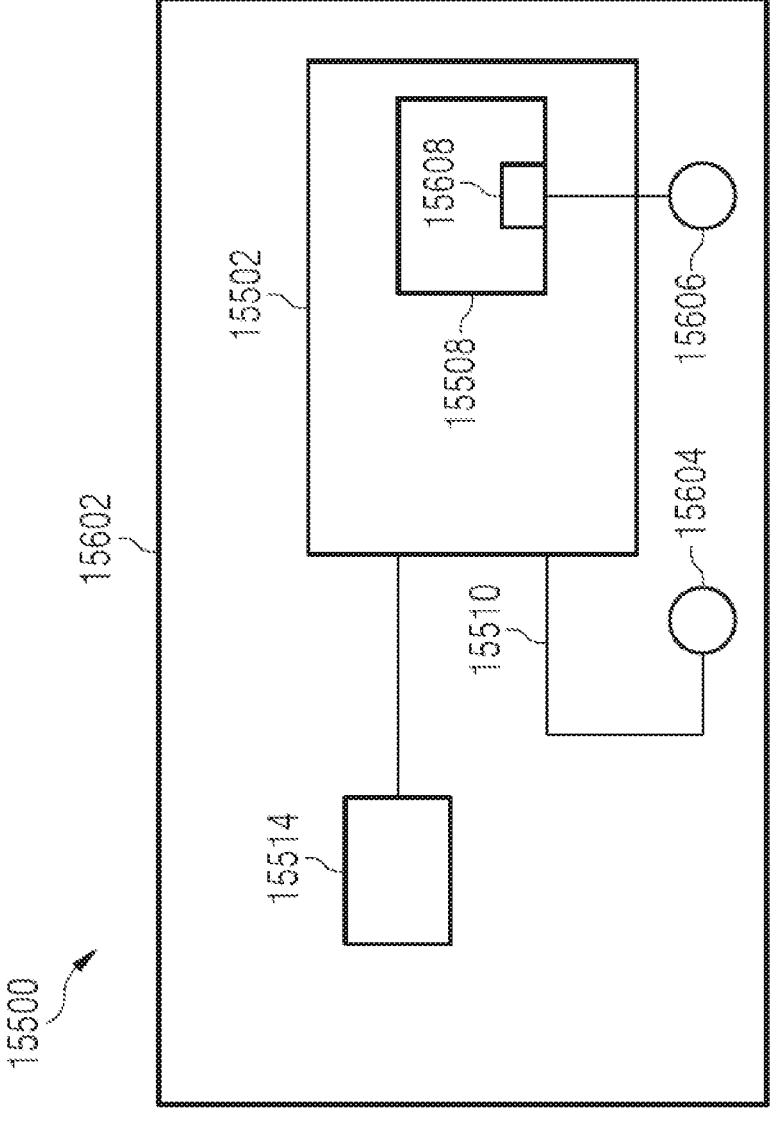
FIG. 18 shows a top view of an optical package in a schematic representation in accordance with various embodiments.

FIG. 18 shows a top view of the optical package 15500 in a schematic representation in accordance with various embodiments.

The optical package 15500 may include a base support, e.g. a printed circuit board 15602. The substrate 15502 may be mounted on the printed circuit board 15602 (e.g., integrated in the printed circuit board 15602). The processor 15514 may be mounted on the printed circuit board 15602.

The printed circuit board 15602 may include a first electrical contact 15604. The first electrical contact 15604 may be connected (e.g., electrically coupled) to the common line 15510 of the substrate 15502 (in other words, to the common line 15510 of the optical package 15500), as shown, for example, in FIG. 17A. By way of example, the first electrical contact 15604 may be wire bonded to the common line 15510. Power to charge the capacitors 15504 may be provided via the first electrical contact 15604 of the printed circuit board 15602. By way of example, a power source may be mounted on the printed circuit board 15602 and electrically coupled with the first electrical contact 15604.

The printed circuit board 15602 may include a second electrical contact 15606. The second terminal 15608 of the laser diode 15508 may be electrically coupled to the second electrical contact 15606 of the printed circuit board 15602. By way of example, the second electrical contact 15606 of the printed circuit board 15602 may be wire bonded to the second terminal 15608 of the laser diode 15508. The second electrical contact 15606 may provide a path for the current to flow through the laser diode 15508.

It is understood that the arrangement shown in FIG. 18 is illustrated as an example, and other configurations of the optical package 15500 may be provided. By way of example, the optical package 15500 may include a plurality of laser diodes 15508, for example arranged in a one-dimensional array or in a two-dimensional array (e.g., in a matrix array) over the base support. The optical package 15500 may include a plurality of first electrical contacts 15604 and/or a plurality of second electrical contacts 15606. As an example, the optical package 15500 may include a first electrical contact 15604 and a second electrical contact 15606 associated with each laser diode 15508. As another example, the optical package 15500 may include a first electrical contact 15604 for each line in an array of laser diodes 15508.

Figure 19A:
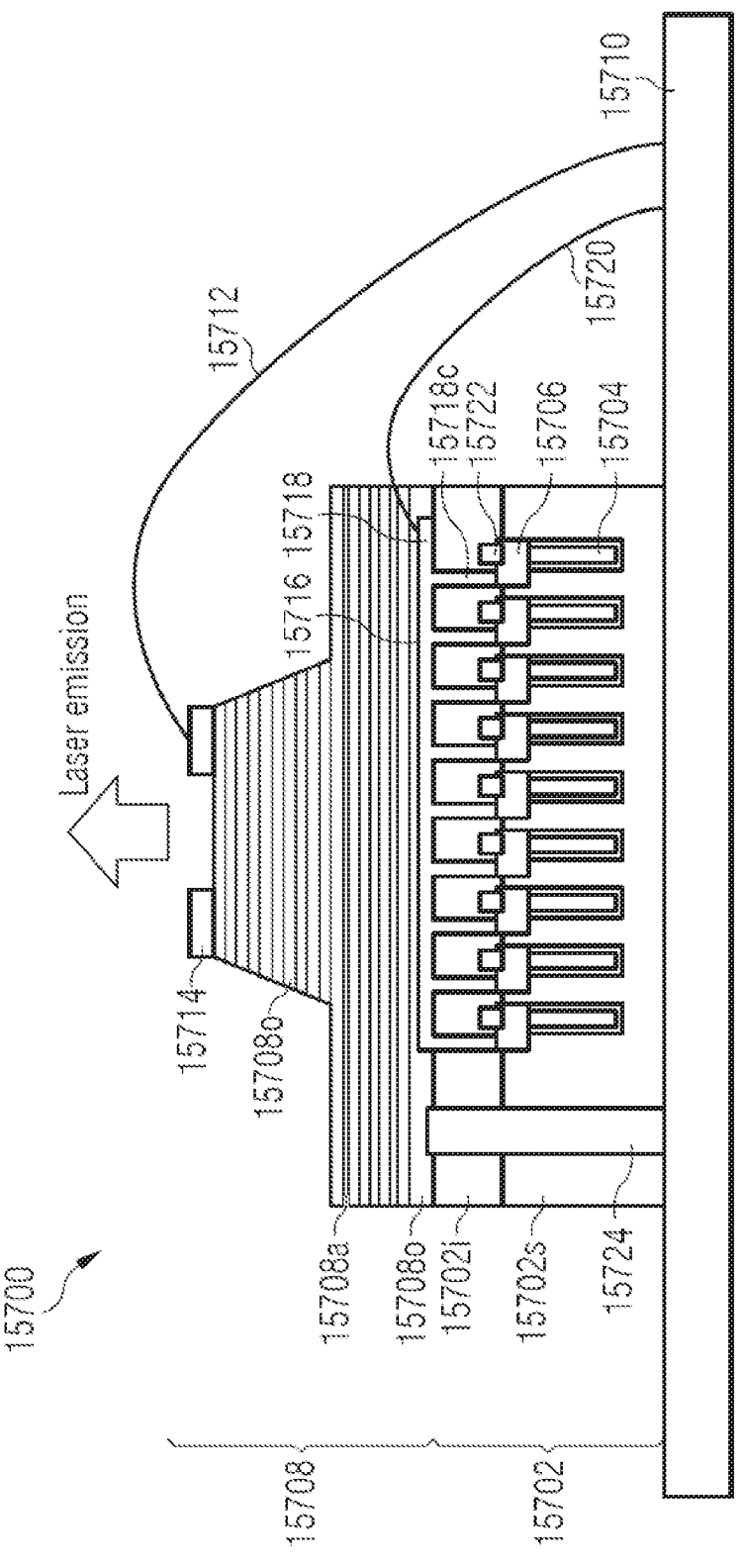
FIG. 19A shows a side view of an optical package in a schematic representation in accordance with various embodiments.
Figure 19B:
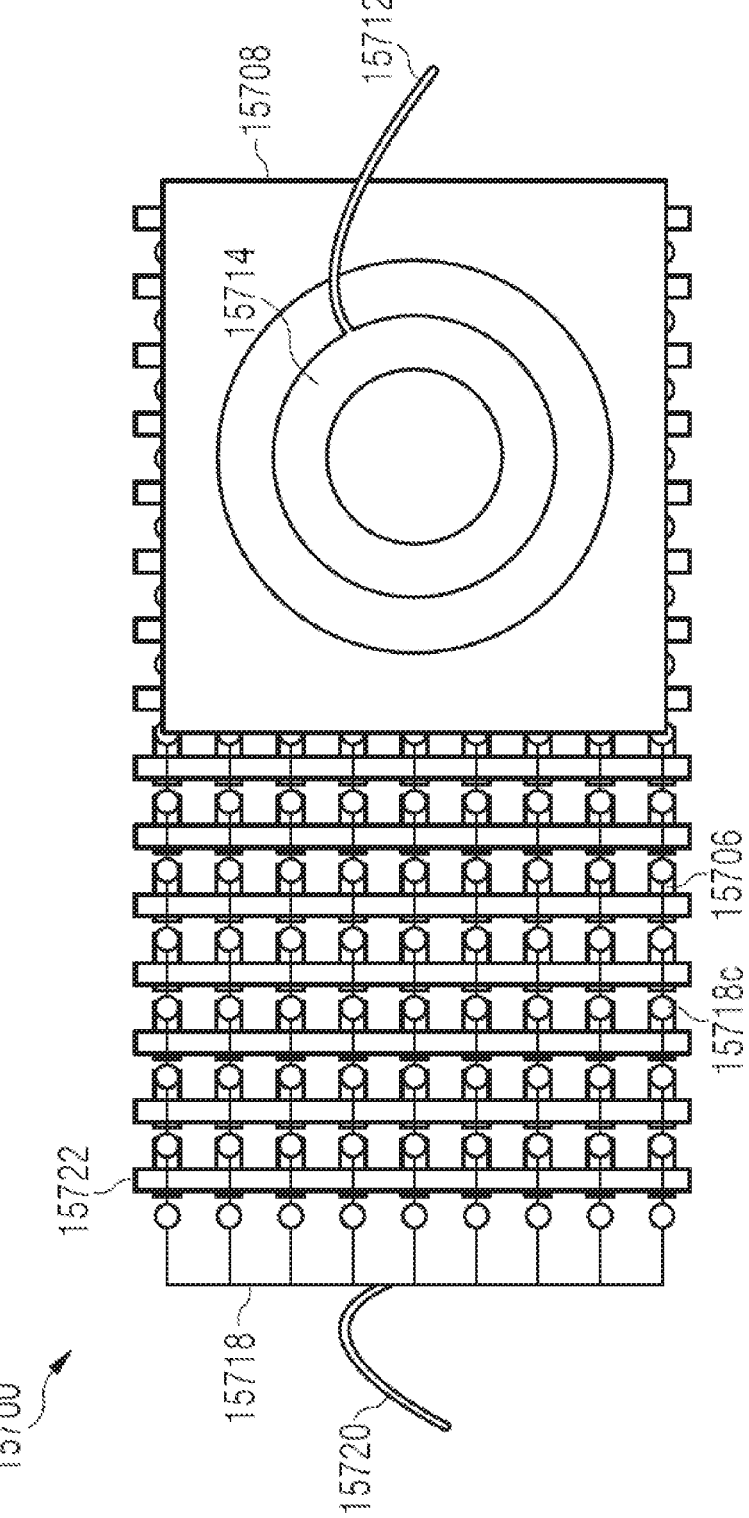
FIG. 19B shows a top view of an optical package in a schematic representation in accordance with various embodiments.

FIG. 19A and FIG. 19B show a side view and a top view, respectively, of an optical package 15700 in a schematic representation in accordance with various embodiments. In FIG. 19B, components of the optical package 15700 that may be arranged at different levels are illustrated, e.g. at different vertical positions within the optical package 15700 or within the substrate, according to the representation in FIG. 19A.

The optical package 15700 may be configured as the optical package 15500 described, for example, in relation to FIG. 17A to FIG. 156. Illustratively, the optical package 15700 may be an exemplary realization of the optical package 15500.

The optical package 15700 may include a substrate 15702. The optical package 15700 may include a plurality of storage capacitors 15704 formed (e.g., monolithically integrated) in the substrate 15702 (e.g., an array of storage capacitors 15704, for example a two-dimensional array). The optical package 15700 may include a plurality of switches 15706 formed (e.g., monolithically integrated) in the substrate, for example a plurality of transistors (e.g., field effect transistors). Each switch 15706 may be connected between at least one capacitor 15704 (e.g., exactly one capacitor 15704) and a laser diode 15708. The substrate 15702 may include a base 15702s, e.g. including or essentially consisting of silicon. The substrate 15702 may include an insulating layer 15702i, for example including an oxide, such as silicon oxide.

The laser diode 15708 may be a vertical cavity surface-emitting laser diode (e.g., emitting light from a top surface of the laser diode 15708), for example having a pyramid shape. The laser diode 15708 may be mounted on the substrate 15702 (e.g., on the insulating layer 15702i). The laser diode 15708 may include an active layer 15708a (illustratively, a layer of active material).

The laser diode 15708 may include one or more optical structures 15708o, arranged above and/or underneath the active layer 15708a. By way of example, the laser diode 15708 may include a first optical structure 15708o arranged on top of the active layer 15708a (e.g., in direct physical contact with the active layer 15708a). The first optical structure 15708o may be a top Bragg mirror (e.g., a sequence of alternating thin layers of dielectric materials having high and low refractive index). The laser diode 15708 may include a second optical structure 15708o arranged underneath the active layer 15708a (e.g., in direct physical contact with the active layer 15708a). The second optical structure 15708o may be a bottom Bragg mirror.

The optical package 15700 may include a printed circuit board 15710. The substrate 15702 may be mounted on the printed circuit board 15710. The laser diode 15708 may be electrically connected to the printed circuit board 15710 (e.g., to an electrical contact of the printed circuit board 15710), for example via one or more bond wires 15712. By way of example, the laser diode 15708 may include a (e.g., second) terminal 15714 arranged on top of the laser diode 15708 (e.g., a top contact). The terminal 15714 may be a ring-like mesa structure (e.g., to allow emission of the laser light), as illustrated, for example, in FIG. 19B. The one or more bond wires 15712 may be connected to the terminal 15714.

The laser diode 15708 may include another (e.g., first) terminal 15716 arranged at a bottom surface of the laser diode 15708 (e.g., a bottom contact). The terminal 15716 may be electrically coupled with a connector structure 15718 (e.g., a connector structure 15718 formed in the substrate 15702). The connector structure 15718 may provide electrical coupling (e.g., an electrical path) with the switches 15706 and the capacitors 15704 (e.g., between the terminal 15716 and the switches 15706 and the capacitors 15704). By way of example, the connector structure 15718 may include a plurality of electrical contacts 15718c, e.g. a grid-structure with individual pin-like elements. Each electrical contact 15718c may be connected with a respective capacitor 15704, for example via the respective switch 15706. Illustratively, the connector structure 15718 may be selectively coupled to the plurality of storage capacitors 15706 (e.g., pin-like storage capacitors) by the plurality of switching devices 15706. The connector structure 15718 may be an example for the common line 15510.

The connector structure 15718 may be used to charge the plurality of capacitors 15704. By way of example the connector structure 15718 may be electrically coupled with a power source. As another example, the connector structure 15718 may be electrically coupled with the printed circuit board 15710, for example via one or more bond wires 15720. The connector structure 15718 may be electrically coupled with an electrical terminal of the printed circuit board 15710. A power source may be electrically coupled with the electrical terminal of the printed circuit board 15710. Illustratively, the connector structure 15718 may have a comb-like arrangement including a plurality of connector lines (as shown in FIG. 19B). Each connector line may optionally include or be associated with a respective switch (e.g., a field effect transistor) for providing additional control over the selection of the capacitors to be charged (e.g., in addition to the selection by means of the access lines 15722).

The substrate 15702 may include a plurality of access lines 15722 (illustratively, a plurality of word-lines). Each access line may be electrically coupled with one or more switches 15706 (e.g., with respective control terminals, e.g. gate terminals, of one or more switches 15706). The access lines 15722 may be used to control (e.g., open or close) the one or more switches 15706 coupled thereto.

The optical package 15700 may include a processor configured as the processor 15514 described above, for example in relation to FIG. 17A to FIG. 18. The processor may be configured to control the switches 15706 by supplying a control signal (e.g., a plurality of control signals) via the plurality of access lines 15522.

The optical package 15700 (e.g., the substrate 15702) may include one or more through-vias 15724 (e.g., through-silicon vias), as an example of heat dissipation component. By way of example, a through-via 15724 may extend through the substrate in the vertical direction (e.g., through the base 15702s and through the insulating layer 15702i). The through-via 15724 may be filled with a heat dissipation or heat conducting material, such as a metal (e.g., deposited or grown in the through-via 15724). The through-via 15724 may be arranged outside the area in which the plurality of capacitors 15704 and/or the plurality of switches 15706 are formed in the substrate 15702.

In the following, various aspects of this disclosure will be illustrated:

Example 1ad is an optical package. The optical package may include a substrate. The substrate may include an array of a plurality of capacitors formed in the substrate. The substrate may include a plurality of switches formed in the substrate. Each switch may be connected between at least one laser diode and at least one capacitor of the plurality of capacitors. The optical package may include the at least one laser diode mounted on the substrate. The optical package may include a processor configured to control the plurality of switches to control a first current flow to charge the plurality of capacitors. The processor may be configured to control the plurality of switches to control a second current flow to drive the at least one laser diode with current discharged from at least one capacitor of the plurality of capacitors.

In example 2ad, the subject-matter of example 1ad can optionally include that the plurality of capacitors and the plurality of switches are monolithically integrated in the substrate.

In example 3ad, the subject-matter of any one of examples 1ad or 2ad can optionally include that each switch of the plurality of switches is assigned to exactly one respective capacitor of the plurality of capacitors.

In example 4ad, the subject-matter of example 3ad can optionally include that the processor is configured to individually control the plurality of switches to control the first current flow to charge the plurality of capacitors. The processor may be configured to individually control the plurality of switches to control the second current flow to drive the at least one laser diode with current discharged from at least one capacitor of the plurality of capacitors.

In example 5ad, the subject-matter of any one of examples 1ad to 4ad can optionally include that each switch of the plurality of switches includes a transistor.

In example 6ad, the subject-matter of example 5ad can optionally include that at least one transistor of the plurality of transistors is a field effect transistor.

In example 1ad, the subject-matter of example 6ad can optionally include that at least one field effect transistor of the plurality of transistors is a metal oxide semiconductor field effect transistor.

In example 8ad, the subject-matter of example 1ad can optionally include that at least one metal oxide semiconductor field effect transistor of the plurality of transistors is a complementary metal oxide semiconductor field effect transistor.

In example 9ad, the subject-matter of any one of examples 1ad to 8ad can optionally include that the array of capacitors includes a number of capacitors in the range from about 400000 capacitors to about 600000 capacitors associated with the at least one laser diode.

In example 10ad, the subject-matter of any one of examples 1ad to 9ad can optionally include that at least one capacitor of the array of capacitors has a capacitance in the range from about 50 fF to about 200 fF.

In example 11ad, the subject-matter of any one of examples 1ad to 10ad can optionally include that the current flow to drive the at least one laser diode includes a current in the range from about 10 mA to about 100 A.

In example 12ad, the subject-matter of any one of examples 1ad to 11ad can optionally include that an electrical path between a capacitor and the at least one laser diode has an inductivity lower than 100 pH.

In example 13ad, the subject-matter of any one of examples 1ad to 12ad can optionally include that at least one capacitor of the array of capacitors is a deep trench capacitor.

In example 14ad, the subject-matter of any one of examples 1ad to 13ad can optionally include that at least one capacitor of the array of capacitors is a stacked capacitor.

In example 15ad, the subject-matter of any one of examples 1ad to 14ad can optionally include that the capacitors of the array of capacitors are arranged in rows and columns.

In example 16ad, the subject-matter of any one of examples 1ad to 15ad can optionally include an electrically conductive common line connecting at least some capacitors of the plurality of capacitors.

In example 17ad, the subject-matter of example 16ad can optionally include a power source electrically connected to the common line and configured to provide the power to charge the plurality of capacitors.

In example 18ad, the subject-matter of any one of examples 1ad to 17ad can optionally include a printed circuit board. The substrate may be mounted on the printed circuit board.

In example 19ad, the subject-matter of any one of examples 16ad or 17ad can optionally include a printed circuit board. The substrate may be mounted on the printed circuit board. The printed circuit board may include an electrical contact electrically coupled to the common line of the substrate.

In example 20ad, the subject-matter of example 19ad can optionally include that the electrical contact of the printed circuit board is wire bonded to the common line of the substrate.

In example 21ad, the subject-matter of any one of examples 16ad to 20ad can optionally include a printed circuit board. The substrate may be mounted on the printed circuit board. A first terminal of the at least one laser diode may be electrically coupled to the common line. A second terminal of the at least one laser diode may be electrically coupled to an electrical contact of the printed circuit board.

In example 22ad, the subject-matter of example 21ad can optionally include that the electrical contact of the printed circuit board is wire bonded to the second terminal of the at least one laser diode.

In example 23ad, the subject-matter of any one of examples 1ad to 22ad can optionally include the substrate includes or essentially consists of silicon.

In example 24ad, the subject-matter of any one of examples 1ad to 23ad can optionally include that the at least one laser diode laterally covers at least a portion of the plurality of capacitors.

In example 25ad, the subject-matter of any one of examples 1ad to 24ad can optionally include that the at least one laser diode includes an edge emitting laser diode.

In example 26ad, the subject-matter of any one of examples 1ad to 24ad can optionally include that the at least one laser diode includes a vertical cavity surface-emitting laser diode.

In example 27ad, the subject-matter of any one of examples 1ad to 26ad can optionally include that the processor is monolithically integrated in the substrate.

In example 28ad, the subject-matter of any one of examples 19ad to 26ad can optionally include that the processor is mounted on the printed circuit board.

In example 29ad, the subject-matter of any one of examples 19ad to 28ad can optionally include that the processor is configured to control the plurality of switches to discharge at least some capacitors of the plurality of capacitors to drive the at least one laser diode to emit a laser pulse of a predefined pulse shape.

In example 30ad, the subject-matter of example 29ad can optionally include that the laser pulse has a pulse duration of about 10 ns.

In example 31ad, the subject-matter of any one of examples 29ad or 30ad can optionally include that the processor is configured to control the plurality of switches to discharge at least some capacitors of the plurality of capacitors to drive the at least one laser diode to emit a laser pulse dependent on a light emission scheme.

In example 32ad, the subject-matter of any one of examples 29ad to 31ad can optionally include that the processor is configured to control the plurality of switches to discharge at least some capacitors of the plurality of capacitors to drive the at least one laser diode to emit a laser pulse of a predefined pulse shape.

Example 33ad is a LIDAR Sensor System including an optical package of any one of examples 1ad to 32ad.

CONCLUSION

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific advantageous embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments can be implemented in any of numerous ways. The embodiments may be combined in any order and any combination with other embodiments. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device (e.g. LIDAR Sensor Device) not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various disclosed concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various advantageous concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the disclosure above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the eighth edition as revised in July 2010 of the United States Patent Office Manual of Patent Examining Procedures, Section 2111.03

For the purpose of this disclosure and the claims that follow, the term "connect" has been used to describe how various elements interface or "couple". Such described interfacing or coupling of elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

In the context of this description, the terms "connected" and "coupled" are used to describe both a direct and an indirect connection and a direct or indirect coupling.

APPENDIX: EXPLANATIONS AND GLOSSARY

This section provides some explanations and descriptions of certain aspects and meanings of the referenced technical terms, but are not limiting in their understanding.

Actuators

Actuators are components or devices which are able to convert energy (e.g. electric, magnetic, photoelectric, hydraulic, pneumatic) into a mechanical movement (e.g. translation, rotation, oscillation, vibration, shock, pull, push, etc.). Actuators may be used for example in order to move and/or change and/or modify components such as mechanical elements, optical elements, electronic elements, detector elements, etc. and/or materials or material components. Actuators can also be suited to emit, for example, ultrasound waves, and so on.

ASIC

An Application-Specific Integrated Circuit (ASIC) is an integrated circuit device, which was designed to perform particular, customized functions. As building blocks, ASICs may comprise a large number of logic gates. In addition, ASICs may comprise further building blocks such as microprocessors and memory blocks, forming so-called Systems-on-Chip (SOC).

Automated Guided Vehicle (AGV)

An automated guided vehicle or automatic guided vehicle (AGV) is a robot that follows markers or wires in the floor, or uses vision, magnets, or lasers for navigation. An AGV can be equipped to operate autonomously.

Autonomous Vehicle (AV)

There are numerous terms, which are currently in use to describe vehicles with a certain extent of automatic driving capability. Such vehicles are capable to perform—without direct human interaction—at least some of the activities, which previously could be performed only by a human driver. According to SAE International (Society of Automotive Engineers), six levels of automation can be defined (SAE J3016), starting with Level 0 (where automated systems issue warnings or may momentarily intervene) up to Level 5 (where no human interaction is required at all).

An increasing number of modern vehicles is already equipped with so-called Advanced Driver-Assistance Systems (ADAS), which are configured to help the driver during the driving process or to intervene in specific driving situations. Such systems may comprise basic features such as anti-lock braking systems (ABS) and electronic stability controls (ESC), which are usually considered as Level 0 features, as well as more complex features, such as lane departure warning, lane keep assistant, lane change support, adaptive cruise control, collision avoidance, emergency break assistant and adaptive high-beam systems (ADB), etc., which may be considered as Level 1 features. Levels 2, 3 and 4 features can be denoted as partial automation, conditional automation and high automation, respectively. Level 5 finally, can be denoted as full automation.

Alternative and widely used terms for Level 5 are driverless cars, self-driving cars or robot cars. In case of industrial applications, the term Automated Guided Vehicle (AGV) is widely used to denote vehicles with partial or full automation for specific tasks like for example material transportation in a manufacturing facility or a warehouse. Furthermore, also Unmanned Aerial Vehicles (UAV) or drones may exhibit different levels of automation. Unless otherwise stated, the term "Autonomous Vehicle (AV)" is considered to comprise, in the context of the present patent application, all the above mentioned embodiments of vehicles with partial, conditional, high or full automation.

Beacon

A Beacon is a device that emits signal data for communication purposes, for example based on Bluetooth or protocols based on DIIA, THREAD, ZIGBee or MDSIG technology. A Beacon can establish a Wireless Local Area Network.

Beam Steering

Generally speaking, the light beam emitted by the light source may be transmitted into the Field of Illumination (FOI) either in a scanning or a non-scanning manner. In case of a non-scanning LIDAR (e.g. Flash LIDAR), the light of the light source is transmitted into the complete FOI in one single instance, i.e. the light beam is broadened (e.g. by a diffusing optical element) in such a way that the whole FOI is illuminated at once.

Alternatively, in case of a scanning illumination, the light beam is directed over the FOI either in a 1-dimensional manner (e.g. by moving a vertical light stripe in a horizontal direction, or vice versa) or in a 2-dimensional manner (e.g. by moving a light spot along a zigzag pattern across the FOI). To perform such beam steering operations both mechanical and non-mechanical solutions are applicable.

Mechanical solutions may comprise rotating mirrors, oscillating mirrors, in particular oscillating micro-electro-mechanical mirrors (MEMS), Digital Mirror Devices (DMD), Galvo-Scanner, etc. The moving mirrors may have plane surface areas (e.g. with circular, oval, rectangular or polygonal shape) and may be tilted or swiveled around one or more axes. Non-mechanical solutions may comprise so called optical phased arrays (OPA) in which the phases of light waves are varied by dynamically controlling the optical properties of an adjustable optical element (e.g. phase modulators, phase shifters, Liquid Crystal Elements (LCD), etc.).

Communication Interface

Communication interface describes all sorts of interfaces or gateways between two devices, which can be used to exchange signals. Signals in this context may comprise simple voltage or current levels, as well as complex information based on the above described coding or modulation techniques.

In case of a LIDAR Sensor System, communication interfaces may be used to transfer information (signals, data, etc.) between different components of the LIDAR Sensor System. Furthermore, communication interfaces may be used to transfer information (signals, data, etc.) between the LIDAR Sensor System or its components or modules and other devices provided in the vehicle, in particular other sensor systems (LIDAR, RADAR, Ultrasonic, Cameras) in order to allow sensor fusion functionalities.

Communication Unit (CU)

A communication unit is an electronic device, which is configured to transmit and/or receive signals to or from other communication units. Communication units may exchange information in a one-directional, bi-directional or multi-directional manner. Communication signals may be exchanged via electromagnetic waves (including radio or microwave frequencies), light waves (including UV, VIS, IR), acoustic waves (including ultrasonic frequencies). The information may be exchanged using all sorts of coding or modulation techniques e.g. pulse width modulation, pulse code modulation, amplitude modulation, frequency modulation, etc.

The information may be transmitted in an encrypted or non-encrypted manner and distributed in a trusted or distrusted network (for example a Blockchain ledger). As an example, vehicles and elements of road infrastructure may comprise CUs in order to exchange information with each other via so-called C2C (Car-to-Car) or C2X (Car-to-Infrastructure or Car-to-Environment). Furthermore, such communication units may be part of Internet-of-Things (IoT) Systems, i.e. a network of devices, sensors, vehicles, and other appliances, which connect, interact and exchange data with each other.

Component

Component describes the elements, in particular the key elements, which make up the LIDAR System. Such key elements may comprise a light source unit, a beam steering unit, a photodetector unit, ASIC units, processor units, timing clocks, generators of discrete random or stochastic values, and data storage units. Further, components may comprise optical elements related to the light source, optical elements related to the detector unit, electronic devices related to the light source, electronic devices related to the beam steering unit, electronic devices related to the detector unit and electronic devices related to ASIC, processor and data storage and data executing devices. Components of a LIDAR Sensor System may further include a high-precision clock, a Global-Positioning-System (GPS) and an inertial navigation measurement system (IMU).

Computer Program Device

A Computer program device is a device or product, which is able to execute instructions stored in a memory block of the device or which is able to execute instructions that have been transmitted to the device via an input interface. Such computer program products or devices comprise any kind of computer-based system or software-based system, including processors, ASICs or any other electronic device which is capable to execute programmed instructions. Computer program devices may be configured to perform methods, procedures, processes or control activities related to LIDAR Sensor Systems.

Control and Communication System

A Control and Communication System receives input from the LIDAR Data Processing System and communicates with the LIDAR Sensing System, LIDAR Sensor Device and vehicle control and sensing system as well as with other objects/vehicles.

Controlled LIDAR Sensor System

Controlled LIDAR Sensor System comprises one or many controlled "First LIDAR Sensor Systems", and/or one or many controlled "Second LIDAR Sensor Systems", and/or one or many controlled LIDAR Data Processing Systems, and/or one or many controlled LIDAR Sensor Devices, and/or one or many controlled Control and Communication Systems.

Controlled means local or remote checking and fault detection and repair of either of the above-mentioned LIDAR Sensor System components. Controlled can also mean the control of a LIDAR Sensor Device, including a vehicle.

Controlled can also mean the inclusion of industry standards, bio feedbacks, safety regulations, autonomous driving levels (e.g. SAE Levels) and ethical and legal frameworks.

Controlled can also mean the control of more than one LIDAR Sensor System, or more than one LIDAR Sensor Device, or more than one vehicle and/or other objects.

A Controlled LIDAR Sensor System may include the use of artificial intelligent systems, data encryption and decryption, as well as Blockchain technologies using digital records that store a list of transactions (called "blocks") backed by a cryptographic value. Each block contains a link to the previous block, a timestamp, and data about the transactions that it represents. Blocks are immutable, meaning that they can't easily be modified once they're created. And the data of a blockchain are stored non-locally, i.e. on different computers.

A Controlled LIDAR Sensor System may be configured to perform sensor fusion functions, such as collecting, evaluating and consolidating data from different sensor types (e.g. LIDAR, RADAR, Ultrasonic, Cameras). Thus, the Controlled LIDAR Sensor System comprises feedback- and control-loops, i.e. the exchange of signals, data and information between different components, modules and systems which are all employed in order to derive a consistent understanding of the surroundings of a sensor system, e.g. of a sensor system onboard a vehicle.

Data Analysis

Various components (e.g. detectors, ASIC) and processes (like Signal/Noise measurement and optimization, fusion of various other sensor signals like from other LIDAR Sensors Systems, Radar, Camera or ultrasound measurements)) are provided as being necessary to reliably measure backscattered LIDAR signals and derive information regarding the recognition of point clouds and subsequent object recognition and classification. Signals and data may be processed via Edge-Computing or Cloud-Computing systems, using corresponding Communication Units (CUs). Signals and data may be transmitted for that matter in an encrypted manner.

For increased data security and data permanence, further provisions may be taken such as implementation of methods based on Blockchain or smart contracts. Data security can also be enhanced by a combination of security controls, measures and strategies, singly and/or in combination, applied throughout a system's "layers", including human, physical, endpoint, network, application and data environments.

Data analysis may benefit using data deconvolution methods or other suited methods that are known in imaging and signal processing methods, including neuronal and deep learning techniques.

Data Usage

LIDAR generated data sets can be used for the control and steering of vehicles (e.g. cars, ships, planes, drones), including remote control operations (e.g. parking operations or operations executed for example by an emergency officer in a control room). The data sets can be encrypted and communicated (C2C, C2X), as well as presented to a user (for example by HUD or Virtual/Augmented Reality using wearable glasses or similar designs). LIDAR Systems can also be used for data encryption purposes.

Data Usage may also comprise using methods of Artificial Intelligence (AI), i.e. computer-based systems or computer implemented methods which are configured to interpret transmitted data, to learn from such data based on these interpretations and derive conclusions which can be implemented into actions in order to achieve specific targets. The data input for such AI-based methods may come from LIDAR Sensor Systems, as well as other physical or bio-feedback sensors (e.g. Cameras which provide video streams from vehicle exterior or interior environments, evaluating e.g. the line of vision of a human driver). AI-based methods may use algorithms for pattern recognition. Data Usage, in general, may employ mathematical or statistical methods in order to predict future events or scenarios based on available previous data sets (e.g. Bayesian method). Furthermore, Data Usage may include considerations regarding ethical questions (reflecting situations like for example the well-known "trolley dilemma").

Detector

A Detector is a device which is able to provide an output signal (to an evaluation electronics unit) which is qualitatively or quantitatively correlated to the presence or the change of physical (or chemical) properties in its environment. Examples for such physical properties are temperature, pressure, acceleration, brightness of light (UV, VIS, IR), vibrations, electric fields, magnetic fields, electromagnetic fields, acoustic or ultrasound waves, etc. Detector devices may comprise cameras (mono or stereo) using e.g. light-sensitive CCD or CMOS chips or stacked multilayer photodiodes, ultrasound or ultrasonic detectors, detectors for radio waves (RADAR systems), photodiodes, temperature sensors such as NTC-elements (i.e. a thermistor with negative temperature coefficient), acceleration sensors, etc.

A photodetector is a detection device, which is sensitive with respect to the exposure to electromagnetic radiation. Typically, light photons are converted into a current signal upon impingement onto the photosensitive element. Photosensitive elements may comprise semiconductor elements with p-n junction areas, in which photons are absorbed and converted into electron-hole pairs. Many different detector types may be used for LIDAR applications, such as photo diodes, PN-diodes, PIN diodes (positive intrinsic negative diodes), APD (Avalanche Photo-Diodes), SPAD (Single Photon Avalanche Diodes), SiPM (Silicon Photomultipliers), CMOS sensors (Complementary metal-oxide-semiconductor, CCD (Charge-Coupled Device), stacked multilayer photodiodes, etc.

In LIDAR systems, a photodetector is used to detect (qualitatively and/or quantitatively) echo signals from light which was emitted by the light source into the FOI and which was reflected or scattered thereafter from at least one object in the FOI. The photodetector may comprise one or more photosensitive elements (of the same type or of different types) which may be arranged in linear stripes or in two-dimensional arrays. The photosensitive area may have a rectangular, quadratic, polygonal, circular or oval shape. A photodetector may be covered with Bayer-like visible or infrared filter segments.

Digital Map

A digital map is a collection of data that may be used to be formatted into a virtual image. The primary function of a digital map is to provide accurate representations of measured data values. Digital mapping also allows the calculation of geometrical distances from one object, as represented by its data set, to another object. A digital map may also be called a virtual map.

Electronic Devices

Electronic devices denotes all kinds of electronics components or electronic modules, which may be used in a LIDAR Sensor System in order to facilitate its function or improve its function. As example, such electronic devices may comprise drivers and controllers for the light source, the beam steering unit or the detector unit. Electronic devices may comprise all sorts of electronics components used in order to supply voltage, current or power. Electronic devices may further comprise all sorts of electronics components used in order to manipulate electric or electronic signals, including receiving, sending, transmitting, amplifying, attenuating, filtering, comparing, storing or otherwise handling electric or electronic signals.

In a LIDAR system, there may be electronic devices related to the light source, electronic devices related to the beam steering unit, electronic devices related to the detector unit and electronic devices related to ASIC and processor units. Electronic devices may comprise also Timing Units, Positioning Units (e.g. actuators), position tracking units (e.g. GPS, Geolocation, Indoor-Positioning Units, Beacons, etc.), communication units (WLAN, radio communication, Bluetooth, BLE, etc.) or further measurement units (e.g. inertia, accelerations, vibrations, temperature, pressure, position, angle, rotation, etc.).

Field of Illumination

The term Field of Illumination (FOI) relates to the solid angle sector into which light can be transmitted by the LIDAR light source (including all corresponding downstream optical elements). The FOI is limited along a horizontal direction to an opening angle $\square\square_H$ and along a vertical direction to an opening angle $\square\square_V$. The light of the LIDAR light source may be transmitted into the complete FOI in one single instance (non-scanning LIDAR) or may be transmitted into the FOI in a successive, scanning manner (scanning LIDAR).

Field of View

The term Field of View (FOV) relates to the solid angle sector from which the LIDAR detector (including all corresponding upstream optical elements) can receive light signals. The FOV is limited along a horizontal direction to an opening angle $alpha_H$ and along a vertical direction to an opening angle $alpha_V$.

Flash LIDAR Sensor System

A LIDAR Sensor System where the angular information (object recognition) about the environment is gained by using an angularly sensitive detector is usually called a Flash LIDAR Sensor System.

Frame (Physical Layer)

In the context of the present application the term "frame" may be used to describe a logical structure of a signal (e.g., an electrical signal or a light signal or a LIDAR signal, such as a light signal). Illustratively, the term "frame" may describe or define an arrangement (e.g., a structure) for the content of the frame (e.g., for the signal or the signal components). The arrangement of content within the frame may be configured to provide data or information. A frame may include a sequence of symbols or symbol representations. A symbol or a symbol representation may have a different meaning (e.g., it may represent different type of data) depending on its position within the frame. A frame may have a predefined time duration. Illustratively, a frame may define a time window, within which a signal may have a predefined meaning. By way of example, a light signal configured to have a frame structure may include a sequence of light pulses representing (or carrying) data or information. A frame may be defined by a code (e.g., a signal modulation code), which code may define the arrangement of the symbols within the frame.

Gateway

Gateway means a networking hardware equipped for interfacing with another network. A gateway may contain devices such as protocol translators, impedance matching devices, rate converters, fault isolators, or signal translators as necessary to provide system interoperability. It also requires the establishment of mutually acceptable administrative procedures between both networks. In other words, a gateway is a node on a network that serves as a 'gate' or entrance and exit point to and from the network. In other words, a node is an active redistribution and/or communication point with a unique network address that either creates, receives or transmits data, sometimes referred to as a 'data node'.

Human Machine Interaction (HMI)

For Human-Machine Interactions (HMI), for example the interaction between a vehicle and a driver, it might be necessary to process data and information such that they can be provided as graphical representations or in other forms of visualizations, e.g. HUD or methods of Augmented Reality (AR) or Virtual Reality (VR). Biofeedback systems, which may evaluate biological parameters such as fatigue, dizziness, increased heartbeat, nervousness, etc., may be included into such Human-Machine Interaction systems. As an example, a biofeedback system may detect that the driver of a vehicle shows signs of increased fatigue, which are evaluated by a central control unit, finally leading to a switchover from a lower SAE level to a higher SAE level.

LIDAR DATA Processing System

A LIDAR Data Processing System may comprise functions of signal processing, signal optimization (signal/noise), data analysis, object detection, object recognition, information exchange with edge and cloud computing, data banks, data libraries and other sensing devices (for example other LIDAR Devices, radar, camera, ultrasound, biometrical feedback data, driver control devices, car-to-car (C2C) communication, car-to-environment (C2X) communication, geolocation data (GPS).

A LIDAR Data Processing System may generate point clouds (3D/6D), object location, object movement, environment data, object/vehicle density.

A LIDAR Data Processing System may include feedback control to First LIDAR Sensing System and/or Second LIDAR Sensing System and/or Control and Communication System . . . .

LIDAR Sensing System

A LIDAR Sensing System may comprise one or many LIDAR emission modules, here termed as "First LIDAR Sensing, and/or one or many LIDAR Sensor modules, here termed as "Second LIDAR Sensing.

LIDAR Sensor

Unless otherwise stated, the term sensor or sensor module describes—in the framework of this patent application—a module, which is configured to function as a LIDAR Sensor System. As such it may comprise a minimum set of LIDAR key components necessary to perform basic LIDAR functions such as a distance measurement.

A LIDAR (light detection and ranging) Sensor is to be understood in particular as meaning a system which, in addition to one or more emitters for emitting light beams, for example in pulsed form, and a detector for detecting any reflected beam components, may have further devices, for example optical elements such as lenses and/or a MEMS mirror. A LIDAR Sensor can therefore also be called a LIDAR System or a LIDAR Sensor System or LIDAR detection system.

LIDAR Sensor Device

A LIDAR Sensor Device is a LIDAR Sensor System either stand alone or integrated into a housing, light fixture, headlight or other vehicle components, furniture, ceiling, textile, etc. and/or combined with other objects (e.g. vehicles, pedestrians, traffic participation objects, . . . ).

LIDAR Sensor Management System

LIDAR Sensor Management System receives input from the LIDAR Data Processing System and/or Control and Communication System and/or any other component of the LIDAR Sensor Device, and outputs control and signaling commands to the First LIDAR Sensing System and/or Second LIDAR Sensing System.

LIDAR Sensor Management Software

LIDAR Sensor Management Software (includes feedback software) for use in a LIDAR Sensor Management System.

LIDAR Sensor Module

A LIDAR Sensor Module comprises at least one LIDAR Light Source, at least one LIDAR Sensing Element, and at least one driver connected to the at least one LIDAR Light Source. It may further include Optical Components and a LIDAR Data Processing System supported by LIDAR signal processing hard- and software.

LIDAR System

A LIDAR System is a system, that may be or may be configured as a LIDAR Sensor System.

LIDAR Sensor System

A LIDAR Sensor System is a system, which uses light or electromagnetic radiation, respectively, to derive information about objects in the environment of the LIDAR system. The acronym LIDAR stands for Light Detection and Ranging. Alternative names may comprise LADAR (laser detection and ranging), LEDDAR (Light-Emitting Diode Detection and Ranging) or laser radar.

LIDAR systems typically comprise of a variety of components as will be described below. In an exemplary application, such LIDAR systems are arranged at a vehicle to derive information about objects on a roadway and in the vicinity of a roadway. Such objects may comprise other road users (e.g. vehicles, pedestrians, cyclists, etc.), elements of road infrastructure (e.g. traffic signs, traffic lights, roadway markings, guardrails, traffic islands, sidewalks, bridge piers, etc.) and generally all kinds of objects which may be found on a roadway or in the vicinity of a roadway, either intentionally or unintentionally.

The information derived via such a LIDAR system may comprise the distance, the velocity, the acceleration, the direction of movement, the trajectory, the pose and/or other physical or chemical properties of these objects. To derive this information, the LIDAR system may determine the Time-of-Flight (TOF) or variations of physical properties such as phase, amplitude, frequency, polarization, structured dot pattern, triangulation-based methods, etc. of the electromagnetic radiation emitted by a light source after the emitted radiation was reflected or scattered by at least one object in the Field of Illumination (FOI) and detected by a photodetector.

LIDAR systems may be configured as Flash LIDAR or Solid-State LIDAR (no moving optics), Scanning LIDAR (1- or 2-MEMS mirror systems, Fiber-Oscillator), Hybrid versions as well as in other configurations.

Light Control Unit

The Light Control Unit may be configured to control the at least one First LIDAR Sensing System and/or at least one Second LIDAR Sensing System for operating in at least one operation mode. The Light Control Unit may comprise a light control software. Possible operation modes are e.g.: dimming, pulsed, PWM, boost, irradiation patterns, including illuminating and non-illuminating periods, light communication (including C2C and C2X), synchronization with other elements of the LIDAR Sensor System, such as a second LIDAR Sensor Device.

Light Source

A light source for LIDAR applications provides electromagnetic radiation or light, respectively, which is used to derive information about objects in the environment of the LIDAR system. In some implementations, the light source emits radiation in a non-visible wavelength range, in particular infrared radiation (IR) in the wavelength range from 850 nm up to 8100 nm. In some implementations, the light source emits radiation in a narrow bandwidth range with a Full Width at Half Maximum (FWHM) between 1 ns to 100 ns.

A LIDAR light source may be configured to emit more than one wavelength, visible or invisible, either at the same time or in a time-sequential fashion.

The light source may emit pulsed radiation comprising individual pulses of the same pulse height or trains of multiple pulses with uniform pulse height or with varying pulse heights. The pulses may have a symmetric pulse shape, e.g. a rectangular pulse shape. Alternatively, the pulses may have asymmetric pulse shapes, with differences in their respective rising and falling edges. Pulse length can be in the range of pico-seconds (ps) up to micro-seconds (µs).

The plurality of pulses may also overlap with each other, at least partially. Apart from such a pulsed operation, the light source may be operated also in a continuous wave operation mode, at least temporarily. In continuous wave operation mode, the light source may be adapted to vary phase, amplitude, frequency, polarization, etc. of the emitted radiation. The light source may comprise solid-state light sources (e.g. edge-emitting lasers, surface-emitting lasers, semiconductor lasers, VCSEL, VECSEL, LEDs, superluminescent LEDs, etc.).

The light source may comprise one or more light emitting elements (of the same type or of different types) which may be arranged in linear stripes or in two-dimensional arrays. The light source may further comprise active or passive heat dissipation elements.

The light source may have several interfaces, which facilitate electrical connections to a variety of electronic devices such as power sources, drivers, controllers, processors, etc. Since a vehicle may employ more than one LIDAR system, each of them may have different laser characteristics, for example, regarding laser wavelength, pulse shape and FWHM.

The LIDAR light source may be combined with a regular vehicle lighting function, such as headlight, Daytime Running Light (DRL), Indicator Light, Brake Light, Fog Light etc. so that both light sources (LIDAR and another vehicle light source) are manufactured and/or placed on the same substrate, or integrated into the same housing and/or be combined as a non-separable unit.

Marker

A marker can be any electro-optical unit, for example an array of photodiodes, worn by external objects, in particular pedestrians and bicyclists, that can detect infrared radiation or acoustic waves (infrasound, audible, ultrasound), process the incoming radiation/waves and, as a response, reflect or emit infrared radiation or acoustic waves (infrasound, audible, ultrasound) with the same or different wavelength, and directly or indirectly communicate with other objects, including autonomously driving vehicles.

Method

The term method may describe a procedure, a process, a technique or a series of steps, which are executed in order to accomplish a result or in order to perform a function. Method may for example refer to a series of steps during manufacturing or assembling a device. Method may also refer to a way of using a product or device to achieve a certain result (e.g. measuring a value, storing data, processing a signal, etc.).

Module

Module describes any aggregation of components, which may set up a LIDAR system. As example, a light source module may describe a module, which comprises a light source, several beam forming optical elements and a light source driver as an electronic device, which is configured to supply power to the light source.

Objects

Objects may generally denote all sorts of physical, chemical or biological matter for which information can be derived via a sensor system. With respect to a LIDAR Sensor System, objects may describe other road users (e.g. vehicles, pedestrians, cyclists, etc.), elements of road infrastructure (e.g. traffic signs, traffic lights, roadway markings, guardrails, traffic islands, sidewalks, bridge piers, etc.) and generally all kinds of objects which may be found on a roadway or in the vicinity of a roadway, either intentionally or unintentionally.

Processor

A processor is an electronic circuit, which performs multipurpose processes based on binary data inputs. Specifically, microprocessors are processing units based on a single integrated circuit (IC). Generally speaking, a processor receives binary data, which may be processed according to instructions stored in a memory block of the processor, and provides binary results as outputs via its interfaces.

Scanning LIDAR Sensor System

A LIDAR Sensor System where the angular information is gained by using a moveable mirror for scanning (i.e. angularly emitting) the laser beam across the Field of View (FOV), or any other technique to scan a laser beam across the FOV, is called a Scanning LIDAR Sensor System.

Sensor/Sensor Pixel

A sensor in the context of this disclosure includes one or more sensor pixels (which may also be referred to as pixel). Each sensor pixel includes exactly one photo diode. The sensor pixels may all have the same shape or different shapes. The sensor pixels may all have the same spacing to their respective neighbors or may have different spacings. The sensor pixels may all have the same orientation in space or different orientation in space. The sensor pixels may all be arranged within one plane or within different planes or other non-planar surfaces. The sensor pixels may include the same material combination or different material combinations. The sensor pixels may all have the same surface structure or may have different surface structures. Sensor pixels may be arranged and/or connected in groups.

In general, each sensor pixel may have an arbitrary shape. The sensor pixels may all have the same size or different sizes. In general, each sensor pixel may have an arbitrary size. Furthermore, the sensor pixels may all include a photo diode of the same photo diode type or of different photo diode types.

A photo diode type may be characterized by one or more of the following features: size of the photo diode; sensitivity of the photo diode regarding conversion of electromagnetic radiation into electrical signals (the variation of the sensitivity may be caused the application of different reverse-bias voltages); sensitivity of the photo diode regarding light wavelengths; voltage class of the photo diode; structure of the photo diode (e.g. pin photo diode, avalanche photo diode, or single-photon avalanche photo diode); and material(s) of the photo diode.

The sensor pixels may be configured to be in functional relationship with color-filter elements and/or optical components.

Sensors

Sensors are devices, modules or subsystems whose purpose it is to detect events or changes in its environment and send the information to other electronics, frequently a computer processor. Nowadays, there is a broad range of sensors available for all kinds of measurement purposes, for example the measurement of touch, temperature, humidity, air pressure and flow, electromagnetic radiation, toxic substances and the like. In other words, a sensor can be an electronic component, module or subsystem that detects events or changes in energy forms in its physical environment (such as motion, light, temperature, sound, etc.) and sends the information to other electronics such as a computer for processing.

Sensors can be used to measure resistive, capacitive, inductive, magnetic, optical or chemical properties.

Sensors include camera sensors, for example CCD or CMOS chips, LIDAR sensors for measurements in the infrared wavelength range, Radar Sensors, and acoustic sensors for measurement in the infrasound, audible and ultrasound frequency range. Ultrasound is radiation with a frequency above 20 kHz.

Sensors can be infrared sensitive and measure for example the presence and location of humans or animals.

Sensor can be grouped into a network of sensors. A vehicle can employ a wide variety of sensors, including camera sensors, LIDAR sensing devices, RADAR, acoustical sensor systems, and the like. These sensors can be mounted inside or outside of a vehicle at various positions (roof, front, rear, side, corner, below, inside a headlight or any other lighting unit) and can furthermore establish a sensor network that may communicate via a hub or several sub-hubs and/or via the vehicle's electronic control unit (ECU).

Sensors can be connected directly or indirectly to data storage, data processing and data communication devices.

Sensors in cameras can be connected to a CCTV (Closed Circuit Television). Light sensors can measure the amount and orientation of reflected light from other objects (reflectivity index).

Sensing Field

The term sensing field describes that surroundings of a sensor system, wherein objects or any other contents can be detected, as well as their physical or chemical properties (or their changes). In case of a LIDAR Sensor System, it describes a solid angle volume into which light is emitted by the LIDAR light source (FOI) and from which light that has been reflected or scattered by an object can be received by the LIDAR detector (FOV). As an example, a LIDAR sensing field may comprise a roadway or the vicinity of a roadway close to a vehicle, but also the interior of a vehicle. For other types of sensors, sensing field may describe the air around the sensor or some objects in direct contact to the sensor.

US 12,631,731 B2

67

Sensor Optics

Sensor Optics denotes all kinds of optical elements, which may be used in a LIDAR Sensor System in order to facilitate its function or improve its function. As example, such optical elements may comprise lenses or sets of lenses, filters, diffusors, mirrors, reflectors, light guides, Diffractive Optical Elements (DOE), Holographic Optical Elements and generally all kind of optical elements which may manipulate light (or electromagnetic radiation) via refraction, diffraction, reflection, transmission, absorption, scattering, etc. Sensor Optics may refer to optical elements related to the light source, to the beam steering unit or the detector unit. Laser emitter and optical elements may be moved, tilted or otherwise shifted and/or modulated with respect to their distance and orientation.

Sensor System Optimization

Some LIDAR-related business models may deal with methods of sensor system optimization. Sensor system optimization may rely on a broad range of methods, functions or devices, including for example computing systems utilizing artificial intelligence, sensor fusion (utilizing data and signals from other LIDAR-sensors, RADAR sensors, Ultrasonic sensors, Cameras, Video-streams, etc.), as well as software upload and download functionalities (e.g. for update purposes). Sensor system optimization may further utilize personal data of a vehicle user, for example regarding age, gender, level of fitness, available driving licenses (passenger car, truck) and driving experiences (cross vehicle weight, number of vehicle axes, trailer, horsepower, front-wheel drive/rear-wheel drive). Personal data may further include further details regarding driving experience (e.g. beginners level, experienced level, professional motorist level) and/or driving experiences based on data such as average mileage per year, experience for certain road classes, road environments or driving conditions (e.g. motorway, mountain roads, off-road, high altitude, bridges, tunnels, reversing, parking, etc.), as well as experiences with certain weather conditions or other relevant conditions (snow, ice, fog, day/night, snow tires, snow chains, etc.).

Personal data may further include information about previous accidents, insurance policies, warning tickets, police reports, entries in central traffic registers (e.g. Flensburg in Germany), as well as data from biofeedback systems, other health-related systems (e.g. cardiac pacemakers) and other data (e.g. regarding driving and break times, level of alcohol intake, etc.).

Personal data may be particularly relevant in care sharing scenarios and may include information about the intended ride (starting location, destination, weekday, number of passengers), the type of loading (passengers only, goods, animals, dangerous goods, heavy load, large load, etc.) and personal preferences (time-optimized driving, safety-optimized driving, etc.). Personal data may be provided via smartphone connections (e.g. based on Bluetooth, WiFi, LiFi, etc.). Smartphones or comparable mobile devices may further be utilized as measurement tools (e.g. ambient light, navigation data, traffic density, etc.) and/or as device which may be utilized as assistants, decision-making supports, or the like.

Signal Modulation

In the context of the present application the term "signal modulation" (also referred to as "electrical modulation") may be used to describe a modulation of a signal for encoding data in such signal (e.g., a light signal or an electrical signal, for example a LIDAR signal). By way of example, a light signal (e.g., a light pulse) may be electrically modulated such that the light signal carries or transmits data or information. Illustratively, an electrically modulated light signal may include a sequence of light pulses arranged (e.g., temporally spaced) such that data may be extracted or interpreted according to the arrangement of the light pulses. Analogously, the term "signal demodulation" (also referred to as "electrical demodulation") may be used to describe a decoding of data from a signal (e.g., from a light signal, such as a sequence of light pulses).

Virtual Map

A digital map is a collection of data that may be used to be formatted into a virtual image. The primary function of a digital map is to provide accurate representations of measured data values. Digital mapping also allows the calculation of geometrical distances from one object, as represented by its data set, to another object. A digital map may also be called a virtual map.

Vehicle

A vehicle may be any object or device that either is equipped with a LIDAR Sensor System and/or communicates with a LIDAR Sensor System. In particular a vehicle can be: automotive vehicle, flying vehicle, all other moving vehicles, stationary objects, buildings, ceilings, textiles, traffic control equipment, . . . .

LIST OF ABBREVIATIONS

ACK=Acknowledgment
ADAS=Advanced Driver-Assistance Systems
ADB=Adaptive high-beam systems
AGV=Automatically Guided Vehicles
AI=Artificial Intelligence
APD=Avalanche Photo-Diodes
API=Application Programming Interface
APP=Application software, especially as downloaded by a user to a mobile device
AR=Augmented Reality
ASCII=American Standard Code for Information Interchange
ASIC=Application-Specific Integrated Circuit
ASSP=Application Specific Standard Product
AV=Autonomous Vehicle
BCU=Board Control System
C2C=Car-to-Car
C2X=Car-to-Infrastructure or Car-to-Environment
CCD=Charge-Coupled Device
CCTV=Closed Circuit Television
CD=Compact Disc
CD=Collision Detection
CDe=Computing Device
CdTe=Cadmium telluride
CIS=CMOS Image Sensor
CMOS=Complementary Metal-Oxide-Semiconductor
CMYW=cyan, magenta, yellow, and white
CU=Communication Unit/Data/Device
CYMG=cyan, yellow, green and magenta
DLP=Digital Light Processing
DMD=Digital Mirror Devices
DNL=Deep Neuronal Learning
DNN=Deep Neural Networks
DOE=Diffractive Optical Elements
DRAM=Dynamic Random Access Memory
DRL=Daytime Running Light
ECU=Electronic Control Unit/Vehicle Control Unit
FET=Field Effect Transistor
FOI=Field of Illumination
FOV=Field of View
FWHM=Full Width at Half Maximum

69

70

GNSS=Global Navigation Satellite System
GPS=Global-Positioning-System
GUI=Graphical User Interface
HMI=Human Machine Interaction
HUD=Head-up-Display
HVAC=Heating, Ventilation and Air Conditioning
IC=Integrated Circuit
ID=Identification
IMU=Inertial Measurement Unit (system)
IoT=Internet of Things
IR=Infrared Radiation
ITO=Indium Tin Oxide
iTOF=Indirect TOF
LADAR=Laser Detection and Ranging
LAS=Laser File Format
LCD=Liquid Crystal Display
LED=Light-Emitting Diodes
LEDDAR=Light-Emitting Diode Detection and Ranging
LIDAR=Light detection and ranging
LPaaS=LiDAR Platform as a Service
MaaS=Mobility-as-a-Service
MEMS=Micro-Electro-Mechanical System
ML=Machine Learning
MOSFET=Metal-Oxide-Semiconductor      Field-Effect
    Transistor
NFU=Neural Processor Units
NIR=Near Infrared
OPA=Optical Phased Arrays
PaaS=Platform as a Service
PCB=Printed Circuit Board
PD=Photo-Diode
PEDOT=Poly-3,4-ethylendioxythiophen
PIN=Positive Intrinsic Negative diode
PWM=Pulse-width Modulation
QR-Code=Quick Response Code
RADAR=Radio Detection And Ranging
RAM=Random Access Memory
RGB=Red Green Blue
RGBE=red, green, blue, and emerald
SAE=Society of Automotive Engineers
SiPM=Silicon Photomultipliers
SNR=Signal-to-Noise Ratio
SOC=Systems-on-Chip
SPAD=Single Photon Avalanche Diodes
TaaS=Transportation-as-a-Service
TIA=Transimpedance Amplifier
TOF=Time of Flight
TSV=Through-Silicon-Via
UAV=Unmanned Aerial Vehicles
UI=User Interface
USB=Universal Serial Bus
UV=Ultra-Violet radiation
VCSEL=Vertical Cavity Surface Emitting Laser
VECSEL=Vertical-External-Cavity-Surface-Emitting-
    Laser
VIS=Visible Spectrum
VR=Virtual Reality
WiFi=Wireless Fidelity
WLAN=Wireless Local Area Network
ZnS=Zinc Sulphide
fC=femto Coulomb
pC=pico Coulomb
fps=frames per second
ms=milli-seconds
ns=nano-seconds
ps=pico-seconds
μs=micro-seconds i.e.=that is/in other words
e.g.=for example

LIST OF REFERENCE SIGNS

10 LIDAR Sensor System
20 Controlled LIDAR Sensor System
30 LIDAR Sensor Device
40 First LIDAR Sensing System
41 Light scanner/Actuator for Beam Steering and Control
42 Light Source
43 Light Source Controller/Software
50 Second LIDAR Sensing System
51 Detection Optic/Actuator for Beam Steering and Con-
    trol
52 Sensor or Sensor element
53 Sensor Controller
60 LIDAR Data Processing System
61 Advanced Signal Processing
62 Data Analysis and Computing
63 Sensor Fusion and other Sensing Functions
70 Control and Communication System
80 Optics
81 Camera System and Camera sensors
82 Camera Data and Signal exchange
90 LIDAR Sensor Management System
92 Basic Signal Processing
VSPAD SPAD potential
3800 Sensor portion
3802 Sensor pixel
3804 Light spot
3806 Circle
3808 Row select signal
3810 Row select signal
3812 Row select signal
3814 Column select signal
3816 Column select signal
3818 Column select signal
3820 Selected sensor pixel
3822 Supply voltage
3900 Sensor portion
3902 Row selection line
3904 Column selection line
3906 Column switch
3908 Supply voltage
3910 Supply voltage line
3912 Column read out line
3914 Collection read out line
3916 Column read out switch
3918 Column pixel switch
3920 Column pixel read out switch
4002 Column switch MOSFET
4004 Column read out switch MOSFET
4006 Column pixel switch MOSFET
4008 Column pixel read out switch MOSFET
4100 Sensor portion
4102 First summation output
4104 Coupling capacitor
4106 Second summation output
4108 Coupling resistor
4200 Recorded scene
4202 Center region
4204 Edge region
4300 Recorded scene
4302 First row
4304 Second row
4400 Method 4402 Partial process
4404 Partial process
4500 Method
4502 Partial process
4504 Partial process
5100 Optical component for a LIDAR Sensor System
5102 Device layer
5104 One or more electronic devices
5106 Bottom interconnect layer
5108 One or more electronic contacts
5110 First photo diode
5112 One or more contact vias
5114 Intermediate interconnect/device layer
5116 One or more further electronic devices
5118 One or more further electronic contacts
5120 Second photo diode
5200 Optical component for a LIDAR Sensor System
5202 One or more microlenses
5204 Filler material
5206 Filter layer
5208 Upper (exposed) surface of filter layer
5210 First arrow
5212 Second arrow
5214 Third arrow
5250 Wavelength/transmission diagram
5252 Transmission characteristic
5300 Optical component for a LIDAR Sensor System
5302 Bottom mirror
5304 Top mirror
5400 Cross sectional view of a sensor for a LIDAR Sensor System
5500 Top view of a sensor for a LIDAR Sensor System
5502 Red pixel filter portion
5504 Green pixel filter portion
5506 Blue pixel filter portion
5600 Top view of a sensor for a LIDAR Sensor System
5602 Rectangle
5700 Top view of a sensor for a LIDAR Sensor System
5702 Red pixel filter portion
5704 Yellow or orange pixel filter portion
5800 Optical component for a LIDAR Sensor System
5802 Reflector layer
5804 Fourth arrow
5806 Fifth arrow
5808 Micromechanically defined IR absorber structure
15500 Optical package
15502 Substrate
15504 Capacitor
15504c Capacitor
15506 Switch
15506g Control terminal
15506s Switch
15508 Laser diode
15508d Laser diode
15510 Common line
15512 Power source
15514 Processor
15602 Printed circuit board
15604 First electrical contact
15606 Second electrical contact
15608 Terminal
15700 Optical package
15702 Substrate
15702i Insulating layer
15702s Base
15704 Capacitor
15706 Switch 15708 Laser diode
15708a Active layer
15708o Optical structure
15710 Printed circuit board
15712 Bond wire
15714 Terminal
15716 Terminal
15718 Connector structure
15718c Electrical contact
15720 Bond wire
15722 Access line
15724 Through via

What is claimed is:

1. Optical package for a LIDAR Sensor System with a substrate including:
   an array of a plurality of capacitors formed in the substrate; and
   a plurality of switches formed in the substrate, wherein each switch is connected between at least one laser diode and at least one capacitor of the plurality of capacitors,
   the optical package further including:
   the at least one laser diode mounted proximately to the plurality of capacitors on the substrate;
   a processor configured to control the plurality of switches to control a first current flow to charge the plurality of capacitors, and to control a second current flow to drive the at least one laser diode with a current discharged from at least one capacitor of the plurality of capacitors; and
   characterized in that an electrical path between a capacitor and the at least one laser diode has an inductivity lower than 100 pH.

2. The optical package according to claim 1, characterized in that the plurality of capacitors and the plurality of switches are monolithically integrated in the substrate.

3. The optical package according to claim 1, characterized in that each switch of the plurality of switches is assigned to exactly one respective capacitor of the plurality of capacitors.

4. The optical package according to claim 1, characterized in that each switch of the plurality of switches includes at least one transistor.

5. The optical package according to claim 4, characterized in that the at least one transistor comprises at least one field effect transistor.

6. The optical package according to claim 5, characterized in that the at least one field effect transistor comprises at least one metal oxide semiconductor field effect transistor.

7. The optical package according to claim 6, characterized in that the at least one metal oxide semiconductor field effect transistor is a complementary metal oxide semiconductor field effect transistor.

8. The optical package according to claim 1, characterized in that the array of capacitors includes a number of capacitors in the range from 400000 capacitors to 600000 capacitors associated with the at least one laser diode.

9. The optical package according to claim 1, characterized in that at least one capacitor of the array of capacitors has a capacitance in the range from 50 fF to 200 fF.

10. The optical package according to claim 1, characterized in that the current flow to drive the at least one laser diode includes a current in the range from 10 mA to 100 A.

11. The optical package according to claim 1, characterized in that at least one capacitor of the array of capacitors is a deep trench capacitor.

12. The optical package according to claim 1, characterized in that at least one capacitor of the array of capacitors is a stacked capacitor.

13. The optical package according to claim 1, characterized in that the capacitors of the array of capacitors are arranged in rows and columns.

14. The optical package according to claim 1, characterized in that an electrically conductive common line is connecting at least some capacitors of the plurality of capacitors.

15. The optical package according to claim 14, characterized in that the optical package includes a power source electrically connected to the common line and configured to provide the power to charge the plurality of capacitors.

16. The optical package according to claim 1, characterized in that the optical package includes a printed circuit board, and the substrate may be mounted on the printed circuit board.

17. The optical package according to claim 14, characterized in that the optical package includes a printed circuit board, and the substrate may be mounted on the printed circuit board, wherein the printed circuit board may include an electrical contact electrically coupled to the common line of the substrate.

18. The optical package according to claim 17, characterized in that the electrical contact of the printed circuit board is wire bonded to the common line of the substrate.

19. The optical package according to claim 14, characterized in that the optical package includes a printed circuit board, and the substrate may be mounted on the printed circuit board, wherein a first terminal of the at least one laser diode may be electrically coupled to the common line, and a second terminal of the at least one laser diode may be electrically coupled to an electrical contact of the printed circuit board.

20. The optical package according to claim 19, characterized in that the electrical contact of the printed circuit board is wire bonded to the second terminal of the at least one laser diode.

21. The optical package according to claim 1, characterized in that the substrate includes or essentially consists of silicon.

22. The optical package according to claim 1, characterized in that the at least one laser diode laterally covers at least a portion of the plurality of capacitors.

23. The optical package according to claim 1, characterized in that the at least one laser diode includes an edge emitting laser diode.

24. The optical package according to claim 1, characterized in that the at least one laser diode includes a vertical cavity surface-emitting laser diode.

25. The optical package according to claim 1, characterized in that the processor is monolithically integrated in the substrate.

26. The optical package according to claim 17, characterized in that the processor is mounted on the printed circuit board.

27. The optical package according to claim 17, characterized in that the processor is configured to control the plurality of switches to discharge at least some capacitors of the plurality of capacitors to drive the at least one laser diode to emit a laser pulse of a predefined pulse shape.

28. The optical package according to claim 27, characterized in that the laser pulse has a pulse duration of in a range of 5 ns to 20 ns.

29. The optical package according to claim 27, characterized in that the processor is configured to control the plurality of switches to discharge at least some capacitors of the plurality of capacitors to drive the at least one laser diode to emit a laser pulse dependent on a light emission scheme.

30. The optical package according to claim 1, characterized in that at least one capacitor of the array of capacitors are arranged directly underneath the at least one laser diode in order to provide small parasitic inductances and capacitances.

31. A LIDAR Sensor System including an optical package according to claim 1.

32. Optical package for a LIDAR Sensor System with a substrate including:

an array of a plurality of capacitors formed in the substrate; and a plurality of switches formed in the substrate, where each switch is connected between at least one laser diode and at least one capacitor of the plurality of capacitors, the optical package further including:

the at least one laser diode mounted proximately to the plurality of capacitors on the substrate;

a processor configured to control the plurality of switches to control a first current flow to charge the plurality of capacitors, and to control a second current flow to drive the at least one laser diode with a current discharged from at least one capacitor of the plurality of capacitors; and characterized in that the array of capacitors includes a number of capacitors in the range from 400000 capacitors to 600000 capacitors associated with the at least one laser diode.

* * * * *